(12) United States Patent
Dinan

(10) Patent No.: US 10,039,131 B2
(45) Date of Patent: *Jul. 31, 2018

(54) SOUNDING REFERENCE SIGNAL TRANSMISSION IN A WIRELESS NETWORK

(71) Applicant: Comcast Cable Communications, LLC, Philadelphia, PA (US)

(72) Inventor: Esmael Hejazi Dinan, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/201,529

(22) Filed: Jul. 4, 2016

(65) Prior Publication Data
US 2017/0026920 A1 Jan. 26, 2017

Related U.S. Application Data

(63) Continuation of application No. 14/880,312, filed on Oct. 12, 2015, now Pat. No. 9,392,623, which is a
(Continued)

(51) Int. Cl.
*H04W 56/00* (2009.01)
*H04W 74/08* (2009.01)
(Continued)

(52) U.S. Cl.
CPC ....... *H04W 74/0833* (2013.01); *H04L 5/0055* (2013.01); *H04L 27/2692* (2013.01);
(Continued)

(58) Field of Classification Search
None
See application file for complete search history.

(56) References Cited

U.S. PATENT DOCUMENTS 4,954,892 A   9/1990  Asai et al.
5,740,167 A   4/1998  Taketsugu et al.
(Continued)

FOREIGN PATENT DOCUMENTS

EP    2640138 A1   9/2013
WO    2011023057 A1   3/2011
(Continued)

OTHER PUBLICATIONS

3GPP TSG-RAN WG2 Meeting #75B R2-114966 Zhuhai, China, Oct. 10-14, 2011 Source: Potevio Title: Consideration on contention based random access.
(Continued)

*Primary Examiner* — Kouroush Mohebbi
(74) *Attorney, Agent, or Firm* — Banner & Witcoff, Ltd.

(57) ABSTRACT

A wireless device receives message(s) comprising configuration parameters of sounding reference signals on a secondary cell in a secondary cell group. The wireless device transmits one or more of the sounding reference signals on the secondary cell after applying a timing advance to the secondary cell group. The wireless device is configured to not transmit any of the sounding reference signals on the secondary cell after receiving the message(s) and before receiving the timing advance.

40 Claims, 16 Drawing Sheets

Related U.S. Application Data continuation of application No. 14/597,483, filed on Jan. 15, 2015, now Pat. No. 9,161,323, which is a continuation of application No. 13/749,693, filed on Jan. 25, 2013, now Pat. No. 8,976,765.

(60) Provisional application No. 61/618,830, filed on Apr. 1, 2012, provisional application No. 61/590,366, filed on Jan. 25, 2012.

(51) Int. Cl.

| | | |
|---|---|---|
| *H04W 28/00* | (2009.01) | |
| *H04W 48/00* | (2009.01) | |
| *H04W 52/14* | (2009.01) | |
| *H04W 28/18* | (2009.01) | |
| *H04W 52/34* | (2009.01) | |
| *H04W 74/00* | (2009.01) | |
| *H04L 27/26* | (2006.01) | |
| *H04W 72/04* | (2009.01) | |
| *H04W 36/00* | (2009.01) | |
| *H04W 52/24* | (2009.01) | |
| *H04L 5/00* | (2006.01) | |
| *H04W 52/18* | (2009.01) | |
| *H04L 29/06* | (2006.01) | |
| *H04W 76/04* | (2009.01) | |
| *H04L 27/32* | (2006.01) | |
| *H04J 11/00* | (2006.01) | |
| *H04W 88/08* | (2009.01) | |
| *H04W 88/02* | (2009.01) | |

(52) U.S. Cl.
CPC ........... *H04W 28/00* (2013.01); *H04W 28/18* (2013.01); *H04W 36/0072* (2013.01); *H04W 48/00* (2013.01); *H04W 52/14* (2013.01); *H04W 52/146* (2013.01); *H04W 52/242* (2013.01); *H04W 52/34* (2013.01); *H04W 56/00* (2013.01); *H04W 56/001* (2013.01); *H04W 56/0005* (2013.01); *H04W 56/0045* (2013.01); *H04W 72/042* (2013.01); *H04W 72/0406* (2013.01); *H04W 72/0446* (2013.01); *H04W 74/002* (2013.01); *H04J 2011/0096* (2013.01); *H04L 27/32* (2013.01); *H04L 29/06319* (2013.01); *H04W 52/18* (2013.01); *H04W 76/046* (2013.01); *H04W 88/02* (2013.01); *H04W 88/08* (2013.01)

(56) References Cited

U.S. PATENT DOCUMENTS

| | | | |
|---|---|---|---|
| 6,201,803 | B1 | 3/2001 | Munday et al. |
| 6,714,784 | B1 | 3/2004 | Forssell et al. |
| 6,804,212 | B1 | 10/2004 | Vallstrom et al. |
| 7,352,714 | B2 | 4/2008 | Balachandran et al. |
| 7,912,485 | B2 | 3/2011 | Sinnarajah et al. |
| 8,031,662 | B2 | 10/2011 | Lee et al. |
| 8,077,670 | B2 | 12/2011 | Fan et al. |
| 8,131,295 | B2 | 3/2012 | Wang et al. |
| 8,270,424 | B2 | 9/2012 | Rao |
| 8,280,391 | B2 | 10/2012 | Kim et al. |
| 8,289,922 | B2 | 10/2012 | Ewe et al. |
| 8,395,985 | B2 | 3/2013 | Dinan |
| 8,422,410 | B2 | 4/2013 | Park et al. |
| 8,432,811 | B2 | 4/2013 | Park et al. |
| 8,462,610 | B1 | 6/2013 | Dinan |
| 8,462,688 | B1 | 6/2013 | Dinan |
| 8,503,322 | B2 | 8/2013 | Krishnamurthy et al. |
| 8,520,497 | B1 | 8/2013 | Dinan |
| 8,526,310 | B2 * | 9/2013 | Dinan ............... H04W 56/0005 370/236 |
| 8,526,389 | B2 | 9/2013 | Dinan |
| 8,531,966 | B1 | 9/2013 | Dinan |
| 8,537,739 | B1 | 9/2013 | Dinan |
| 8,542,654 | B1 | 9/2013 | Dinan |
| 8,547,929 | B1 | 10/2013 | Dinan |
| 8,553,558 | B1 * | 10/2013 | Dinan ............... H04W 56/0005 370/236 |
| 8,553,655 | B1 | 10/2013 | Dinan |
| 8,553,671 | B2 | 10/2013 | Kim et al. |
| 8,559,405 | B2 | 10/2013 | Dinan |
| 8,565,142 | B1 | 10/2013 | Dinan |
| 8,571,467 | B2 | 10/2013 | Uusitalo et al. |
| 8,576,780 | B2 | 11/2013 | Vujcic |
| 8,588,169 | B2 | 11/2013 | Dinan |
| 8,599,785 | B1 | 12/2013 | Dinan |
| 8,619,727 | B1 | 12/2013 | Dinan |
| 8,625,404 | B2 | 1/2014 | Dinan |
| 8,625,405 | B2 | 1/2014 | Dinan |
| 8,644,129 | B2 | 2/2014 | Dinan |
| 8,687,541 | B2 | 4/2014 | Lohr et al. |
| 8,699,317 | B2 | 4/2014 | Dinan |
| 8,717,866 | B2 | 5/2014 | Dinan |
| 8,767,585 | B2 | 7/2014 | Pelletier et al. |
| 8,780,784 | B2 | 7/2014 | Chung et al. |
| 8,804,668 | B2 | 8/2014 | Dinan |
| 8,811,433 | B2 | 8/2014 | Zhao et al. |
| 8,824,968 | B2 | 9/2014 | Kim et al. |
| 8,837,304 | B2 | 9/2014 | Yamada |
| 8,867,666 | B2 | 10/2014 | Kim et al. |
| 8,873,443 | B2 | 10/2014 | Haim et al. |
| 8,885,589 | B2 | 11/2014 | Kim et al. |
| 8,897,248 | B2 | 11/2014 | Dinan |
| 8,917,593 | B2 | 12/2014 | Damnjanovic et al. |
| 8,934,438 | B2 | 1/2015 | Dinan |
| 8,934,459 | B2 | 1/2015 | Marinier et al. |
| 8,958,342 | B2 | 2/2015 | Dinan |
| 8,964,590 | B2 | 2/2015 | Dinan |
| 8,964,593 | B2 | 2/2015 | Dinan |
| 8,964,659 | B2 | 2/2015 | Vujcic |
| 8,964,683 | B2 | 2/2015 | Dinan |
| 8,964,780 | B2 | 2/2015 | Dinan |
| 8,964,793 | B2 | 2/2015 | Jang et al. |
| 8,971,280 | B2 | 3/2015 | Dinan |
| 8,971,298 | B2 | 3/2015 | Dinan |
| 8,976,765 | B2 | 3/2015 | Dinan |
| 8,982,852 | B2 | 3/2015 | Dinan |
| 8,989,128 | B2 | 3/2015 | Dinan |
| 8,995,381 | B2 | 3/2015 | Dinan |
| 8,995,405 | B2 | 3/2015 | Dinan |
| 9,001,780 | B2 | 4/2015 | Chen et al. |
| 9,008,050 | B2 | 4/2015 | Feuersanger et al. |
| 9,042,925 | B2 | 5/2015 | Seo et al. |
| 9,054,835 | B2 | 6/2015 | Kwon et al. |
| 9,054,841 | B2 | 6/2015 | Ouchi et al. |
| 9,084,228 | B2 | 7/2015 | Dinan |
| 9,084,270 | B2 | 7/2015 | Dinan |
| 9,107,206 | B2 | 8/2015 | Dinan |
| 9,113,387 | B2 | 8/2015 | Dinan |
| 9,118,452 | B2 | 8/2015 | Park et al. |
| 9,137,762 | B2 | 9/2015 | Ahn et al. |
| 9,155,092 | B2 | 10/2015 | Park et al. |
| 9,161,322 | B2 | 10/2015 | Dinan |
| 9,161,323 | B2 | 10/2015 | Dinan |
| 9,179,420 | B2 | 11/2015 | Dinan |
| 9,179,425 | B2 | 11/2015 | Dinan |
| 9,179,454 | B2 | 11/2015 | Dinan |
| 9,179,457 | B2 | 11/2015 | Dinan |
| 9,185,611 | B2 | 11/2015 | Zeng et al. |
| 9,204,406 | B2 | 12/2015 | Dinan |
| 9,204,407 | B2 | 12/2015 | Dinan |
| 9,210,619 | B2 | 12/2015 | Dinan |
| 9,210,664 | B2 | 12/2015 | Dinan |
| 9,210,665 | B2 | 12/2015 | Dinan |
| 9,210,667 | B2 | 12/2015 | Dinan |
| 9,210,676 | B2 | 12/2015 | Dinan |
| 9,215,051 | B2 | 12/2015 | Dinan |
| 9,215,678 | B2 | 12/2015 | Dinan |
| 9,220,116 | B2 | 12/2015 | Dinan |
| 9,237,537 | B2 | 1/2016 | Dinan |

(56) References Cited

U.S. PATENT DOCUMENTS

| | | |
|---|---|---|
| 9,241,326 B2 | 1/2016 | Dinan |
| 9,247,503 B2 | 1/2016 | Ahn et al. |
| 9,282,521 B2 | 3/2016 | Lim et al. |
| 9,319,194 B2 | 4/2016 | Dinan |
| 9,337,980 B2 | 5/2016 | Ahn et al. |
| 9,363,832 B2 | 6/2016 | Dinan |
| 9,386,490 B2 | 7/2016 | Dinan |
| 9,386,604 B2 | 7/2016 | Dinan |
| 9,391,824 B2 | 7/2016 | Dinan |
| 9,392,623 B2 * | 7/2016 | Dinan ............... H04W 56/0005 |
| 9,397,875 B2 | 7/2016 | Dinan |
| 9,402,255 B2 | 7/2016 | Lohr et al. |
| 9,414,332 B2 | 8/2016 | Dinan |
| 9,414,340 B2 | 8/2016 | Dinan |
| 9,439,217 B2 | 9/2016 | Feuersaenger et al. |
| 9,461,793 B2 | 10/2016 | Kim et al. |
| 9,461,797 B2 | 10/2016 | Ahn et al. |
| 9,503,989 B2 | 11/2016 | Haim et al. |
| 9,743,431 B2 | 8/2017 | Dinan |
| 2003/0087647 A1 | 5/2003 | Hurst |
| 2004/0001448 A1 | 1/2004 | Preston et al. |
| 2004/0202119 A1 | 10/2004 | Edge |
| 2005/0037786 A1 | 2/2005 | Edge |
| 2007/0002890 A1 | 1/2007 | Mangold et al. |
| 2007/0032255 A1 | 2/2007 | Koo et al. |
| 2007/0149196 A1 | 6/2007 | Choi et al. |
| 2007/0189205 A1 | 8/2007 | Terry et al. |
| 2007/0207828 A1 | 9/2007 | Cheng et al. |
| 2007/0293224 A1 | 12/2007 | Wang et al. |
| 2008/0039087 A1 | 2/2008 | Gallagher et al. |
| 2008/0069053 A1 | 3/2008 | Kim et al. |
| 2008/0084849 A1 | 4/2008 | Wang et al. |
| 2008/0102842 A1 | 5/2008 | Kim |
| 2008/0102896 A1 | 5/2008 | Wang et al. |
| 2008/0123576 A1 | 5/2008 | Son et al. |
| 2008/0130585 A1 | 6/2008 | Park et al. |
| 2008/0137632 A1 | 6/2008 | Choi et al. |
| 2008/0182579 A1 | 7/2008 | Wang et al. |
| 2008/0267127 A1 | 10/2008 | Narasimha et al. |
| 2009/0109838 A1 | 4/2009 | Kuo |
| 2009/0181687 A1 | 7/2009 | Tiirola et al. |
| 2009/0186613 A1 | 7/2009 | Ahn et al. |
| 2009/0238121 A1 | 9/2009 | Kotecha |
| 2009/0239545 A1 | 9/2009 | Lee et al. |
| 2009/0316637 A1 | 12/2009 | Yi et al. |
| 2009/0316678 A1 | 12/2009 | Yamada et al. |
| 2010/0035581 A1 | 2/2010 | Park et al. |
| 2010/0056160 A1 | 3/2010 | Kim et al. |
| 2010/0067470 A1 | 3/2010 | Damnjanovic et al. |
| 2010/0069071 A1 | 3/2010 | Simonsson et al. |
| 2010/0098011 A1 | 4/2010 | Pelletier et al. |
| 2010/0118788 A1 | 5/2010 | Ohta et al. |
| 2010/0130137 A1 | 5/2010 | Pelletier et al. |
| 2010/0144353 A1 | 6/2010 | Chong et al. |
| 2010/0184446 A1 | 7/2010 | Moon et al. |
| 2010/0215004 A1 | 8/2010 | Yoo |
| 2010/0227569 A1 | 9/2010 | Bala et al. |
| 2010/0238872 A1 | 9/2010 | Kim et al. |
| 2010/0238908 A1 | 9/2010 | Wu |
| 2010/0254356 A1 | 10/2010 | Tynderfeldt et al. |
| 2010/0279695 A1 | 11/2010 | Amirijoo et al. |
| 2010/0290427 A1 | 11/2010 | Sebire et al. |
| 2010/0302998 A1 | 12/2010 | Bao et al. |
| 2010/0303039 A1 | 12/2010 | Zhang et al. |
| 2010/0309877 A1 | 12/2010 | Damnjanovic et al. |
| 2011/0039568 A1 | 2/2011 | Zhang et al. |
| 2011/0039593 A1 | 2/2011 | Lee et al. |
| 2011/0044287 A1 | 2/2011 | Park et al. |
| 2011/0081936 A1 | 4/2011 | Haim et al. |
| 2011/0085491 A1 | 4/2011 | Tynderfeldt et al. |
| 2011/0098054 A1 | 4/2011 | Gorokhov et al. |
| 2011/0111749 A1 | 5/2011 | Kim et al. |
| 2011/0128935 A1 | 6/2011 | Jang et al. |
| 2011/0134774 A1 | 6/2011 | Pelletier et al. |
| 2011/0158116 A1 | 6/2011 | Tenny et al. |
| 2011/0194455 A1 | 8/2011 | Aminaka et al. |
| 2011/0194493 A1 * | 8/2011 | Centonza ........... H04W 52/0206 370/328 |
| 2011/0200014 A1 | 8/2011 | Lee et al. |
| 2011/0201367 A1 | 8/2011 | Aminaka et al. |
| 2011/0222428 A1 | 9/2011 | Charbit et al. |
| 2011/0222492 A1 | 9/2011 | Borsella et al. |
| 2011/0223932 A1 | 9/2011 | Hole et al. |
| 2011/0243102 A1 | 10/2011 | Sebire et al. |
| 2011/0243106 A1 | 10/2011 | Hsu et al. |
| 2011/0249641 A1 | 10/2011 | Kwon et al. |
| 2011/0250918 A1 | 10/2011 | Jen |
| 2011/0255431 A1 | 10/2011 | Wang et al. |
| 2011/0261776 A1 | 10/2011 | Ahn et al. |
| 2011/0268032 A1 | 11/2011 | Kim et al. |
| 2011/0268087 A1 | 11/2011 | Kwon et al. |
| 2011/0269469 A1 | 11/2011 | Xiao et al. |
| 2011/0275335 A1 | 11/2011 | Luo et al. |
| 2011/0281581 A1 | 11/2011 | Brandt et al. |
| 2011/0286409 A1 | 11/2011 | Son et al. |
| 2011/0286411 A1 | 11/2011 | Kim et al. |
| 2011/0294508 A1 | 12/2011 | Min et al. |
| 2011/0299489 A1 | 12/2011 | Kim et al. |
| 2011/0300856 A1 | 12/2011 | Aminaka |
| 2011/0310845 A1 | 12/2011 | Jung et al. |
| 2012/0008524 A1 | 1/2012 | Amirijoo et al. |
| 2012/0008600 A1 * | 1/2012 | Marinier .............. H04L 5/001 370/336 |
| 2012/0014371 A1 | 1/2012 | Weng et al. |
| 2012/0021693 A1 | 1/2012 | Wintzell et al. |
| 2012/0026972 A1 | 2/2012 | Miao et al. |
| 2012/0026976 A1 | 2/2012 | Chang et al. |
| 2012/0039273 A1 | 2/2012 | Nam et al. |
| 2012/0039284 A1 | 2/2012 | Barbieri et al. |
| 2012/0044906 A1 | 2/2012 | Chen et al. |
| 2012/0063425 A1 | 3/2012 | Wang et al. |
| 2012/0076037 A1 | 3/2012 | Noh et al. |
| 2012/0076088 A1 | 3/2012 | Hwang et al. |
| 2012/0076103 A1 | 3/2012 | Dai et al. |
| 2012/0077484 A1 | 3/2012 | Ji |
| 2012/0082152 A1 | 4/2012 | Baldemair et al. |
| 2012/0093128 A1 | 4/2012 | Song et al. |
| 2012/0106510 A1 | 5/2012 | Kuo |
| 2012/0106511 A1 | 5/2012 | Wu |
| 2012/0113883 A1 | 5/2012 | Osterling |
| 2012/0113914 A1 | 5/2012 | Zhao et al. |
| 2012/0113941 A1 | 5/2012 | Chung et al. |
| 2012/0113962 A1 | 5/2012 | Jen |
| 2012/0120944 A1 | 5/2012 | Yang et al. |
| 2012/0170497 A1 | 7/2012 | Zhang et al. |
| 2012/0170570 A1 | 7/2012 | Chang et al. |
| 2012/0176967 A1 | 7/2012 | Kim et al. |
| 2012/0178456 A1 | 7/2012 | Peisa et al. |
| 2012/0178482 A1 | 7/2012 | Seo et al. |
| 2012/0188897 A1 | 7/2012 | Shen |
| 2012/0218987 A1 | 8/2012 | Zhao et al. |
| 2012/0218988 A1 | 8/2012 | Xu et al. |
| 2012/0224552 A1 | 9/2012 | Feuersanger et al. |
| 2012/0243498 A1 | 9/2012 | Kwon et al. |
| 2012/0243514 A1 | 9/2012 | Wu |
| 2012/0250520 A1 * | 10/2012 | Chen ................... H04L 5/001 370/241 |
| 2012/0257510 A1 | 10/2012 | Jeong et al. |
| 2012/0257513 A1 | 10/2012 | Yamada et al. |
| 2012/0257569 A1 | 10/2012 | Jang et al. |
| 2012/0257570 A1 * | 10/2012 | Jang ................... H04L 5/001 370/328 |
| 2012/0257601 A1 * | 10/2012 | Kim ................... H04L 5/001 370/336 |
| 2012/0275378 A1 | 11/2012 | Lee |
| 2012/0275390 A1 | 11/2012 | Korhonen et al. |
| 2012/0281680 A1 | 11/2012 | Bostrom et al. |
| 2012/0287865 A1 | 11/2012 | Wu et al. |
| 2012/0294163 A1 | 11/2012 | Turtinen et al. |
| 2012/0300715 A1 | 11/2012 | Pelletier et al. |
| 2012/0300743 A1 | 11/2012 | Kim et al. |
| 2012/0300752 A1 | 11/2012 | Kwon et al. |
| 2012/0307811 A1 | 12/2012 | Kwon et al. |
| 2012/0314652 A1 | 12/2012 | Ahn et al. |

(56) References Cited

U.S. PATENT DOCUMENTS

| | | |
|---|---|---|
| 2012/0314675 A1 | 12/2012 | Vujcic |
| 2012/0322453 A1 | 12/2012 | Weng et al. |
| 2012/0327804 A1 | 12/2012 | Park et al. |
| 2013/0010619 A1 | 1/2013 | Fong et al. |
| 2013/0010684 A1 | 1/2013 | Park et al. |
| 2013/0010704 A1 | 1/2013 | Kronquist et al. |
| 2013/0010711 A1* | 1/2013 | Larsson ............ H04W 56/0005 370/329 |
| 2013/0010712 A1 | 1/2013 | Kim et al. |
| 2013/0021980 A1 | 1/2013 | Yang et al. |
| 2013/0028069 A1 | 1/2013 | Pelletier et al. |
| 2013/0028185 A1 | 1/2013 | Wu |
| 2013/0028198 A1* | 1/2013 | Yamada ............ H04W 56/0005 370/329 |
| 2013/0028236 A1 | 1/2013 | Jung et al. |
| 2013/0034085 A1 | 2/2013 | Bostrom et al. |
| 2013/0039294 A1* | 2/2013 | Wang ................ H04W 74/0833 370/329 |
| 2013/0044617 A1 | 2/2013 | Boixadera et al. |
| 2013/0044831 A1 | 2/2013 | Narasimha et al. |
| 2013/0044843 A1 | 2/2013 | Malkamaki et al. |
| 2013/0058309 A1 | 3/2013 | Kuo |
| 2013/0058315 A1 | 3/2013 | Feuersanger et al. |
| 2013/0064165 A1 | 3/2013 | Chen et al. |
| 2013/0064195 A1 | 3/2013 | Chang |
| 2013/0070726 A1 | 3/2013 | Zhang et al. |
| 2013/0072246 A1 | 3/2013 | Nobukiyo et al. |
| 2013/0078913 A1 | 3/2013 | Lee et al. |
| 2013/0083675 A1* | 4/2013 | Yamada ................ H04W 24/08 370/252 |
| 2013/0083747 A1 | 4/2013 | Narasimha et al. |
| 2013/0083753 A1 | 4/2013 | Lee et al. |
| 2013/0084913 A1 | 4/2013 | Gaal et al. |
| 2013/0094433 A1 | 4/2013 | Nagata et al. |
| 2013/0094466 A1 | 4/2013 | Kim et al. |
| 2013/0100938 A1 | 4/2013 | Kwon et al. |
| 2013/0114398 A1 | 5/2013 | Wang |
| 2013/0114505 A1 | 5/2013 | Haim et al. |
| 2013/0114574 A1* | 5/2013 | Ng .................... H04W 56/0045 370/336 |
| 2013/0148592 A1 | 6/2013 | Noh et al. |
| 2013/0155898 A1 | 6/2013 | Yin et al. |
| 2013/0163550 A1 | 6/2013 | Marinier et al. |
| 2013/0176988 A1 | 7/2013 | Wang et al. |
| 2013/0188473 A1 | 7/2013 | Dinan |
| 2013/0188580 A1 | 7/2013 | Dinan |
| 2013/0188617 A1 | 7/2013 | Dinan |
| 2013/0188619 A1 | 7/2013 | Dinan |
| 2013/0188620 A1 | 7/2013 | Dinan |
| 2013/0194908 A1 | 8/2013 | Gao et al. |
| 2013/0195048 A1 | 8/2013 | Ekpenyong et al. |
| 2013/0195084 A1 | 8/2013 | Chen et al. |
| 2013/0208601 A1 | 8/2013 | Cui et al. |
| 2013/0235807 A1 | 9/2013 | Lee et al. |
| 2013/0242892 A1 | 9/2013 | Ye |
| 2013/0242911 A1 | 9/2013 | Heo et al. |
| 2013/0250925 A1 | 9/2013 | Lohr et al. |
| 2013/0258957 A1 | 10/2013 | Dinan |
| 2013/0258958 A1 | 10/2013 | Dinan |
| 2013/0272229 A1 | 10/2013 | Dinan |
| 2013/0279434 A1 | 10/2013 | Dinan |
| 2013/0279435 A1 | 10/2013 | Dinan |
| 2013/0279486 A1 | 10/2013 | Kato et al. |
| 2013/0315214 A1 | 11/2013 | Bai et al. |
| 2013/0329675 A1 | 12/2013 | Dinan |
| 2013/0343358 A1 | 12/2013 | Kato et al. |
| 2014/0016559 A1 | 1/2014 | Jang et al. |
| 2014/0016593 A1 | 1/2014 | Park et al. |
| 2014/0023043 A1 | 1/2014 | Yang et al. |
| 2014/0029575 A1 | 1/2014 | Zeng et al. |
| 2014/0029586 A1 | 1/2014 | Loehr et al. |
| 2014/0050205 A1 | 2/2014 | Ahn et al. |
| 2014/0056244 A1 | 2/2014 | Frenne et al. |
| 2014/0079032 A1 | 3/2014 | Bergstrom et al. |
| 2014/0086182 A1 | 3/2014 | Shin et al. |
| 2014/0086213 A1 | 3/2014 | Kwon et al. |
| 2014/0092812 A1 | 4/2014 | Jang et al. |
| 2014/0105192 A1 | 4/2014 | Park et al. |
| 2014/0112308 A1 | 4/2014 | Kwon et al. |
| 2014/0185595 A1 | 7/2014 | Wu et al. |
| 2014/0192798 A1 | 7/2014 | Yang et al. |
| 2014/0198748 A1 | 7/2014 | Lee et al. |
| 2014/0219185 A1 | 8/2014 | Etemad et al. |
| 2014/0307670 A1 | 10/2014 | Kim et al. |
| 2014/0308956 A1 | 10/2014 | Zhang et al. |
| 2014/0321406 A1* | 10/2014 | Marinier ................ H04B 7/024 370/329 |
| 2014/0321442 A1 | 10/2014 | Kim et al. |
| 2014/0328326 A1 | 11/2014 | Gunnarsson et al. |
| 2014/0334448 A1 | 11/2014 | Langereis et al. |
| 2014/0348078 A1 | 11/2014 | Kim et al. |
| 2014/0349713 A1* | 11/2014 | Yamada ................ H04L 1/0618 455/561 |
| 2014/0369317 A1 | 12/2014 | Ye |
| 2015/0031409 A1 | 1/2015 | Ahn et al. |
| 2015/0031410 A1 | 1/2015 | Lim et al. |
| 2015/0036601 A1 | 2/2015 | Kim et al. |
| 2015/0043524 A1 | 2/2015 | Kim et al. |
| 2015/0063245 A1 | 3/2015 | Gao et al. |
| 2015/0063262 A1 | 3/2015 | Ji et al. |
| 2015/0071236 A1 | 3/2015 | Baldemair et al. |
| 2015/0208358 A1 | 7/2015 | Ahn et al. |
| 2015/0296542 A1 | 10/2015 | Heo et al. |
| 2016/0080126 A1 | 3/2016 | Dinan |
| 2016/0100372 A1 | 4/2016 | Dinan |
| 2016/0249299 A1 | 8/2016 | Ahn et al. |

FOREIGN PATENT DOCUMENTS

| | | |
|---|---|---|
| WO | 2011085200 A1 | 7/2011 |
| WO | 2011120716 A1 | 10/2011 |
| WO | 2014085967 A1 | 6/2014 |

OTHER PUBLICATIONS

3GPP TSG-RAN WG2 Meeting #75bis R2-114968 Oct. 10-14, 2011, Zhuhai, China Source: Panasonic Title: Message 2 reception in RA procedure for SCell.

3GPP TSG RAN WG2 #75bis R2-114977 Oct. 10-14, 2011, Zhuhai, China Source: Potevio Title: UE Behaviour on Multi-RA Procedures.

3GPP TSG-RAN WG2 Meeting #75bis R2-115042 Zhuhai, China, Oct. 10-14, 2011 Source: Fujitsu Title: Remaining issues on SCell RA procedure.

3GPP TSG-RAN WG2 Meeting #75bis R2-115147 Zhuhai, China, Oct. 10-14, 2011 Source: Renesas Mobile Europe Ltd. Title: Open issues for RACH procedure.

3GPP TSG-RAN WG2 #75bis Tdoc R2-115156 Zhuhai, China, Oct. 10-14, 2011 Title: Random Access Response in multiple TA Source: Research in Motion, UK Limited.

3GPP TSG-RAN WG2#75bis R2-115174 Zhuhai, China, Oct. 10-14, 2011 Source: Sharp Title: A special SCell for CA enhancement.

3GPP TSG-RAN2#75bis R2-115302 Oct. 10-14, 2011, Zhuhai, China Source: New Postcom Title: Open issues of RACH on SCell. TSG-RAN WG2#75bis R2-115338 Oct. 10-14, 2011, Zhuhai, China Title: RACH on SCell Source: Alcatel-Lucent, Alcatel-Lucent Shanghai Bell.

3GPP TSG-RAN2 Meeting #75bis R2-115399 Oct. 10-14, 2011, Zhuhai, Chian Source : LG Electronics Inc. Title : RACH applicability and TA group.

3GPP TSG-RAN WG2 #75bis Tdoc R2-115409 Zhuhai, China, Oct. 10-14, 2011 Source: InterDigital Communications Title: Prioritization between RACH Procedures in LTE CA.

3GPP TSG RAN WG2 Meeting #75-bis R2-115449 Zhuhai, China, Oct. 10-14, 2011 Source: NTT Docomo, Inc. (Email discussion rapporteur) Title: Summary of email discussion [75#33]—LTE: Carrier Aggregation scenarios and resulting requirements.

(56) References Cited

OTHER PUBLICATIONS

3GPP TSG-RAN WG2 #75bis Tdoc R2-115463 Zhuhai, China, Oct. 10-14, 2011—Source: Ericsson, ST Ericsson Title: SCell Random Access Prioritization.
3GPP TSG-RAN WG2 #76 Tdoc R2-115743 San Francisco, United States, Nov. 14-18, 2011 Source: Ericsson, ST Ericsson Title: Random Access Response on an SCell.
3GPP TSG-RAN WG2 Meeting #76 R2-115754 San Francisco, United States, Nov. 14-18, 2011 Source: ZTE Title: MSG2 Position for MTA RA.
3GPP TSG-RAN WG2 Meeting #76 R2-115782 San Francisco, USA, Nov. 14-18, 2011 Source: Renesas Mobile Europe Ltd. Title: RACH procedure on SCell.
3GPP TSG-RAN WG2 Meeting #76 R2-115890 Nov. 14-18, 2011, San Francisco, USA Source: HT mMobile Inc. Title: Initiating RA procedure on SCell.
3GPP TSG-RAN WG2 #76 Tdoc R2-116111 San Francisco, USA, Nov. 14-18, 2011 Source: InterDigital Communications Title: MSG1 Transmission for RACH Procedure for SCells.
3GPP TSG-RAN2 Meeting #76 R2-116225 Nov. 14-18, 2011, San Francisco, USA Source: LG Electronics Inc. Title: Scell RACH trigger.
3GPP TSG-RAN2 Meeting #76 R2-116228 Nov. 14-18, 2011, San Francisco, USA Source: LG Electronics Inc. Title: RACH applicability and TA group.
3GPP TSG-RAN WG2 Meeting #76 R2-16309 San Francisco, USA, Nov. 14-18, 2011 Source: Fujitsu Title: Trigger of RA procedure on SCell(s).
3GPP TSG-WG2 Meeting #76 R2-116503 San Francisco, USA, Nov. 14-18, 2011 Updates of Carrier Aggregation agreements (WI R2-111115) Rapporteur (Nokia Corporation).
TSG-RAN WG2#74 R2-113235 May 9-13, 2011, Barcelona, Spain Title: Initiating timing alignment for SCell in multiple TA Source: Alcatei-Lucent, Alcatei-Lucent Shanghai Bell.
3GPP TSG-RAN WG2 Meeting #73bis €R2-111880 Shanghai, China, Apr. 11-15, 2011 Title: Corrections to CA related IE descriptions Source to WG: Potevio.
3GPP TSG-RAN WG2 #74 Tdoc R2-113255 Barcelona, Spain, May 9-13, 2011 Source: InterDigital Communications Title: Support for multiple Timing Advance in LTE CA.
3GPP TSG-RAN WG2 #74 Tdoc R2-113258 Barcelona, Spain, May 9-13, 2011 Source: InterDigital Communications Title: Support for RACH on SCells in LTE CA.
3GPP TSG-RAN WG1 Meeting #65 R1-111577 Barcelona, Spain, May 9-13, 2011 Source: Panasonic Title: Simultaneous SRS transmission on multiple component carriers.
3GPP TSG-RAN1 Meeting #65 R1-111893 Barcelona, Spain, 81h-131h May 2011 Title: Correction to simultaneous transmission of SRS and PUCCH format 2/2a/2b Source: ZTE, Qualcomm Inc.
3GPP TSG-RAN WG2 Meeting #74 R2-113014 Barcelona, Spain, May 9-13, 2011 Source: Renesas Mobile Europe Title: Multiple timing advance using multiple RACH.
3GPP TSG-RAN WG2 Meeting#72bis, Tdoc R2-110356 Dublin, Ireland, Jan. 17-21, 2011 Source: ITRI Title: RF Receiver Information in UE Capability Signalling.
3GPP TSG-RAN WG2 Meeting #75bis R2-115181 Zhuhai, China, Oct. 10-14, 2011 Source: Nokia Siemens Networks, Nokia Corporation Title: TA group configuration and reconfiguration.
3GPP TSG-RAN WG2 Meeting #76 R2-115757 San Francisco, USA, Nov. 14-18, 2011 R2-114939 Source: Nokia Siemens Networks, Nokia Corporation Title: MAC Downlink Signalling for Multiple TA.
3GPP TS 36.331 V10.0.0 (Dec. 2010), 3rd Generation Partnership Project; Technical Specification Group Radio Access Network; Evolved Universal Terrestrial Radio Access (E-UTRA); Radio Resource Control (RRC); Protocol specification (Release 10).
3GPP TS 36.213 V10.0.0 (Dec. 2010), 3rd Generation Partnership Project; Technical Specification Group Radio Access Network; Evolved Universal Terrestrial Radio Access (E-UTRA); Physical layer procedures (Release 10).

3GPP TSG RAN WG2 Meeting #76, R2-115791 San Francisco, USA, Nov. 14-18, 2011 Source: CATT Title: Signaling for TAG configuration.
3GPP TSG RAN WG2 Meeting #77bis R2-121140 Jeju, Korea, Mar. 26-30, 2012 Source: CATT Title: Consideration on Multi-TA Capability.
3GPP TSG-RAN WG2 meeting #77bis R2-121178 Jeju, South Korea, Mar. 26-30, 2012 Source: Qualcomm Incorporated Title: Timing reference cell for secondary TA group.
3GPP TSG RAN WG2 Meeting #78 R2-122264 Prague, Czech Republic, May 21-25, 2012 Source: New Postcom Title: Remaining issued of TAG configuration.
3GPP TSG-RAN WG2 Meeting #77bis R2-121139 Jeju, Korea, Mar. 26-30, 2012 Source: CATT Title: RACH Configuration in sTAG.
3GPP TS 36.211 V10.0.0 (Dec. 2010), 3rd Generation Partnership Project; Technical Specification Group Radio Access Network; Evolved Universal TerrestrialRadio Access (E-UTRA); Physical channels and modulation (Release 10).
3GPP TSG RAN WG2 Meeting #78 R2-122267 Prague, Czech Republic, May 21-25, 2012 Source: New Postcom Title: Considerations on remaining issues of TAG change.
3GPP TSG RAN WG2#77bis R2-121404 Jeju Island, Korea, Mar. 26-30, 2012 Source: Samsung Title: Remaining issue on random access failure for SCell.
TSG-RAN WG2#77bis R2-121690 Mar. 26-30, 2012 Jeju, Korea Title: Timing reference for SCell TA group Source: Alcatel-Lucent, Alcatel-Lucent Shanghai Bell.
3GPP TSG-RAN WG2 Meeting #77 R2-120088 Dresden, Germany, Feb. 6-10, 2012 Source: Nokia Siemens Networks, Nokia Corporation Title: Pathloss Reference for sTAG.
3GPP TSG-RAN WG2 Meeting #78 R2-122385 Prague, Czech Republic, May 21-25, 2012 Source : LG Electronics Inc. Title : TAG Re-association Procedure in CA.
3GPP TSG-RAN2#78 R2-122386 Prague, Czech Republic, May 21-25, 2012 Source: NTT Docomo, Inc. Title: SCell status at TAG change.
3GPP TSG-RAN WG2 Meeting #77bis R2-121181 Jeju, South Korea, Mar. 26-30, 2012 (Resubmission of R2-120089) Source: Nokia Siemens Networks, Nokia Corporation Title: RLM on SCells.
3GPP TSG-RAN2 #77 meeting Tdoc R2-120221 Dresden, Germany, Feb. 6-10, 2012 Sauce: MediaTek Title: Discussion on timing reference in sTAG.
3GPP TSG-RAN WG2#78 R2-122454 Prague, Czech Republic, May 21-25, 2012 Source: Sharp Title: Remaining issues of TA group handling.
3GPP TSG-RAN2#76 meeting Tdoc R2-116340 San Francisco. USA, Nov. 14-18, 2011, Source: HTC Title: TA group configuration and reconfiguration.
TSG-RAN WG2#77 R2-120605 Feb. 6-10, 2012, Dresden, Germany Title: Timing reference for SCell TA group Source: Alcatel-Lucent, Alcatel-Lucent Shanghai Bell.
3GPP TSG RAN WG2 Meeting #78 R2-122852 Prague, Czech Republic, May 21-25, 2012 Source: Fujitsu Title: On the TAG change procedure.
3GPP TSG RAN WG2 Meeting #78 R2-122908 Prague, Czech, May 21-25, 2012 Source: Pantech Title: Considerations on Multiple TA capability.
3GPP TSG RAN WG2 Meeting #77bis R2-121189 Jeju, Korea, Mar. 26-30, 2012 Source: New Postcom Title: Considerations on RACH failure handling on SCell.
3GPP TSG-RAN WG2 Meeting #77bis R2-121182 Jeju, South Korea, Mar. 26-30, 2012 (Resubmission of R2-120088) Source: Nokia Siemens Networks, Nokia Corporation Title: Pathloss Reference for sTAG.
3GPP TSG-RAN2 Meeting #78 R2-123022 Prague, Czech Republic, May 21-25, 2012 Change Request: 36300 CR 438 rev 1 Current version: 11.1.0 Title: Introduction of Carrier aggregation enhancements Source to WG: Rapporteur (Nokia Corporation).
3GPP TSG-RAN WG2 #77b R2-121409 Jeju, Korea, Mar. 26-30, 2012 Source: Acer Incorporated Title: Analysis of RA failure Handling.

(56) References Cited

OTHER PUBLICATIONS

3GPP TSG RAN WG2 Meeting #77bis R2-121307 Jeju, South Korea, Mar. 26-30, 2012 Source: Pantech Title: Deactivation of Timing Reference Cell.
3GPP TSG RAN WG1 Meeting #66bis R1-113187 Zhuhai, China, Oct. 10-14, 2011 Source: LG Electronics Title: Discussion on Simultaneous Uplink ChannelTransmission in Rel-11.
3GPP TSG RAN WG1 Meeting #66bis R1-113314 Zhuhai, China, Oct. 10-14, 2011 Source: Alcatel-Lucent, Alcatel-Lucent Shanghai Bell Title: Multiple Timing Advances for Carrier Aggregation.
3GPP TSG-RAN2#77bis R2-121193 Jeju, South Korea, Mar. 26-30, 2012 Source: NTT Docomo, Inc. Title: Radio link monitoring for Scell in Rel-11.
3GPP TSG-RAN WG2 Meeting #77bis R2-121403 Jeju, Korea, Mar. 26-30, 2012 Source: Renesas Mobile Europe Title: Discussion on error case handling of the timing reference of sTAG.
3GPP TSG RAN WG1 Meeting #67 R1-113910 San Francisco, USA, Nov. 14-18, 2011 Source: LG Electronics Title: Aspect on Simultaneous Transmission of PRACH and UL Channels considering Multiple Timing Advance.
3GPP TSG-RAN WG2 Meeting #77Bis R2-121241 Jeju Island, Korea, Mar. 26-30, 2012 Source: ZTE Corporation Title: Pathloss and RLM for MTA.
3GPP TSG-RAN WG2 #75bis Tdoc R2-115463 Zhuhai, China, Oct. 10-14, 2011 Source: Ericsson, ST Ericsson Title: SCell Random Access Prioritization.
3GPP TSG-RAN WG2 Meeting#77bis Tdoc R2-121530 Mar. 26-30, 2012, Jeju, Korea Source: ITRI Title: Deactivation of Timing Reference SCell in sTAG.
3GPP TSG RAN WG1 Meeting #68bis R1-120974 Jeju, Korea, Mar. 26-30, 2012 Source: Huawei, HiSilicon Title: Consideration on simultaneous transmission for UL channels in case of MTA.
3GPP TSG-RAN WG1 #68bis R1-121020 Jeju Island, Korea, Mar. 26-30, 2012 Source: Ericsson, ST-Ericsson Title: Channel Prioritization due to Multiple TA.
3GPP TS 36.321 V11.0.0 (Sep. 2012), 3rd Generation Partnership Project; Technical Specification Group Radio Access Network; Evolved Universal Terrestrial Radio Access (E-UTRA); Medium Access Control (MAC) protocol specification (Release 11).
3GPP TSG-RAN WG2 Meeting #77bis R2-121713 Jeju, Korea, Mar. 26-30, 2012 Source: Potevio Title: Considerations on timing reference change for sTAG.
3GPP TSG RAN WG1 Meeting #68 bis R1-121064 Jeju, Korea, Mar. 26-30, 2012 Source: ZTE Title: Consideration on remaining issues related to multiple TA.
3GPP TSG RAN WG2 #77 bis R2-121529 Jeju, Korea, Mar. 26-30, 2012 Source: ITRI Title: Discussion on whether to stop RA procedure when RA failure occurs.
3GPP TSG RAN WG2 #69bis R2-102395 Beijing, China, Apr. 12-16, 2010 Source: Qualcomm Incorporated Title: UL and DL Component Carrier Linking.
3GPP TSG-RAN WG1 Meeting #68bis R1-121141 Jeju, Korea, Mar. 26-30, 2012 Source: Panasonic Title: UE behavior for power limitation in multiple TA.
3GPP TSG RAN WG1 #68bis R1-121426 Jeju, Korea, Mar. 26-30, 2012 Source: LG Electronics Title: Power limitation in multiple TA.
3GPP TSG-RAN WG2 Meeting #77bis R2-121232 26-30 Mar. 2012, Jeju, Korea resubmission of R2-120246 Source: Panasonic Title: Issues on exceeding maximum timing difference of aggregated cells.
3GPP TSG-RAN WG2 Meeting #75bis R2-115042 Zhuhai China, Oct. 10-14, 2011 Source: Fujitsu Title: Remaining issues on SCell RA procedure.
3GPP TSG RAN WG1 Meeting #68bis R1-121467 Jeju, Korea, Mar. 26-30, 2012 Source: NTT Docomo Title: UL Transmissions in Case of Power Limitation for Multiple TA.
3GPP TSG-RAN WG2 Meeting #77bis R2-121368, Jeju, Korea, Mar. 26-30, 2012, Source: LG Electronics Inc., Title: Performing RA procedure on cell other than the timing reference cell.
3GPP TSG-RAN WG1 Meeting #68 R1-120712 Dresden, Germany, Feb. 6-10, 2012 Source: Nokia Siemens Networks, Nokia Title: On Multiple Timing Advance in RAN1.
3GPP TSG RAN WG1 #68bis R1-121896 Jeju, Korea, Mar. 26-30, 2012 Joint proposal on SRS transmission with multiple TA—full overlap case LG Electronics. CATT, Pantech, Panasonic, Ericsson, ST-Ericsson.
3GPP TSG-RAN WG2 Meeting #76 R2-115755 San Francisco, U.S., Nov. 14-18, 2011 Source: ZTE Title: Discussion on RACH collide with other UL transmission.
3GPP TS 36.321 V10.4.0 (Dec. 2011), 3rd Generation Partnership Project; Technical Specification Group Radio Access Network; Evolved Universal Terrestrial Radio Access (E-UTRA); Medium Access Control (MAC) protocol specification (Release 10).
3GPP, "TS 36.213 v10.3.0", Sep. 2011.
3GPP TSG-RAN WG2 Meeting #76 R2-115882 Nov. 14-18, 2011, San Francisco, USA Source: Panasonic Title: Parallel PRACH and PUSCH/PUCCH transmission.
3GPP TSG-RAN WG2 Meeting #77bis R2-121711 Jeju, Korea, Mar. 26-30, 2012 Source: Potevio Title: Random Access Failures Handling on SCells.
3GPP TSG RAN WG1 #67 R1-113975 San Francisco, USA, Nov. 14-18, 2011 Source: LG Electronics Title: RAN1 issues in supporting multiple timing advances.
3GPP TSG-RAN WG2#77bis meeting R2-121712, Jeju, Korea, Mar. 26-30, 2012, Source: Samsung, Title: Timing reference for sTAG.
TSG-RAN WG2#76 R2-116184 Nov. 14-18, 2011, San Francisco, USA Title: Simultaneous transmissions of RACH and PUCCH/PUSCH/SRS Source: Alcatel-Lucent, Alcatel-Lucent Shanghai Bell.
3GPP TSG-RAN WG2 Meeting #76 R2-116311 San Francisco, USA, Nov. 14-18, 2011 Source: Fujitsu Title: Collision between PUCCH and SCell PRACH.
3GPP TSG-RAN WG2 #77bis Tdoc R2-121278 Jeju, South Korea, Mar. 26-30, 2012 Title: Random Access Response in multiple TA Source: Research in Motion, UK Limited.
3GPP TS 36.300 V10.2.0 (Dec. 2010), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).
3GPP TSG-RAN WG2 Meeting #77 R2-120087 Dresden, Germany, Feb. 6-10, 2012 Source: NSN Title: [Draft] LS on timing reference for sTAG.
TSG-RAN WG2#77 R2-120604 Dresden, Germany, Feb. 6-10, 2012 Title: Pathloss reference for SCell TA group and need of RLM Source: Alcatel-Lucent, Alcatel-Lucent Shanghai Bell.
3GPP TSG RAN WG2 Meeting #74 R2-112815 Barcelona, Spain, May 9-13, 2011 Source: CATT Title: RA Procedure for Multi-TA.
3GPP TSG-RAN WG2 Meeting #74 R2-112876 Barcelona, Spain, May 9-13, 2011 Source: ZTE Title: Group Model in Multiple TA.
3GPP TSG-RAN2 #77bis Meeting Tdoc R2-121347 Jeju, Korea, Mar. 26-30, 2012 Source: MediaTek Inc. Title: Discussions on SCell RA procedure when reaching PREAMBLE_TRAN_MAX.
3GPP TSG RAN WG2 #74 R2-112878 Barcelona, Spain, May 9-13, 2011 Source: ZTE Title: Potential PHY Impact of RACH on Scell for MTA.
3GPP TSG RAN WG2 #77bis R2-121721 Mar. 26-30, 2012, Jeju, Korea Source: Intel Corporation Title: Further discussion on the open issues of RACH on SCell.
3GPP TSG RAN WG2 #77 bis R2-121528 Jeju, Korea, Mar. 26-30, 2012 revised from R2-120168 Source: ITRI Title: Pathloss reference configuration.
3GPP TSG-RAN1 Meeting #65 R1-111893 Barcelona, Spain, May 8-13, 2011 Title: Correction to simultaneous transmission of SRS and PUCCH format 2/2a/2b Source: ZTE, Qualcomm Inc.
3GPP TSG-RAN WG2#74 R2-113050 Barcelona, Spain, May 9-13, 2011 Source: Sharp Title: Considerations for RACH initiation on SCell.
3GPP TSG-RAN WG2 meeting #74 R2-113063 Barcelona, Spain, May 9-13, 2011 Source: Qualcomm Incorporated Title: Consideration on multiple TA.

(56) References Cited

OTHER PUBLICATIONS

3GPP TSG-RAN2 Meeting #77bis R2-121377 Mar. 26-30, 2012, Jeju, Korea Source: LG Electronics Inc. Title: Handling of SCell RACH Problem.
3GPP TSG RAN WG2 Meeting #76 R2-115738 San Francisco, USA, Nov. 14-18, 2011 Source: New Postcom Title: Considerations on TA group (re)configuration.
3GPP TSG-RAN WG2 Meeting #74 R2-113067 Barcelona, Spain, May 9-13, 2011 Source: Potevio Title: Random Access on SCell for Supporting Multi-TA.
3GPP TSG RAN WG2 Meeting #77 R2-120266 Feb. 6-10, 2012, Dresden, Germany Source: Intel Corporation Title: CA Signaling Enhancements for HetNet Type Deployments.
3GPP TSG-RAN2#74 meeting R2-113124 Barcelona, Spain, May 9-13, 2011 Souce: Samsung Title: Further discussions of Issues with Multiple-TA.
3GPP TSG RAN WG2 #74 R2-113192 Barcelona, Spain, May 9-13, 2011 Source: ITRI Title: Considerations on Random Access on SCell.
3GPP TSG-RAN WG2#77bis R2-121384 Jeju, Korea, Mar. 26-30, 2012 Source: Sharp Title: Remaining Issues of TA group handling.
3GPP TSG-RAN WG2 Meeting #76 R2-115827 San Francisco, USA, Nov. 14-18, 2011 Source: Huawei, HiSilicon Title: Signalling for the TA Group Management.
3GPP TSG-RAN2 Meeting #77bis R2-121233 Jeju, Korea, Mar. 26-30, 2012 Source: Panasonic Title: TAG Composition and related aspects.
3GPP TSG-RAN WG2 Meeting #77bis R2-121799 Jeju, Korea, Mar. 26-30, 2012 Source: Fujitsu Title: Reaching PREAMBLE_TRANS_MAX.
3GPP TSG-RAN WG2 Meeting #76 R2-115817 San Francisco, USA, Nov. 14-18, 2011 Source: Potevio Title: Considerations on CBRA on SCell and Msg2 for SCell RA.
3GPP TSG RAN WG2 Meeting #77 R2-120252 Dresden, Germany, Feb. 6-10, 2012 Source: CATT Title: Timing Reference Change.
3GPP TSG-RAN WG2 Meeting #78 R2-122313 Prague, Czech Republic, May 21-25, 2012 Source: Huawei, HiSilicon Title: TAG change procedure for the SCell.
3GPP TSG RAN WG2 Meeting #77 R2-120799 Dresden, Germany, Feb. 6-10, 2012 Source: CATT Title: Timing Reference Change.
3GPP TSG-RAN WG2 Meeting#77 Tdoc R2-120166 Feb. 6-10, 2012, Dresden, Germany Source: ITRI Title: Deactivation of DL Timing Reference in sTAG.
3GPP TSG RAN WG2 Meeting #77bis R2-121192 Jeju, Korea, Mar. 26-30, 2012 Source: New Postcom Title: Path loss reference and RLM on SCell.
3GPP TSG-RAN WG2 #77, R2-120218 Dresden, Germany, Feb. 6-10, 2012 Source: Sharp Title: TA group handling.
3GPP TSG-RAN2 #77bis Meeting R2-121338 Jeju, Korea, Mar. 26-30, 2012 Source: MediaTek Inc. Title: Error case for timing reference.
3GPP TSG-RAN WG2 #77 R2-120821 Feb. 6-10, 2012, Dresden, Germany Source: Intel Corporation Title: Remaining open issues on timing and pathloss reference for sTAG.
3GPP TSG-RAN WG2 Meeting #77bis R2-121428 Jeju, Korea, Mar. 26-30, 2012 Source: Huawei, HiSilicon Title: Path loss reference for STAG.
3GPP TS 36.212 V10.0.0 (Dec. 2010), 3rd Generation Partnership Project; Technical Specification Group Radio Access Network; Evolved Universal Radio Access (E-UTRA); Multiplexing and channel coding (Release 10).
3GPP TSG-RAN WG2 #77bis Tdoc R2-121557 Jeju, Korea, Mar. 26-30, 2012 Source: Ericsson Title: Summary of e-mail discussion [77#26] LTE: CA: Timing reference for SCell-only TA groups.
3GPP TSG-RAN WG2 Meeting #77bis R2-121366 Jeju, South Korea, Mar. 26-30, 2012 Source : LG Electronics Inc. Title : Handling of the Timing Reference SCell Deactivation.
3GPP TSG RAN WG2 #77bis R2-121724 Jeju, Korea, Mar. 26-30, 2012 Source: Intel Corporation Title: Remaining issues on timing reference for sTAG.

3GPP TSG-RAN2 Meeting #77bis R2-121869 Jeju, Korea, Mar. 26-30, 2012 Source: Ericsson Title: Introduction of CA Enhancements in MAC.
3GPP TSG-RAN WG2 #77bis Tdoc R2-121559 Jeju, South Korea, Mar. 26-30, 2012 Source: Ericsson, ST Ericsson Title: Timing reference for SCells.
3GPP TSG RAN WG1 Meeting #68bis R1-121084 Jeju, Korea, Mar. 26-30, 2012 Source: CATT Title: UL transmission method with multiple timing advances in Rel-11.
3GPP TSG-RAN WG2 #77 R2-120229, Dresden, Germany, Feb. 6-10, 2012, Source : Acer Incorporated, Title : Changing of DL Timing Reference.
3GPP TSG-RAN2 #73bis meeting Tdoc R2-113101 Barcelona, Spain, May 9-13, 2011 Souce: MediaTek Title: Grouping of multi-TA.
3GPP TSG RAN WG2 Meeting #77bis R2-121190 Jeju Island, Korea, Mar. 26-30, 2012 Source: New Postcom Title: Considerations on TAG change procedure.
3GPP TSG RAN WG2 Meeting #78 R2-122173 Prague, Czech Republic, May 21-25, 2012 Source: CATT Title: Detail on TAG Configuration.
3GPP TSG-RAN2 Meeting #76 R2-116225 Nov. 14-18, 2011, San Francisco, USA Source : LG Electronics Inc. Title : Scell RACH trigger.
3GPP TSG-RAN WG2 Meeting #73bis R2-111880 Shanghai, China, Apr. 11-15, 2011 Title: Corrections to CA related IE descriptions Source to WG: Potevio.
3GPP TSG-RAN WG2 Meeting #74 R2-112806 May 9-13, 2011, Barcelona, Spain Source: Panasonic Title: RACH on SCell for supporting Multiple Timing Advance.
3GPP TSG-RAN2 Meeting #77bis, R2-121899, Jeju, Korea, Mar. 26-30, 2012 Change Request 36.300.
3GPP TSG-RAN2 Meeting #76 R2-116228 Nov. 14-18, 2011, San Francisco, USA Source : LG Electronics Inc. Title : RACH applicability and TA group.
3GPP TSG-RAN WG2 Meeting #76 R2-115756 Nov. 4-18, 2011, San Francisco, USA Source: ZTE Title: TA Group management.
TSG-RAN WG2#78 R2-1212738 Prague, Czech Republic, May 21-25, 2012 Title: TAG related signalling Source: Alcatel-Lucent, Alcatel-Lucent Shanghai Bell.
3GPP TSG RAN WG2 Meeting #77 R2-120731 Dresden, Germany, Feb. 6-10, 2012 Source: Fujitsu Title: Further consideration on the TAG change procedure.
3GPP TSG RAN WG1 #68bis, R1-121425 Jeju, Korea, Mar. 26-30, 2012 Source: LG Electronics Title: SRS transmissions in multiple TA.
3GPP TSG-RAN WG2 Meeting #76 R2-116310 San Francisco, USA, Nov. 14-18, 2011 Source: Fujitsu Title: Remaining issues on SCell RA procedure.
3GPP TSG-RAN WG2 #76 Tdoc R2-115932 San Francisco, United States, Nov. 14-18, 2011 Source: Ericsson, ST Ericsson Title: Parallel Transmission of Preamble and UL Data.
3GPP TSG RAN WG2 #77 R2-120168 Dresden, Germany, Feb. 6-10, 2012 Source: ITRI Title: Consideration on FFS of pathloss reference configuration.
3GPP TSG RAN WG1 Meeting #67 R1-113727 San Francisco, USA, Nov. 14-18, 2011 Source: CATT Title: Support of multiple timing advances in LTE-A Rel-11 with CA.
3GPP TSG-RAN WG2 Meeting #76 R2-115804 San Francisco, USA, Nov. 14-18, 2011 Source: Nokia Siemens Networks, Nokia Corporation Title: RA procedure on SCell.
3GPP TSG RAN WG1 Meeting #67 R1-114093 San Francisco, USA, Nov. 14-18, 2011 Source: Huawei, HiSilicon Title: RACH based multiple timing advances.
3GPP TSG RAN WG2 Meeting #76 R2-115789 San Francisco, USA, Nov. 14-18, 2011 Source: CATT Title: CBRA on SCell.
3GPP TSG-RAN WG2 Meeting #77 R2-120086 Dresden, Germany, Feb. 6-10, 2012 Source: Nokia Siemens Networks, Nokia Corporation Title: Timing Reference for sTAG.
3GPP TSG RAN WG1 Meeting #68 R1-120093 Dresden, Germany, Feb. 6-10, 2012 Source: CATT Title: UL power contol with multiple timing advances in Rel-11.

(56) References Cited

OTHER PUBLICATIONS

3GPP TSG RAN WG2 Meeting #74 R2-112925 Barcelona, Spain, May 9-13, 2011 Source: New Postcom Title: Analysis of PCell change on single and multiple TA scenarios.
3GPP TSG-RAN WG1 Meeting #68 R1-120130 Dresden, Germany, Feb. 6-10, 2012 Source: InterDigital Communications, LLC Title: Simultaneous UL transmissions in presence of R11 Multiple TA.
3GPP TSG-RAN WG2 Meeting #77bis R2-121230 Mar. 26-30, 2012, Jeju, Korea (update of R2-120247) Source: Panasonic Title: Handling loss of Timing/ Pathloss Reference Cell.
3GPP TSG RAN WG1 Meeting #68 R1-120286 Dresden, Germany, Feb. 6-10, 2012 Source: ZTE Title: Consideration on issues related to multiple TA.
3GPP TSG-RAN WG1 #68bis R1-121551 Jeju, Korea, Mar. 24-30, 2012 Source: Qualcomm Incorporated Title: Power control aspects of multiple TA operation.
3GPP TSG RAN WG1 #68 R1-110424 Dresden, Germany, Feb. 6-10, 2012 Source: LG Electronics Title: Simultaneous transmissions in multiple TA groups.
3GPP TSG RAN WG2 Meeting #77 R2-120732 Dresden, Germany, Feb. 6-10, 2012 Source: Fujitsu Title: Discussion on PHR for SCell in Rel-11.
3GPP TSG RAN WG1 Meeting #68 R1-120486 Dresden, Germany, Feb. 6-10, 2012 Source: Alcatel-Lucent, Alcatel-Lucent Shanghai Bell Title: Power scaling for simultaneous transmissions of multiple UL channels with multiple TA groups.
3GPP TSG-RAN WG2 Meeting #76 R2-115805 San Francisco, USA, Nov. 14-18, 2011 Source: Nokia Siemens Networks, Nokia Corporation Title: TA group signalling.
3GPP TSG RAN WG1 #68 R1-120540 Feb. 6-10, 2012, Dresden, Germany Source: Qualcomm Incorporated Title: Power control aspects of multiple TA operation.
3GPP TSG RAN WG1 Meeting #67 R1-113961 San Francisco, USA, Nov. 14-18, 2011 Title: RACH Procedure or Multiple Timing Advances Source: Research in Motion, UK Limited.
3GPP TSG RAN WG1 #68 R1-120918 Dresden, Germany, Feb. 6-10, 2012 Proposal on PUSCH/PUCCH transmission with multiple TA LG Electronics, Panasonic, Ericsson, ST-Ericsson, Pantech, Texas Instruments.
3GPP TSG RAN WG1 Meeting #68 R1-120946 Dresden, Germany, Feb. 6-10, 2012 Title: LS on simultaneous transmission of PUSCH/PUCCH/SRS for multiple TA Source: TSG RAN WG1.
3GPP TSG-RAN WG2 #77 R2-120264 Feb. 6-10, 2012, Dresden, Germany Source: Intel Corporation Title: Remaining open issues on timing and pathloss reference for sTAG.
3GPP TS 36.321 V10.0.0 (Dec. 2010), 3rd Generation Partnership Project; Technical Specification Group Radio Access Network; Evolved Universal Terrestrial Radio Access (E-UTRA); Medium Access Control (MAC) protocol specification (Release 10).
3GPP TSG RAN WG2 Meeting #77bis R2-121309, Jeju, South Korea, Mar. 26-30, 2012, Source: Pantech, Title: RAR MAC CE with C-RNTI.
3GPP TSG-RAN2 #73bis meeting Tdoc R2-113102 Barcelona, Spain, May 9-13, 2011 Souce: MediaTek Title: Transmission of SCell RACH.
3GPP TSG RAN WG2 Meeting #77bis R2-121493 Jeju, South Korea, Mar. 26-30, 2012 Source: New Postcom Title: Considerations on Downlink Timing reference in sTAG.
3GPP TSG-RAN WG1 #68 R1-120075 Dresden, Germany, Feb. 6-10, 2012 Source: Ericsson, ST-Ericsson Title: Power scaling due to multiple TA values.
3GPP TSG RAN WG1 Meeting #68 R1-120221 Dresden, Germany, Feb. 6-10, 2012 Source: Panasonic Title: Simultaneous transmissions in multiple TA.
3GPP TSG RAN WG1 #68 R1-120462 Dresden, Germany, Feb. 6-10, 2012 Source: Texas Instruments Title: Physical layer aspects of multiple timing advance commands.
3GPP TSG RAN2#74 meeting R2-113215 Barcelona, Spain, May 9-13, 2011 Source: Intel Corporation Title: Configuration of multiple TA in Rel-11 CA.
3GPP TSG RAN WG1 Meeting #68 R1-120915 Dresden, Germany, Feb. 6-10, 2012 Title: [Draft] LS on simultaneous transmission of PUSCH/PUCCH/SRS for multiple TA Source: Panasonic [TSG RAN WG1].
3GPP TSG-RAN WG2 Meeting #77bis R2-121130 Jeju, South Korea, Mar. 26-30, 2012 Agenda item: 7.1.2.3 Source: Qualcomm Incorporated Title: UE indication of UL timing loss for secondary TA group.
Adaptive Video Coding for Mobile Wireless Networks by Benjamin Belzer, Judy Liao, John D. Villasenor, IEEE Compt. Soc. Press (1994).
3GPP TSG-RAN WG2 Meeting #77 R2-120076 Dresden, Germany, Feb. 6-10, 2012 Source: ASUSTeK Title: Further consideration on timing reference for sTAG.
3GPP TSG RAN WG2 Meeting #78, R2-123022 Prague, Czech Republic, May 25, 2011, Title: Introduction of Carrier Aggregation enhancements.
3GPP TSG RAN WG2 Meeting #77bis R2-121798 Jeju, Korea, Mar. 26-30, 2012 Source: Fujitsu Title: Further consideration on the TAG change procedure.
3GPP TSG RAN WG1 Meeting #68 R1-120317 Dresden, Germany, Feb. 6-10, 2012 Source: Pantech Title: Issues on parallel transmission in multiple TA environments.
TSG-RAN WG2#74 R2-113235 May 9-13, 2011, Barcelona, Spain Title: Initiating timing alignment for SCell in multiple TA Source: Alcatel-Lucent, Alcatel-Lucent Shanghai Bell.
3GPP TSG RAN WG1 #68 R1-120919 Dresden, Germany, Feb. 6-10, 2012 proposal on SRS transmission with multiple TA LG Electronics, ZTE, Pantech, CATT.
3GPP TSG RAN WG2#77bis R2-121398 Jeju Island, Korea, Mar. 26-30, 2012 Souce: Samsung Title: Whether to allow configurable pathloss reference in STAG?.
3GPP TSG RAN WG1 Meeting #68 R1-120123 Dresden, Germany, Feb. 6-10, 2012 Source: Huawei, HiSilicon Title: Discussion on UL control signalling transmission with multiple TAs.
3GPP TSG-RAN WG2 Meeting #77 R2-120127 Dresden, Germany, Feb. 6-10, 2012 Source: Renesas Mobile Europe Title: Further analysis on timing reference for sTAG.
3GPP TSG RAN WG1 Meeting #68bis R1-121142 Jeju, Korea, Mar. 26-30, 2012 Source: Panasonic Title: SCell PRACH transmission timing.
3GPP TSG-RAN2#78 meeting Tdoc R2-122240 May 21-25, 2012, Prague, Czech Republic Source: ZTE Corporation Title: UE capability report for MTA.
3GPP TSG RAN WG1 #68 R1-120539 Feb. 6-10, 2012, Dresden, Germany Source: Qualcomm Incorporated Title: SRS operation in multiple TA offset CA.
3GPP TSG-RAN WG2#74 R2-113241 May 9-13, 2011, Barcelona, Spain Source: Motorola Mobility Title: Considerations for Supporting Multiple Timing Advances.
European Final Rejection—Ep Appl. 13702187.9—dated Nov. 28, 2016.
"MAC Downlink Signallink for Multiple TA"; Nokia Siemens Network et al: 3GPP Draft; R2-115747 Downlink Signalling for Multiple TA, 3rd Generation Partnership Project (3GPP), Mobile Competence Centre ; 650, Route Des Lucioles ; F-06921 Sophia-Antipolis Cedex ; France, vol. RAN WG2, no. San Francisco, USA; Nov. 14, 2011-Nov. 18, 2011, Nov. 7, 2011 (Nov. 7, 2011), XP050564143.
3GPP TS 36.331 V9.10.0 (Mar. 2012), 3rd Generation Partnership Project; Technical Specification Group Radio Access Network; Evolved Universal Terrestrial Radio Access (E-UTRA); Radio Resource Control (RRC); Protocol specification (Release 9).
Sep. 19, 2017—European Search Report—EP 17153540.4.
Mar. 28, 2018—European Office Action—EP 13703256.1.
3GPP TSG RAN WG2 Meeting #80 R2-125578 New Orleans, USA, Nov. 12-Nov. 16, 2012 Source: CATT Title: Multi-TA Capability.
3GPP TSG RAN WG2 Meeting #77bis R2-124764 Bratislava, Slovakia, Oct. 8-12, 2012 Source: CATT Title: Consideration on Mulit-TA Capability.

(56) References Cited

OTHER PUBLICATIONS

3GPP TSG-RAN WG2 Meeting #77bis R2-121456 Jeju, Korea, Mar. 26-Mar. 30, 2012 Source: Huawei, HiSilicon Title: Parallel transmission in the same TAG.
Apr. 20, 2018—European Search Report—EP 17189302.7.

* cited by examiner

SOUNDING REFERENCE SIGNAL TRANSMISSION IN A WIRELESS NETWORK

CROSS-REFERENCE TO RELATED APPLICATIONS

This application is a continuation of application Ser. No. 14/880,312, filed Oct. 12, 2015, which is a continuation of application Ser. No. 14/597,483, filed Jan. 15, 2015, which is a continuation of application Ser. No. 13/749,693, filed Jan. 25, 2013, which claims the benefit of U.S. Provisional Application No. 61/590,366, filed Jan. 25, 2012, and U.S. Provisional Application No. 61/618,830, filed Apr. 1, 2012, which are hereby incorporated by reference in their entirety.

BRIEF DESCRIPTION OF THE SEVERAL VIEWS OF THE DRAWINGS

Examples of several of the various embodiments of the present invention are described herein with reference to the drawings, in which.

DETAILED DESCRIPTION OF EMBODIMENTS

Example embodiments of the present invention enable operation of multiple timing advance groups. Embodiments of the technology disclosed herein may be employed in the technical field of multicarrier communication systems. More particularly, the embodiments of the technology disclosed herein may relate to operation of multiple timing advance groups.

Example embodiments of the invention may be implemented using various physical layer modulation and transmission mechanisms. Example transmission mechanisms may include, but are not limited to: CDMA (code division multiple access), OFDM (orthogonal frequency division multiplexing), TDMA (time division multiple access), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM (quadrature amplitude modulation) using BPSK (binary phase shift keying), QPSK (quadrature phase shift keying), 16-QAM, 64-QAM, 256-QAM, and/or the like. Physical radio transmission may be enhanced by dynamically or semi-dynamically changing the modulation and coding scheme depending on transmission requirements and radio conditions.

Figure 1:
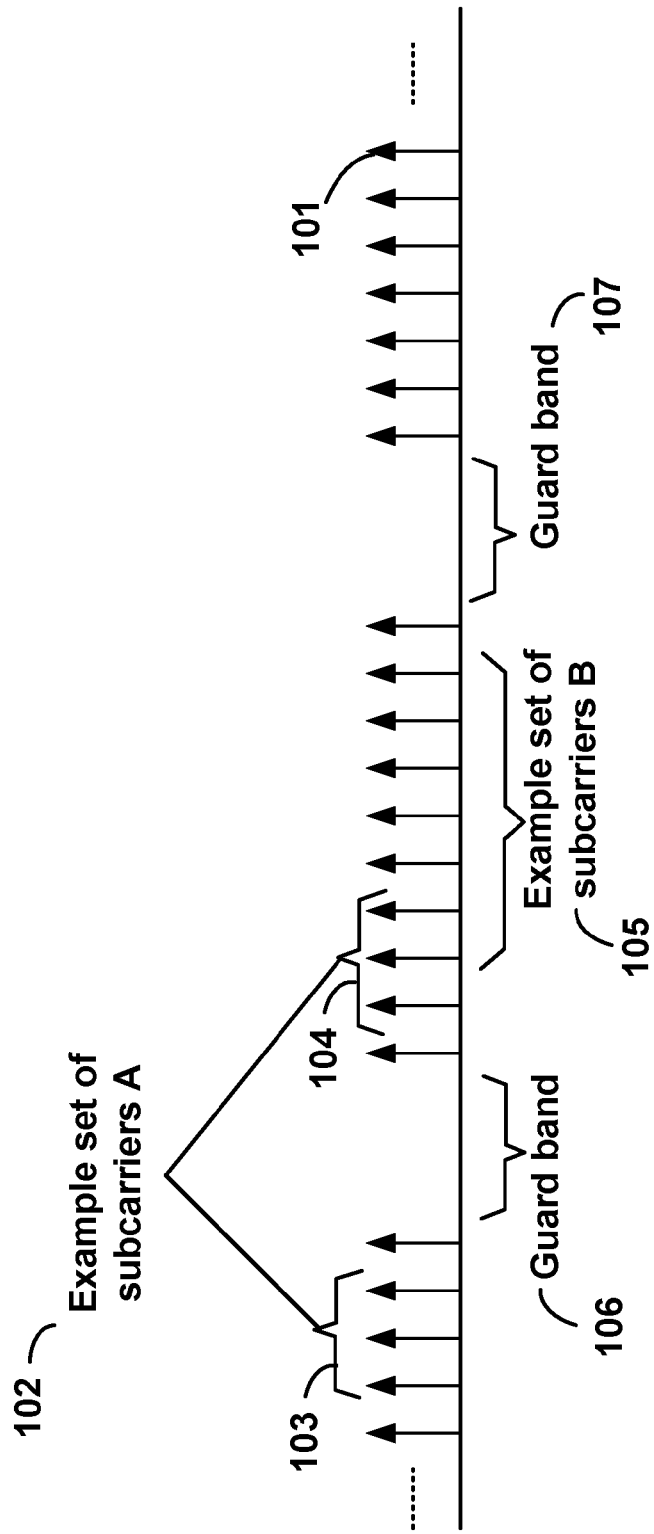
FIG. 1 is a diagram depicting example sets of OFDM subcarriers as per an aspect of an embodiment of the present invention.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM (single carrier-OFDM) technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
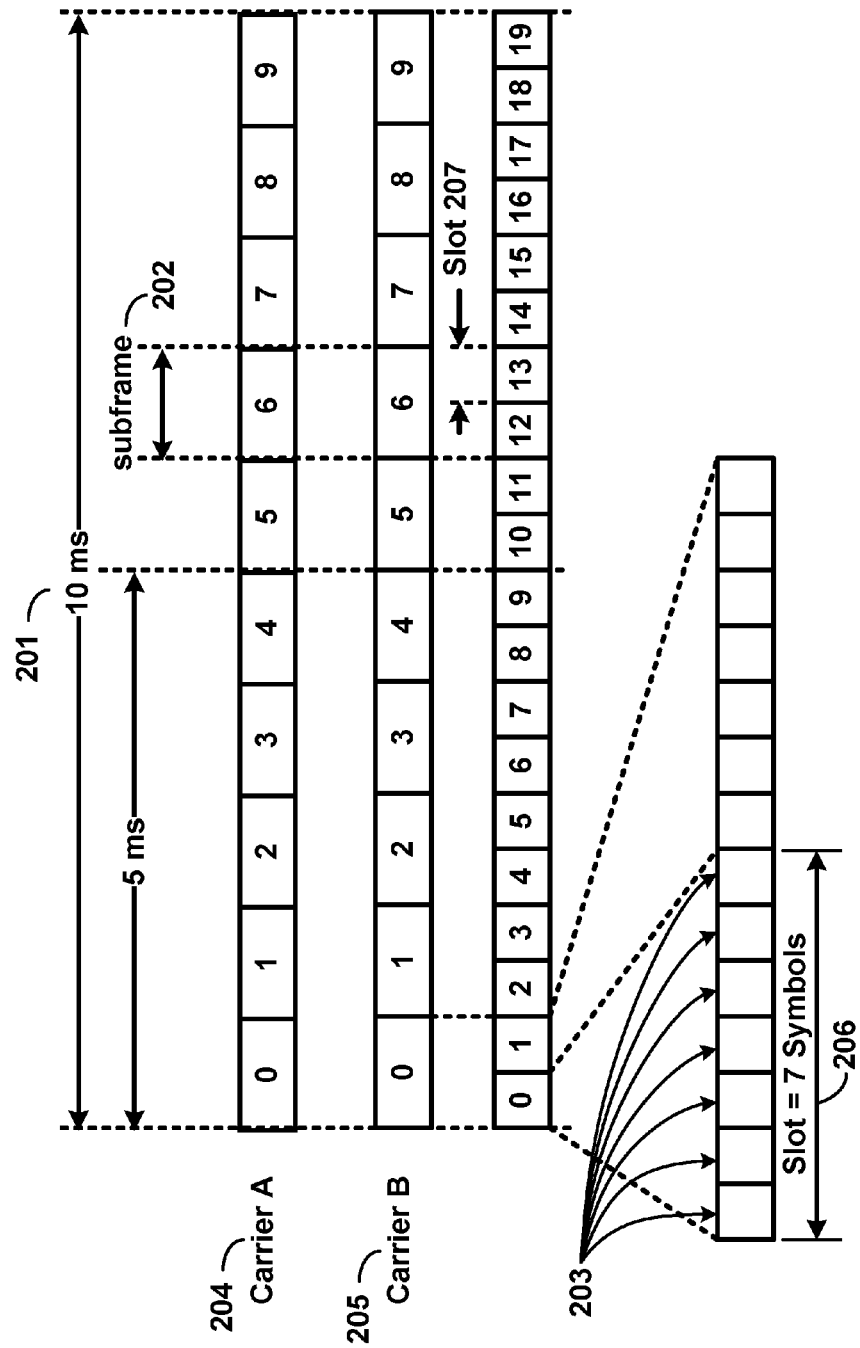
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD (frequency division duplex) and TDD (time division duplex) duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized sub-frames 202. Other subframe durations such as including 0.5 msec, 1 msec, 2 msec, and 5 msec may also be supported. Subframe(s) may consist of two or more slots 206. For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
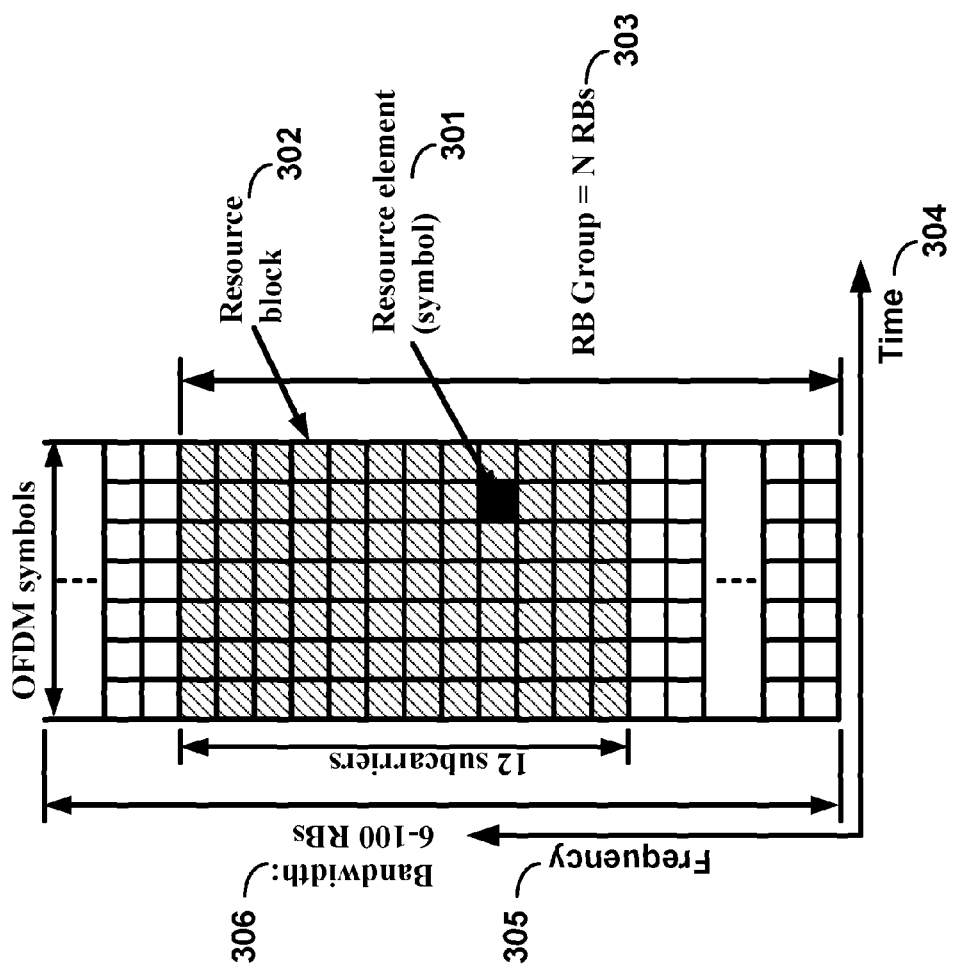
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or resource blocks (RB) (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

According to some embodiments, a radio resource framework using OFDM technology may be employed. Alternative embodiments may be implemented employing other radio technologies. Example transmission mechanisms include, but are not limited to: CDMA, OFDM, TDMA, Wavelet technologies, and/or the like. Hybrid transmission mechanisms such as TDMA/CDMA, and OFDM/CDMA may also be employed.

Figure 4:
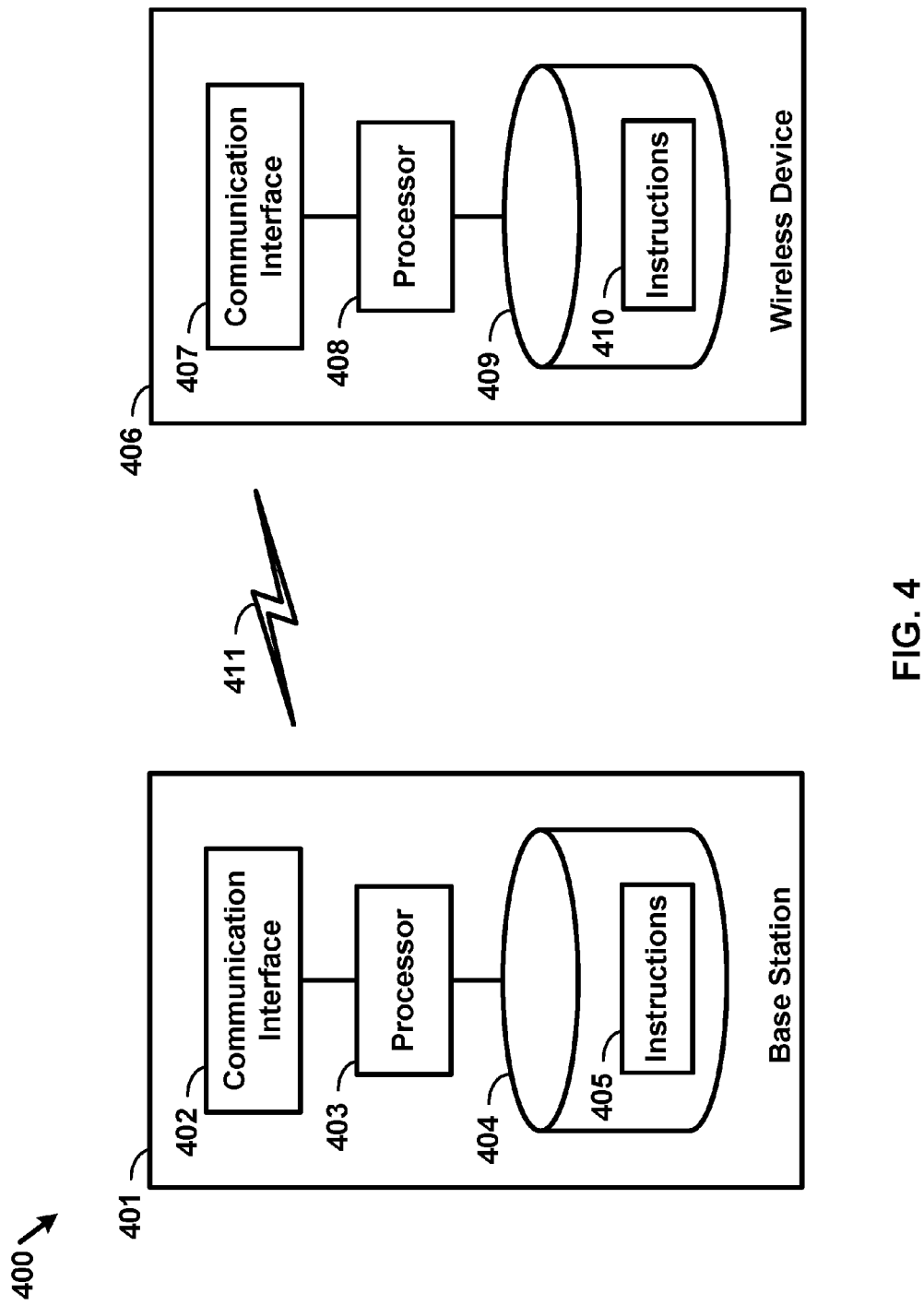
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, and FIG. 3. and associated text.

Figure 5:
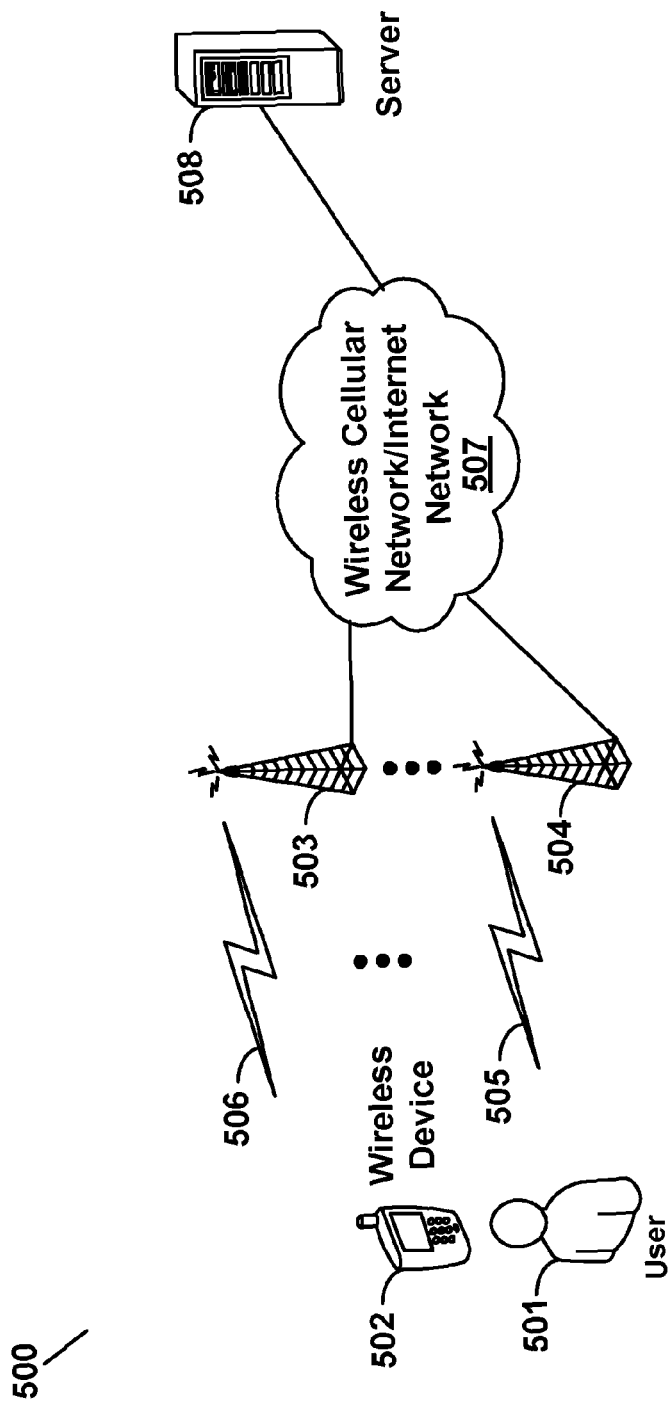
FIG. 5 is a block diagram depicting a system for transmitting data traffic over an OFDM radio system as per an aspect of an embodiment of the present invention.

FIG. 5 is a block diagram depicting a system 500 for transmitting data traffic generated by a wireless device 502 to a server 508 over a multicarrier OFDM radio according to one aspect of the illustrative embodiments. The system 500 may include a Wireless Cellular Network/Internet Network 507, which may function to provide connectivity between one or more wireless devices 502 (e.g., a cell phone, PDA (personal digital assistant), other wirelessly-equipped device, and/or the like), one or more servers 508 (e.g. multimedia server, application servers, email servers, or database servers) and/or the like.

It should be understood, however, that this and other arrangements described herein are set forth for purposes of example only. As such, those skilled in the art will appreciate that other arrangements and other elements (e.g., machines, interfaces, functions, orders of functions, etc.) may be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic in combination with hardware. For instance, various functions may be carried out by a processor executing a set of machine language instructions stored in memory.

As shown, the access network may include a plurality of base stations 503 . . . 504. Base station 503 . . . 504 of the access network may function to transmit and receive RF (radio frequency) radiation 505 . . . 506 at one or more carrier frequencies, and the RF radiation may provide one or more air interfaces over which the wireless device 502 may communicate with the base stations 503 . . . 504. The user 501 may use the wireless device (or UE: user equipment) to receive data traffic, such as one or more multimedia files, data files, pictures, video files, or voice mails, etc. The wireless device 502 may include applications such as web email, email applications, upload and ftp applications, MMS (multimedia messaging system) applications, or file sharing applications. In another example embodiment, the wireless device 502 may automatically send traffic to a server 508 without direct involvement of a user. For example, consider a wireless camera with automatic upload feature, or a video camera uploading videos to the remote server 508, or a personal computer equipped with an application transmitting traffic to a remote server.

One or more base stations 503 . . . 504 may define a corresponding wireless coverage area. The RF radiation 505 . . . 506 of the base stations 503 . . . 504 may carry communications between the Wireless Cellular Network/Internet Network 507 and access device 502 according to any of a variety of protocols. For example, RF radiation 505 . . . 506 may carry communications according to WiMAX (Worldwide Interoperability for Microwave Access e.g., IEEE 802.16), LTE (long term evolution), microwave, satellite, MMDS (Multichannel Multipoint Distribution Service), Wi-Fi (e.g., IEEE 802.11), Bluetooth, infrared, and other protocols now known or later developed. The communication between the wireless device 502 and the server 508 may be enabled by any networking and transport technology for example TCP/IP (transport control protocol/Internet protocol), RTP (real time protocol), RTCP (real time control protocol), HTTP (Hypertext Transfer Protocol) or any other networking protocol.

According to some of the various aspects of embodiments, an LTE network may include many base stations, providing a user plane (PDCP: packet data convergence protocol/RLC: radio link control/MAC: media access control/PHY: physical) and control plane (RRC: radio resource control) protocol terminations towards the wireless device. The base station(s) may be interconnected with other base station(s) by means of an X2 interface. The base stations may also be connected by means of an S1 interface to an EPC (Evolved Packet Core). For example, the base stations may be interconnected to the MME (Mobility Management Entity) by means of the S1-MME interface and to the Serving Gateway (S-GW) by means of the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. When carrier aggregation is configured, a wireless device may have one RRC connection with the network. At RRC connection establishment/re-establishment/handover, one serving cell may provide the NAS (non-access stratum) mobility information (e.g. TAI-tracking area identifier), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, is assigned a physical cell ID and a cell index. A carrier (downlink or uplink) belongs to only one cell, the cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. Cell ID may be determined using the synchronization signal transmitted on a downlink carrier. Cell index may be determined using RRC messages. For example, when the specification refers to a first physical cell ID for a first downlink carrier, it may mean the first physical cell ID is for a cell comprising the first downlink carrier. The same concept may apply to, for example, carrier activation. When the specification indicates that a first carrier is activated, it equally means that the cell comprising the first carrier is activated.

Embodiments may be configured to operate as needed. The disclosed mechanism may be performed when certain criteria are met, for example, in wireless device, base station, radio environment, network, a combination of the above, and/or the like. Example criteria may be based, at least in part, on for example, traffic load, initial system set up, packet sizes, traffic characteristics, a combination of the above, and/or the like. When the one or more criteria are met, the example embodiments may be applied. Therefore, it may be possible to implement example embodiments that selectively implement disclosed protocols.

Example embodiments of the invention may enable operation of multiple timing advance groups. Other example embodiments may comprise a non-transitory tangible computer readable media comprising instructions executable by one or more processors to cause operation of multiple timing advance groups. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multiple timing advance groups. The device may include processors, memory, interfaces, and/or the like. Other example embodiments may comprise communication networks comprising devices such as base stations, wireless devices (or user equipment: UE), servers, switches, antennas, and/or the like.

According to some of the various aspects of embodiments, serving cells having an uplink to which the same time alignment (TA) applies may be grouped in a TA group (TAG). Serving cells in one TAG may use the same timing reference. For a given TAG, a user equipment (UE) may use one downlink carrier as the timing reference at a given time. The UE may use a downlink carrier in a TAG as the timing reference for that TAG. For a given TAG, a UE may synchronize uplink subframe and frame transmission timing of the uplink carriers belonging to the same TAG. According to some of the various aspects of embodiments, serving cells having an uplink to which the same TA applies may correspond to the serving cells hosted by the same receiver. A TA group may comprise at least one serving cell with a configured uplink. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). Carriers within the same TA group may use the same TA value and the same timing reference. In this disclosure, timing advance group, time alignment group, and cell group have the same meaning. Further, time alignment command and timing advance command have the same meaning.

Figure 6:
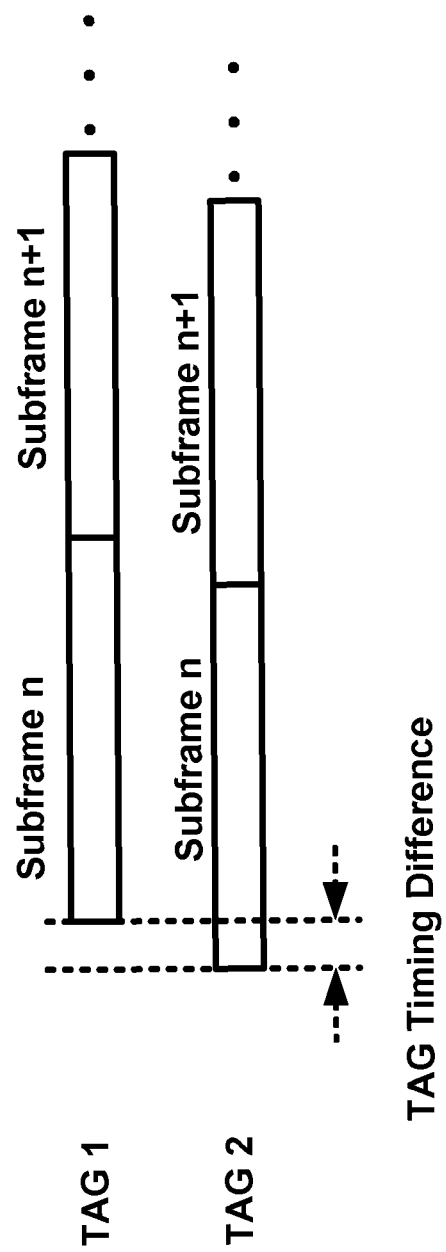
FIG. 6 is a diagram depicting uplink transmission timing of one or more cells in a first timing advance group (TAG) and a second TAG as per an aspect of an embodiment of the present invention.

FIG. 6 is a diagram depicting uplink transmission timing of one or more cells in a first timing advance group (TAG1) and a second TAG (TAG2) as per an aspect of an embodiment of the present invention. TAG1 may include one or more cells, TAG2 may also include one or more cells. TAG timing difference in FIG. 6 may be the difference in UE uplink transmission timing for uplink carriers in TAG1 and TAG2. The timing difference may range between, for example, sub micro-seconds to about 3o micro-seconds.

Figure 8:
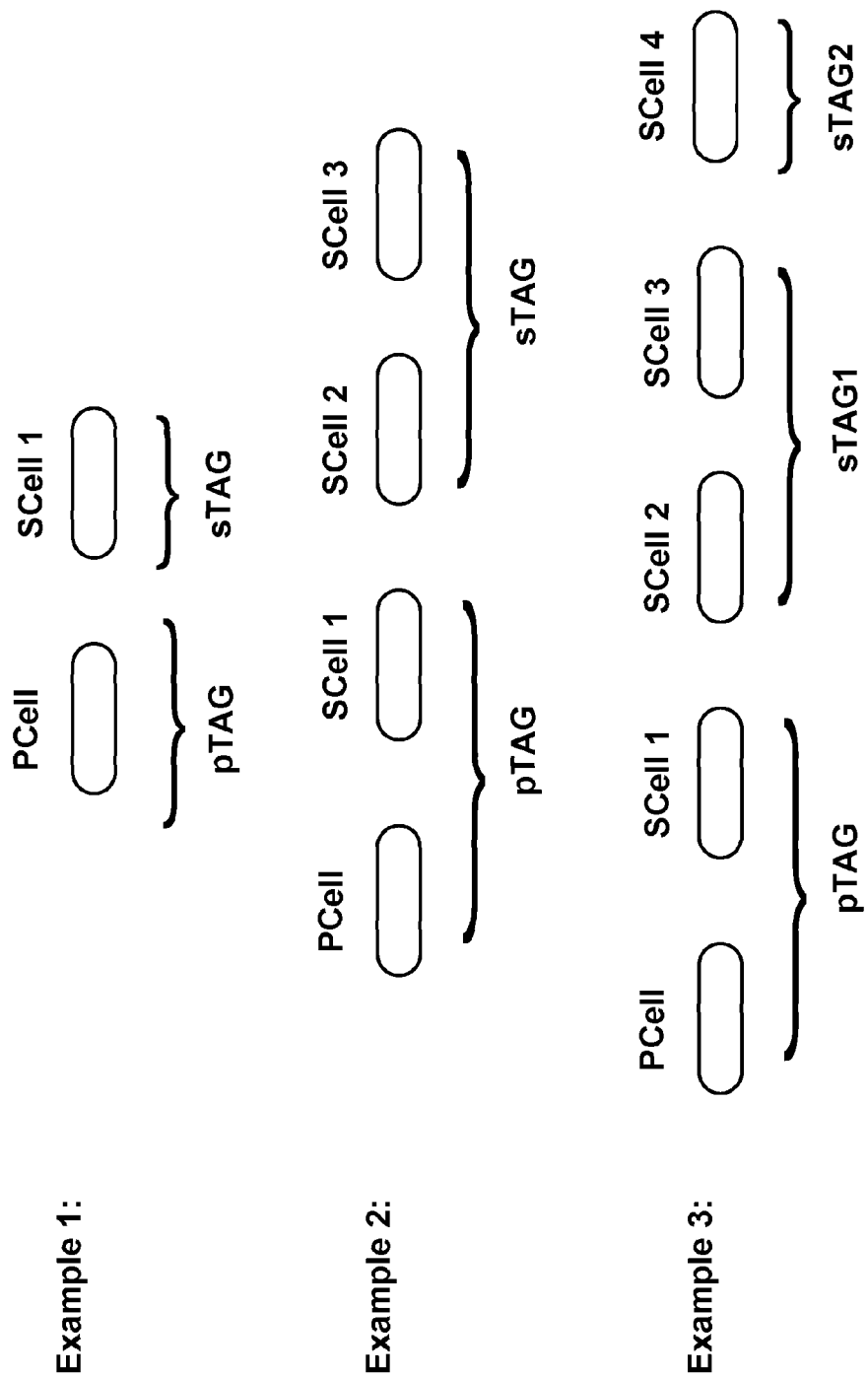
FIG. 8 shows example TAG configurations as per an aspect of an embodiment of the present invention.

FIG. 8 shows example TAG configurations as per an aspect of an embodiment of the present invention. In Example 1, pTAG include PCell, and sTAG includes SCell1. In Example 2, pTAG includes PCell and SCell1, and sTAG includes SCell2 and SCell3. In Example 3, pTAG includes PCell and SCell1, and sTAG1 includes SCell2 and SCell3, and sTAG2 includes SCell4. Up to four TAGs may be supported and other example TAG configurations may also be provided. In many examples of this disclosure, example mechanisms are described for a pTAG and an sTAG. The operation with one example sTAG is described, and the same operation may be applicable to other sTAGs. The example mechanisms may be applied to configurations with multiple sTAGs.

According to some of the various aspects of embodiments, TA maintenance, pathloss reference handling and the timing reference for pTAG may follow LTE release 10 principles. The UE may need to measure downlink pathloss to calculate the uplink transmit power. The pathloss reference may be used for uplink power control and/or transmission of random access preamble(s). A UE may measure downlink pathloss using the signals received on the pathloss reference cell. The pathloss reference downlink cell and the corresponding uplink cell may be configured to be in the same frequency band due to the required accuracy of pathloss estimation. For SCell(s) in a pTAG, the choice of pathloss reference for cells may be selected from and be limited to the following two options: a) the downlink SCell linked to an uplink SCell using the system information block 2 (SIB2), and b) the downlink pCell. The pathloss reference for SCells in pTAG may be configurable using RRC message(s) as a part of SCell initial configuration and/or reconfiguration. According to some of the various aspects of embodiments, PhysicalConfigDedicatedSCell information element (IE) of an SCell configuration may include the pathloss reference SCell (downlink carrier) for an SCell in pTAG.

The downlink SCell linked to an uplink SCell using the system information block 2 (SIB2) may be referred to as the SIB2 linked downlink of the SCell. Different TAGs may operate in different bands. In another example, the signals in different TAGs may travel through different repeaters, or the signal of one SCell in an sTAG may travel through a repeater while the signal of another TAG may not go through the repeater. Having flexibility in SCell pathloss reference configuration for SCells belonging to an sTAG may result in pathloss estimation errors due to mobility of wireless device. The wireless device may autonomously change a timing reference SCell in an sTAG, but changing pathloss reference autonomously may result in confusion in the serving eNB, specially that different cells may have different transmit power. Therefore, both eNB configuration flexibility and autonomous UE pathloss selection for an SCell in sTAG may result in errors in pathloss estimation. For an uplink carrier in an sTAG, the pathloss reference may be only configurable to the downlink SCell linked to an uplink SCell using the system information block 2 (SIB2) of the SCell. No other downlink carrier may be configured as the pathloss reference for an SCell in an sTAG. This configuration may introduce accuracy in pathloss estimation.

According to some of the various aspects of embodiments, a UE may successfully complete a random access procedure from the reception of a random access response (RAR) message within the random access (RA) response window using a random access radio network temporary identifier (RA-RNTI). The UE may decode scheduling information for uplink transmission in the PDCCH common search space (CSS) with RA-RNTI. According to some of the various aspects of embodiments, in addition to the time alignment command (TAC) field, RAR for a PCell and/or SCell may contain at least one of the following: a Random Access Preamble Identifier (RAPID), a UL grant, a Temporary C-RNTI, a Backoff Indicator (BI), and/or the like. RAPID may be used to confirm the association between RAR and the transmitted preamble. The UL grant may be employed for uplink transmission on the cell that the preamble was transmitted. Temporary C-RNTI may be used for contention resolution in case of contention based random access (CBRA). A backoff Indicator (BI) may be used in case of collisions and/or high load on PRACH.

To obtain initial uplink (UL) time alignment for an sTAG, eNB may initiate an RA procedure. In an sTAG, a UE may use one of any activated SCells from this sTAG as a timing reference cell. In an example embodiment, the timing reference for SCells in an sTAG may be the SIB2 linked downlink of the SCell on which the preamble for the latest RA procedure was sent. There may be one timing reference and one time alignment timer (TAT) per TA group. TAT for TAGs may be configured with different values. When the TAT associated with the pTAG expires: all TATs may be considered as expired, the UE may flush all HARQ buffers of all serving cells, the UE may clear any configured downlink assignment/uplink grants, and the RRC in the UE may release PUCCH/SRS for all configured serving cells. When the pTAG TAT is not running, an sTAG TAT may not be running. When the TAT associated with sTAG expires: a) SRS transmissions may be stopped on the corresponding SCells, b) SRS RRC configuration may be released, c) CSI reporting configuration for the corresponding SCells may be maintained, and/or d) the MAC in the UE may flush the uplink HARQ buffers of the corresponding SCells.

Upon deactivation of the last SCell in an sTAG, the UE may not stop TAT of the sTAG. In an implementation, upon removal of the last SCell in an sTAG, TAT of the TA group may not be running. RA procedures in parallel may not be supported for a UE. If a new RA procedure is requested (either by UE or network) while another RA procedure is already ongoing, it may be up to the UE implementation whether to continue with the ongoing procedure or start with the new procedure. The eNB may initiate the RA procedure via a PDCCH order for an activated SCell. This PDCCH order may be sent on the scheduling cell of this SCell. When cross carrier scheduling is configured for a cell, the scheduling cell may be different than the cell that is employed for preamble transmission, and the PDCCH order may include the SCell index. At least a non-contention based RA procedure may be supported for SCell(s) assigned to sTAG(s). Upon new UL data arrival, the UE may not trigger an RA procedure on an SCell. PDCCH order for preamble transmission may be sent on a different serving cell than the SCell in which the preamble is sent. TA grouping may be performed without requiring any additional UE assisted information.

Figure 7:
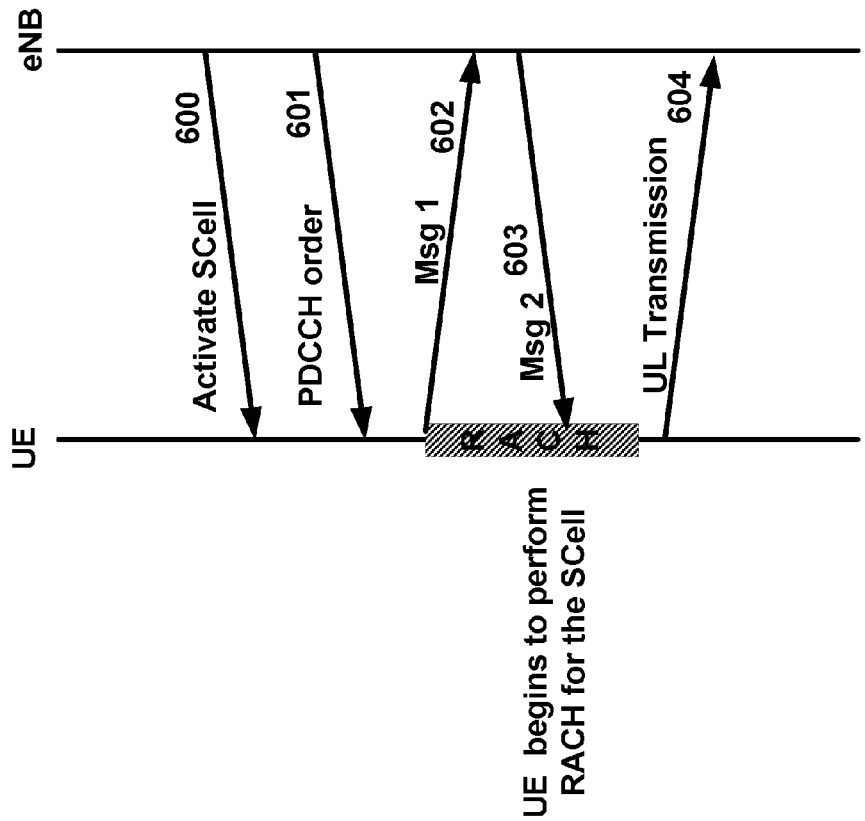
FIG. 7 is an example message flow in a random access process in a secondary TAG as per an aspect of an embodiment of the present invention.

FIG. 7 is an example message flow in a random access process in a secondary TAG as per an aspect of an embodiment of the present invention. eNB transmits an activation command 600 to activate an SCell. A preamble 602 (Msg1) may be sent by a UE in response to the PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on SCell may be addressed to RA-CRNTI in PCell common search space (CSS). Uplink packets 604 may be transmitted on the SCell, in which the preamble was transmitted.

According to some of the various aspects of embodiments, initial timing alignment may be achieved through a random access procedure. This may involve the UE transmitting a random access preamble and the eNB responding to an initial TA command NTA (amount of time alignment) within the random access response window. The start of the random access preamble may be aligned with the start of the corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

PDCCH order may be used to trigger RACH for an activated SCell. For a newly configured SCell or a configured but deactivated SCell, eNB may need to firstly activate the corresponding SCell and then trigger a RA on it. In an example embodiment, with no retransmission of an activation/deactivation command, activation of an SCell may need at least 8 ms, which may be an extra delay for UE to acquire the valid TA value on an SCell compared to the procedure on an already activated SCell. For a newly configured SCell or a deactivated SCell, 8 ms may be required for SCell activation, and at least 6 ms may be required for preamble transmission, and at least 4 ms may be required to receive the random access response. At least 18 ms may be required for a UE to get a valid TA. The possible delay caused by retransmission or other configured parameters may need to be considered (e.g. the possible retransmission of an activation/deactivation command, and/or the time gap between when a RA is triggered and when a preamble is transmitted (equal or larger than 6 ms)). The RAR may be transmitted within the RAR window (for example, 2 ms, 10 ms, 50 ms), and possible retransmission of the preamble may be considered. The delay for such a case may be more than 20 ms or even 30 ms if retransmissions are considered.

A base station may communicate with a mix of wireless devices. Wireless devices may support multiple technologies, or multiple releases of the same technology, have some specific capability depending on the wireless device category and/or capability. A base station may comprise multiple sectors. When this disclosure refers to a base station communicating with a plurality of wireless devices, this disclosure may refer to a subset of the total wireless devices in the coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in the coverage area, which perform according to the disclosed methods, and/or the like. There may be many wireless devices in the coverage area that may not comply with the disclosed methods, for example, because those wireless devices perform based on older releases of LTE technology. A time alignment command MAC control element may be a unicast MAC command transmitted to a wireless device. A wireless device may receive its own time alignment commands.

According to some of the various aspects of various embodiments, the base station or wireless device may group cells into a plurality of cell groups. The term "cell group" may refer to a timing advance group (TAG) or a timing alignment group or a time alignment group. A cell group may include at least one cell. A MAC TA command may correspond to a TAG. A group may explicitly or implicitly be identified by a TAG index. Cells in the same band may belong to the same cell group. A first cell's frame timing may be tied to a second cell's frame timing in a TAG. When a time alignment command is received for the second cell, the frame timing of both first cell and second cell may be adjusted. Base station(s) may provide TAG configuration information to the wireless device(s) by RRC configuration message(s).

According to some of the various aspects of some embodiments, the number of time alignment commands transmitted by the base station to a wireless device in a given period may depend, at least in part, on many parameters including at least one of: a) the speed that the wireless device moves in the coverage area, b) the direction that the wireless device moves in the coverage area, c) the coverage radius, and/or d) the number of active wireless devices in the coverage area. A base station may transmit at least two types of time alignment commands. A first type command may be transmitted to a first category of wireless devices. The first category may include devices compatible with at least release 8, 9, or 10 of the LTE standard. A second type command may be transmitted to a second category of devices. The second category may include devices with multi-time alignment group (MTG) capability and compatible with release 11 or beyond of the LTE standard. The time alignment may be transmitted to wireless devices that are in connected mode and are applicable to active cells.

A UE may transmit a Scheduling Request (SR) and/or a buffer status report (BSR) due to uplink data arrival in the UE. A UE may transmit a scheduling request on PUCCH when the UE has data for uplink transmission and UE do not have uplink grants for transmission of a buffer status report. The UE may receive uplink grant in response to a SR. A base station scheduler may also provide an uplink grant to a UE for some other reasons, for example, based on a previous BSR. The UE may transmit a MAC BSR in the uplink resources identified in an uplink grant to inform the base station about the size of the uplink transmission buffer(s). A UE BSR may be transmitted in an uplink resource identified in a received uplink grant. BSR indicates the amount of data in one or more logical channel buffers. Base station may determine the radio resources required for the UE in the uplink employing the received BSR and other parameters, e.g. link quality, interference, UE category, and/or the like. If the base station determines that radio resources of a first SCell which is uplink unsynchronized is required (the SCell may be in-active or may not be even configured yet), the base station may trigger an sTAG sync process to uplink synchronize the sTAG and the first SCell associated with the sTAG. The SCell should be in configured (e.g. using RRC messages) and be in active state (e.g. using MAC activate commands). An SCell is considered out-of-sync if it belongs to or will belong to (after RRC configuration) to an out-of-sync sTAG.

The sTAG sync process may also selectively be started by the base station if a GBR bit rate bearer with required uplink resources has been established. The Base station may determine the radio resources required for the UE in the uplink employing the received bit rate, QoS and priority requirements of the GBR bearer and other parameters, e.g. link quality, interference, UE category, and/or the like. If the base station determines that radio resources of a first SCell which is uplink unsynchronized is required (the SCell may be in-active or may not be even configured yet), the base station may trigger an sTAG sync process to uplink synchronize the sTAG and the first SCell associated with the sTAG. The SCell should be in configured (e.g. using RRC messages) and be in active state (e.g. using MAC activate commands) before uplink transmission starts.

eNB may select to synchronize the sTAG and then activate/configure the SCell. eNB may select to first configure/activate SCell and then to uplink synchronize it. For example, if an SCell is added and assigned to a synchronized sTAG, it will be synchronize upon its (re)configuration/addition. In another example, the SCell may be configured, then the sTAG may be synchronized using another SCell in the sTAG, and then the SCell may be activated. In another example, the SCell may be configured/activated, and then sTAG synchronization may start. Different embodiments with different orders in tasks may be implemented. Random access process for an SCell can only be initiated on configured and active SCells assigned to an sTAG.

In an example embodiment, in the sTAG sync process the base station may trigger random access preamble transmission on an SCell of the sTAG that the SCell belongs, or on the first SCell in which its uplink resources are required. In this example, the first SCell belongs to an sTAG which is uplink out-of-sync. In response to receiving a BSR and/or GBR bearer establishment, the eNB may, selectively and depending on a plurality of criteria, transmit a PDCCH order to the UE and may cause the UE to start a RA procedure on an SCell in the sTAG (in case of carrier aggregation). A PDCCH order may be triggered by the BSR reception due to the UL data arrival in the UE or by the establishment of GBR bearer with uplink resource requirements. Preamble transmission may be triggered in the case of UL data arrival, meaning that preamble transmission may be triggered by the BSR reception in the eNB and/or establishment of a non GBR bearer with uplink data. Upon new UL data arrival, the UE may not trigger an RA procedure on an SCell. The eNB may, selectively, trigger the RA procedure based on the BSR reception due to UL data arrival in the UE. eNB may consider many parameters in triggering an RA on an SCell. For example, parameters may include current eNB load, UE buffer size(s) in BSR report(s), UE category, UE capability, QoS requirements, GBR bearer requirements and/or the like. UE may determine that radio resources of the out-of-sync SCell may be required for uplink data transmission.

In a second embodiment, in the sTAG sync process base station may transmit a MAC timing advance command with a TAG index of the out-of-sync sTAG. The UE may use an stored value of N_TA for the out of sync sTAG and apply the timing advance value in the MAC timing advance command to the stored N_TA of the sTAG. A UE may store or maintains N_TA (current timing advance value of an sTAG) upon expiry of associated time Alignment Timer of the sTAG. The UE may apply the received timing advance command MAC control element and starts associated time Alignment Timer. This process may practically put the sTAG in an in-sync state. The base station may transmit one or more MAC timing advance commands upon receiving uplink packets from the UE on the sTAG to align UE uplink transmissions in the sTAG. It is up to eNB to select the first or second embodiment for synchronizing the uplink of first SCell. For example, the eNB may operate in the second embodiment, if the SCell has not been in-sync for a long time, or the sTAG has not been in-Sync since it has been configured. In another example, the eNB may operate in the first embodiment if the sTAG has recently entered an out-of-sync state. In another example, the eNB may operate in the second embodiment if the eNB-UE distance is relatively short, for example in the range of tens or hundreds of meters.

The mapping of a serving cell to a TAG may be configured by the serving eNB with RRC signaling. The mechanism for TAG configuration and reconfiguration may be based on RRC signalling. When needed, the mapping between an SCell and a TA group may be reconfigured with RRC signaling. In an example implementation, the mapping between an SCell and a TAG may not be reconfigured with RRC while the SCell is configured. For example if there is a need to move an SCell from an sTAG to a pTAG, at least one RRC message, for example, at least one RRC reconfiguration message, may be send to the UE to reconfigure TAG configurations. The PCell may not change its TA group and may always be a member of the pTAG.

According to some of the various aspects of embodiments, when an eNB performs SCell addition configuration, the related TAG configuration may be configured for the SCell. In an example embodiment, eNB may modify the TAG configuration of an SCell by removing (releasing) the SCell and adding a new SCell (with the same physical cell ID and frequency) with an updated TAG ID. The new SCell with the updated TAG ID may be initially inactive subsequent to joining the updated TAG ID. eNB may activate the updated new SCell and then start scheduling packets on the activated SCell. In an example implementation, it may not be possible to change the TAG associated with an SCell, but rather, the SCell may need to be removed and a new SCell may need to be added with another TAG. This may not require employing mobilityControlInfo in the RRC reconfiguration message.

An eNB may perform initial configuration based on initial configuration parameters received from a network node (for example a management platform), an initial eNB configuration, a UE location, a UE type, UE CSI feedback, UE uplink transmissions (for example, data, SRS, and/or the like), a combination of the above, and/or the like. For example, initial configuration may be based on UE channel state measurements. For example, depending on the signal strength received from a UE on various SCells downlink carrier or by determination of UE being in a repeater coverage area, or a combination of both, an eNB may determine the initial configuration of sTAGs and membership of SCells to sTAGs.

In an example implementation, the TA value of a serving cell may change, for example due to UE's mobility from a macro-cell to a repeater or an RRH (remote radio head) coverage area. The signal delay for that SCell may become different from the original value and different from other serving cells in the same TAG. In this scenario, eNB may relocate this TA-changed serving cell to another existing TAG. Or alternatively, the eNB may create a new TAG for the SCell based on the updated TA value. The TA value may be derived, for example, through eNB measurement(s) of signal reception timing, a RA mechanism, or other standard or proprietary processes. An eNB may realize that the TA value of a serving cell is no longer consistent with its current TAG. There may be many other scenarios which require eNB to reconfigure TAGs. During reconfiguration, the eNB may need to move the reference SCell belonging to an sTAG to another TAG. In this scenario, the sTAG would require a new reference SCell. In an example embodiment, the UE may select an active SCell in the sTAG as the reference timing SCell.

eNB may consider UE's capability in configuring multiple TAGs for a UE. UE may be configured with a configuration that is compatible with UE capability. Multiple TAG capability may be an optional feature and per band combination Multiple TAG capability may be introduced. UE may transmit its multiple TAG capability to eNB via an RRC message and eNB may consider UE capability in configuring TAG configuration(s).

The purpose of an RRC connection reconfiguration procedure may be to modify an RRC connection, (e.g. to establish, modify and/or release RBs, to perform handover, to setup, modify, and/or release measurements, to add, modify, and/or release SCells). As part of the procedure, NAS dedicated information may be transferred from E-UTRAN to the UE. If the received RRC Connection Reconfiguration message includes the sCellToReleaseList, the UE may perform an SCell release. If the received RRC Connection Reconfiguration message includes the sCellToAddModList, the UE may perform SCell additions or modification.

When a UE receives an sCellToAddModList in an RRC reconfiguration message, the UE may process the content of the message. The UE may, for an sCellIndex value included in the sCellToAddModList that is not part of the current UE configuration (SCell addition), add the SCell corresponding to the cellIdentification in accordance with the received radioResourceConfigCommonSCell (SCell common configuration parameters) and radioResourceConfigDedicatedSCell (SCell dedicated configuration parameters). The UE may configure lower layers to consider the SCell to be in a deactivated state. The UE may, for a sCellIndex value included in the sCellToAddModList that is part of the current UE configuration (SCell modification), modify the SCell configuration in accordance with the received radioResourceConfigDedicatedSCell.

According to some of the various aspects of embodiments, common parameters may comprise downlink common parameters and uplink common parameters. Examples of downlink common parameters include: downlink bandwidth, antennaInfoCommon, mbsfn-SubframeConfigList, phich-Config, pdsch-ConfigCommon, and tdd-Config. Examples of uplink common parameters include: ul-CarrierFreq, ul-Bandwidth, p-Max, uplinkPowerControlCommonSCell, soundingRS-UL-ConfigCommon, ul-CyclicPrefixLength, prach-ConfigSCell (TDD), and pusch-ConfigCommon. Dedicated parameters may comprise downlink dedicated parameters and uplink dedicated parameters. Examples of downlink dedicated parameters include AntennaInfoDedicated, CrossCarrierSchedulingConfig, csi-RS-Config, pdsch-ConfigDedicated. Examples of uplink dedicated parameters include antennaInfoUL, pusch-ConfigDedicatedSCell, uplinkPowerControlDedicatedSCell, cqi-ReportConfigSCell, soundingRS-UL-ConfigDedicated, soundingRS-UL-ConfigDedicated, soundingRS-UL-ConfigDedicatedAperiodic, and pathlossReferenceLinking. The names of these variables and example definition(s) and format for these variables may be found in releases of LTE RRC standard documentation.

In an example embodiment, SCell TAG configuration(s) (e.g. TAG ID assignment) may be included in sCellToAddModList or one of the IEs in sCellToAddModList. A TAG ID may be included in the TAG configuration of a cell. The TA group may be configured when an SCell is added. Thus the configuration of a TA group may be seen as part of the SCell addition/modification. A dedicated parameter in SCell dedicated parameters may include the TAG ID of the SCell if the SCell belongs to an sTAG. If a dedicated TAG id parameter is not included in dedicated radio resource configuration of an SCell, it may be assumed that the SCell is assigned to the pTAG. This may be an implicit assignment of the SCell to pTAG. According to some of the various aspects of embodiments, some of the TAG configuration parameters may be included in common configuration parameters and some other TAG configuration parameters may be included in dedicated configuration parameters. SCellToAddModList transmitted to a UE may comprise one or more of: an sCell Index, a physical Cell Id, a downlink Carrier Frequency, a radioResourceConfigCommonSCell, and a radioResourceConfigDedicatedSCell. radioResourceConfigDedicatedSCell IE in sCellToAddModList transmitted to a UE (in RRC message(s)) may comprise the TAG ID that the SCell belongs to. A TA group configuration may be UE-specific (a dedicated configuration parameter). The identity or index of a TA group which an SCell belongs to, a TA group identity (TAG ID), may be assigned to a SCell employing an dedicated parameter in radioResourceConfigDedicatedSCell. When an SCell is released, the TAG assignment of the SCell may also be released. eNB may not be needed to include TAG ID in sCellToReleaseList. Each Cell may be assigned a TAG ID (implicitly or explicitly). If an SCell is not assigned a TAG ID, the SCell may be considered belonging to the pTAG by default. Implicit assignment of SCells to pTAG may reduce the signaling overhead. It is expected that in many operating scenarios, sTAGs are not configured, and therefore transmission of pTAG index for the configured SCells is avoided. This may increase spectral efficiency and would reduce signaling overhead.

A TAG ID may be UE specific, and each UE may have its own TAG configuration. For example, a given SCell may be a part of the pTAG in one UE and a part of an sTAG in another UE. In this embodiment, the SCell configuration may include TAG Index. Assignment of an SCell to an sTAG may be UE specific, and may be different for different UEs connected to the same eNB. For example, a UE in the coverage of a repeater connected to the eNB may have a different sTAG configuration than a UE which is directly connected to the same eNB.

According to some of the various aspects of embodiments, MAC-Config-Dedicated parameter in an RRC connection reconfiguration message may include a dedicated TAT parameter for each of the time alignment groups configured in the UE. In this example embodiment, a TAT may be included in MAC Dedicated parameters. If TAT for an sTAG is received in MAC-Dedicated parameters, the UE may consider the dedicated parameter. For an SCell in an sTAG, the UE may not consider time alignment timer in the SIB parameter received from an eNB, instead the UE may consider the time alignment configuration parameter in the MAC-Dedicated parameters. Different UEs may be required to be configured with different TAT values in an optimized network operation. UE TAT value may be optimized depending on eNB-UE distance, UE speed, UE category, and/or the like. Therefore, it is not recommended to use a common variable for time alignment timer of secondary cell groups.

The TA maintenance for PCell may follow Rel-10 principles. If an SCell applying the TA of PCell is added, the Rel-10 procedures may be reused. In one example embodiment, there is no need to explicitly assign a TAG ID for cells in the pTAG. SCells configured with the pTAG may be grouped implicitly and a TAG ID for pTAG may not be needed or a TAG ID may be assigned implicitly by default (for example, TAGID: 0). TAG identity may be regarded as zero if the TAG identity field is absent in SCell dedicated parameters upon SCell addition. If an SCell is not configured with a TAG ID, it may apply that the SCell belongs to the pTAG.

According to some of the various aspects of embodiments, sTAG configurations may be released upon re-establishment or handover. TAG related configuration may include TAG ID, TAG-specific TAT, and/or the serving cells associated with it. In an example embodiment MAC dedicated parameters IE may include a TAG configuration information element comprising a sequence of one or more TAG ID and TAT for configured TAGs. In an example embodiment the TAG configuration information element may also comprise the list of SCells belonging to the TAG. The association between SCells with TAG IDs may be included in SCell configuration IE parameters, or may be included in TAG configuration information element.

The parameters related to SCell random access channel may be common to all UEs. For example PRACH configuration (RACH resources, configuration parameters, RAR window) for the SCell may be common to all UEs. RACH resource parameters may include prach-configuration index, and/or prach-frequency offset. SCell RACH common configuration parameters may also include power: power ramping parameter(s) for preamble transmission; and max number of preamble transmission parameter. It is more efficient to use common parameters for RACH configuration, since different UEs will share the same random access channel. Using dedicated parameters for SCell RACH configuration is not preferred since it will increase the size of the radio resources required for random access process, and may reduce spectral efficiency.

In an example implementation, TAT of an sTAG may not be running when the last SCell of the group is removed from the TA group. The eNB may remove sTAG when removing the last SCell from the sTAG. When sTAG is removed the TAT for sTAG may be stopped and the NTA value may be discarded. According to some of the various aspects of embodiments, sTAG TAT configuration may be released when no SCell is configured in the sTAG. When sTAG is released, then TAT is also released/de-configured (e.g. this may be achieved by de-configuring the timer). Upon sTAG depletion, the TAT may be de-configured by the eNB, which may implicitly stop the TAT of this group at the same time. If an sTAG is empty, the same RRC message may remove the sTAG and TAT and a removed sTAG may be released/de-configured. In another example embodiment, TAT may be stopped but a TAT entity may be maintained.

eNB may transmit at least one RRC message to configure PCell, SCell(s) and RACH, and TAG configuration parameters. MAC-MainConfig may include a timeAlignmentTimerDedicated IE to indicate time alignment timer value for the pTAG. MAC-MainConfig may further include an IE including a sequence of at least one (sTAG ID, and TAT value) to configure time alignment timer values for sTAGs. In an example, a first RRC message may configure TAT value for pTAG, a second RRC message may configure TAT value for sTAG1, and a third RRC message may configure TAT value for sTAG2. There is no need to include all the TAT configurations in a single RRC message. The IE including a sequence of at least one (sTAG ID, and TAT) value may also be used to update the TAT value of an existing sTAG to an updated TAT value. The at least one RRC message may also include sCellToAddModList including at least one SCell configuration parameters. The radioResourceConfigDedicatedSCell (dedicated radio configuration IEs) in sCellToAddModList may include an SCell MAC configuration comprising TAG ID for the corresponding SCell added or modified. The radioResourceConfigDedicatedSCell may also include pathloss reference configuration for an SCell. If TAG ID is not included in SCell configuration, the SCell is assigned to the pTAG. In other word, a TAG ID may not be included in radioResourceConfigDedicatedSCell for SCells assigned to pTAG. The radioResourceConfigCommonSCell (common radio configuration IEs) in sCellToAddModList may include RACH resource configuration parameters, preamble transmission power control parameters, and other preamble transmission parameter(s). At the least one RRC message configures PCell, SCell, RACH resources, and/or SRS transmissions and may assign each SCell to an sTAG (implicitly or explicitly). PCell is always assigned to the pTAG.

The pathloss reference IE (pathlossReferenceLinking) in radioResourceConfigDedicatedSCell may indicate whether the UE shall apply as pathloss reference either: the downlink of the PCell, or of the SIB2 downlink of the SCell that corresponds with the configured uplink. For SCells part of a secondary TAG eNB may only configure the pathloss reference to SIB2 downlink of the SCell that corresponds with the configured uplink. If a serving cell belongs to a TAG containing the primary cell then, for the uplink of the primary cell, the primary cell is used as the reference serving cell for determining reference Signal Power. For the uplink of the secondary cell, the serving cell configured by the RRC parameter pathloss Reference Linking IE is used as the reference serving cell for determining reference signal power. If a serving cell belongs to an sTAG then the serving cell is used as the reference serving cell for determining reference signal power.

According to some of the various aspects of embodiments, a base station may transmit at least one control message to a wireless device in a plurality of wireless devices. The at least one control message is for example, RRC connection reconfiguration message, RRC connection establishment message, RRC connection re-establishment message, and/or other control messages configuring or reconfiguring radio interface, and/or the like. The at least one control message may be configured to cause, in the wireless device, configuration of at least:

a) a plurality of cells. Each cell may comprise a downlink carrier and zero or one uplink carrier. The configuration may assign a cell group index to a cell in the plurality of cells. The cell group index may identify one of a plurality of cell groups. A cell group in the plurality of cell groups may comprise a subset of the plurality of cells. The subset may comprise a reference cell with a reference downlink carrier and a reference uplink carrier. Uplink transmissions by the wireless device in the cell group may employ a synchronization signal transmitted on the reference downlink carrier as timing reference.

b) a plurality of MAC dedicated parameters comprising a sequence of at least one element. An element in the sequence may comprises a time alignment timer value and a secondary time alignment group index. pTAG time alignment timer value may be included as a dedicated IE in MAC main configuration parameter (a dedicated IE). Each time alignment timer value being selected, by the base station, from a finite set of predetermined values. The time alignment timer value in the sequence may be associated with a cell group index that is specified in the same element. In an example embodiment, the element may also comprise the list of cell indexes associated with the time alignment group index.

c) a time alignment timer for each cell group in the plurality of cell groups.

The base station may transmit a plurality of timing advance commands. Each timing advance command may comprise: a time adjustment value, and a cell group index. A time alignment timer may start or may restart when the wireless device receives a timing advance command to adjust uplink transmission timing on a cell group identified by the cell group index. The cell group may be considered out-of-sync, by the wireless device, when the associated time alignment timer expires or is not running. The cell group may be considered in-sync when the associated time alignment timer is running.

The timing advance command may causes substantial alignment of reception timing of uplink signals in frames and subframes of all activated uplink carriers in the cell group at the base station. The time alignment timer value may be configured as one of a finite set of predetermined values. For example, the finite set of predetermined values may be eight. Each time alignment timer value may be encoded employing three bits. TAG TAT may be a dedicated time alignment timer value and is transmitted by the base station to the wireless device. TAG TAT may be configured to cause configuration of time alignment timer value for each time alignment group. The IE TAG TAT may be used to control how long the UE is considered uplink time aligned. It corresponds to the timer for time alignment for each cell group. Its value may be in number of sub-frames. For example, value sf500 corresponds to 500 sub-frames, sf750 corresponds to 750 sub-frames and so on. An uplink time alignment is common for all serving cells belonging to the same cell group. In an example embodiment, the IE TAG TAT may be defined as: TAG TAT::=SEQUENCE{TAG ID, ENUMERATED {sf500, sf750, sf1280, sf1920, sf2560, sf5120, sf10240, infinity}. Time alignment timer for pTAG may be indicated in a separate IE and may not be included in the sequence.

In an example, TimeAlignmentTimerDedicated IE may be sf500, and then TAG TAT may be {1, sf500; 2, sf2560; 3, sf500}. In the example, time alignment timer for the pTAG is configured separately and is not included in the sequence. In the examples, TAG0 (pTAG) time alignment timer value is 500 subframes (500 m-sec), TAG1 (sTAG) time alignment timer value is 500 subframes, TAG2 time alignment timer value is 2560 subframes, and TAG3 time alignment timer value is 500 subframes. This is for example purposes only. In this example a TAG may take one of 8 predefined values. In a different embodiment, the enumerated values could take other values. The size of the sequence is 3 in the first example and 4 in the second example. In another example embodiment, the size could be 2, 3, equal to the size of configured TAGs in the wireless device, and/or the like.

Figure 9:
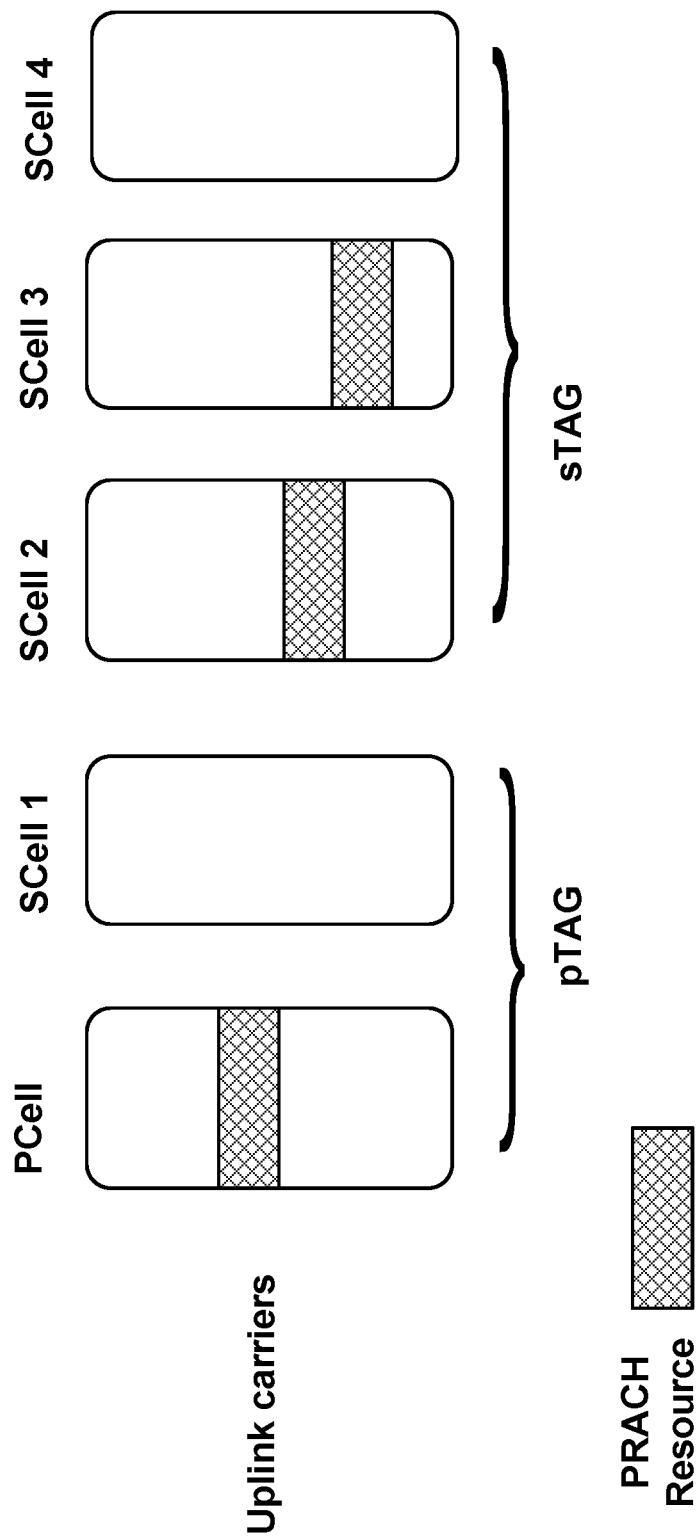
FIG. 9 is an example physical random access channel (PRACH) configuration in a primary TAG (pTAG) and a secondary TAG (sTAG) as per an aspect of an embodiment of the present invention.

FIG. 9 is an example physical random access channel (PRACH) configuration in a primary TAG (pTAG) and a secondary TAG (sTAG) as per an aspect of an embodiment of the present invention. As shown in the example, PRACH resources are configured for the PCell in pTAG and SCell2 and SCell3 in sTAG. SCell1 and SCell4 are not configured with PRACH resources. This is an example and other configurations are also possible. In an example embodiment, no SCell in pTAG is configured with PRACH resources. In another example embodiment, PRACH resources for an SCell in pTAG may be configured, but eNB is not configured to trigger a preamble transmission on PRACH resources of an SCell in pTAG. Basically, PRACH resources in SCells in pTAG cannot be used for preamble transmissions by a UE.

According to some of the various aspects of embodiments, a UE may select one active SCell DL in a secondary TAG as the DL timing reference cell for the secondary TAG. This may reduce signalling overhead or complexity of implementation and/or increase efficiency. For a UE, an sTAG may have one timing reference cell at a given time. In an example embodiment, the active SCell with the highest signal quality may be selected as the timing reference SCell by the UE. In another example embodiment, DL timing reference cell for an sTAG may be the SCell DL SIB2-linked with the SCell UL where RACH was performed. For preamble transmission, the SIB2 linked DL of the cell which the preamble is sent may be used as DL timing reference. In an example embodiment, UE may autonomously select a downlink carrier in an active cell in the sTAG as the reference SCell. When TA command is received in RAR or MAC CE, the UE may apply the TA value to current UL timing of the corresponding TAG.

One timing reference SCell may be employed in an sTAG, the timing alignment value in RAR (random access response) or TAC (time alignment command) may be applied to all active SCell(s) in the same sTAG. Thus, the UE may select the most suitable SCell for timing reference depending on different circumstances. For example, the SCell which has a better signal quality may be selected as timing reference cell, since better signal quality may provide a more reliable performance and thus reduce the need of re-configuring the timing reference cell. Channel quality of an SCell in an sTAG may be considered for initial SCell timing reference and for reselecting timing reference cell. UE may change the timing reference when it is necessary.

In an example embodiment, the SCell served as the timing reference cell in sTAG may be deactivated in some cases. For a UE, eNB may keep a state of an SCell as active or inactive. In a UE, when an SCell is inactive, the UE may switch off some parts of the receiver and/or transmitter corresponding to the SCell. This act may reduce battery power consumption in the UE. In another example embodiment, the reference SCell in an sTAG may be released by the serving eNB. The timing reference cell may be changed to another active SCell in the sTAG for maintaining UL timing alignment for SCells in the same sTAG. Change of timing reference cell in an sTAG may be supported. The reference cell may also be changed for other reasons such as coverage quality, PRACH failure, Reference SCell release, subscriber mobility, a combination of the above, and/or the like. These scenarios may apply to cases where time alignment is running. If the time alignment is not running and the sTAG is not time aligned, then there is no uplink synchronization and UE may not use any reference SCell for uplink synchronization. In an example embodiment, the UE may autonomously change the timing reference SCell to another active SCell in the sTAG without informing the serving base station. The UE may not inform the base station about a change in the reference SCell, this process avoids additional signaling from a UE to the eNB and may increase radio resource efficiency. This process optimizes reference cell selection by the UE so that the UE can select a suitable SCell as the reference, without adding complexity in the network and without introducing additional signaling overhead.

According to some of the various aspects of embodiments, UE may autonomously select another reference SCell when the reference SCell becomes deactivated. Since the timing reference is used to derive the UL transmission timing at the UE, there is a need for the UE to select a downlink SCell as the timing reference. The UE may autonomously reselect another activated SCell in the sTAG as the reference when needed. Timing reference for uplink transmission on SCell may be reselected to the DL timing of any activated SCell of the same sTAG when needed. Any activated SCell in the sTAG may be chosen by the UE autonomously as the timing reference for this sTAG. For example, initially downlink SCell in which RA is transmitted may be used as a timing reference and then the UE may use another SCell as the timing reference, when the reference SCell needs to be changed.

Figure 10:
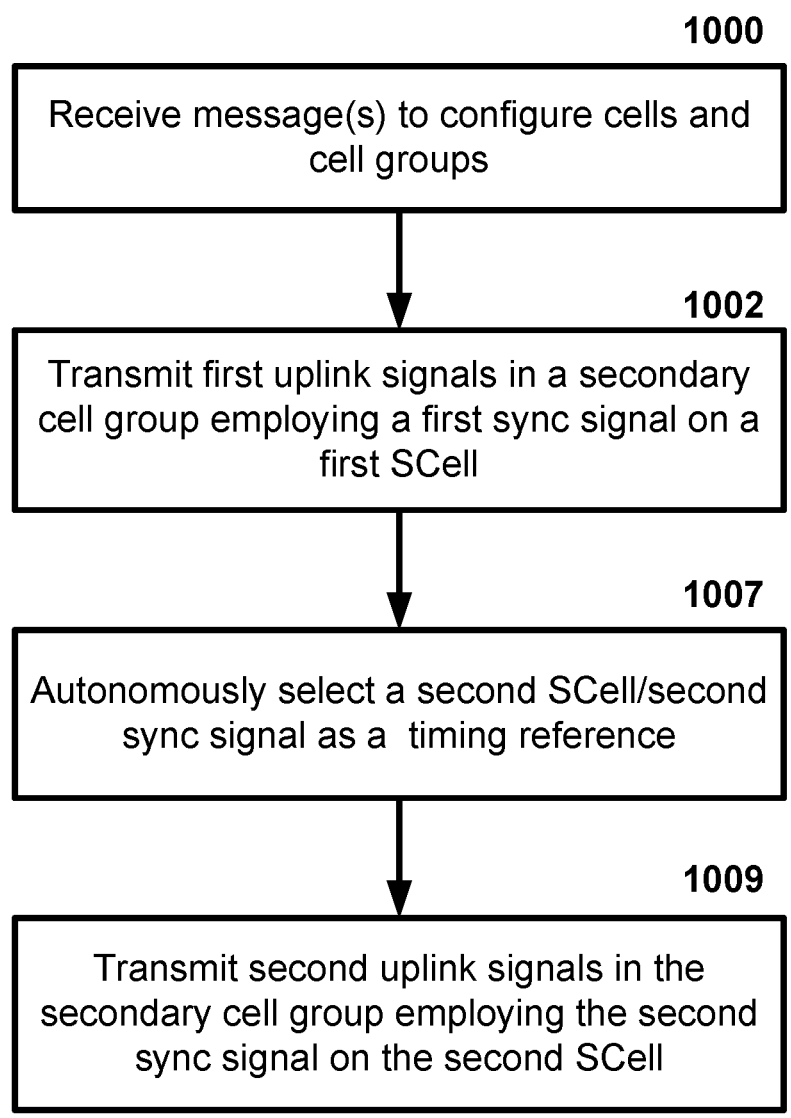
FIG. 10 is an example flow diagram illustrating timing reference change as per an aspect of an embodiment of the present invention.

FIG. 10 is an example flow diagram illustrating timing reference change as per an aspect of an embodiment of the present invention. At 1000, a wireless device may receive control message(s) from a base station. The control message(s) may cause in the wireless device configuration of a plurality of cells. The plurality of cells may comprise a primary cell and a plurality of secondary cells.

According to some of the various embodiments, the control message(s) may also cause in the wireless device configuration of a deactivation timer for each secondary cell in plurality of secondary cells. The deactivation timer may correspond to a secondary cell restarting in response to a packet transmission on the secondary cell. An RRC message may comprise MAC main configuration parameter comprising a deactivation timer value. The activation timer value may be applicable to deactivation timers of each of the secondary cells. The corresponding secondary cell may be deactivated in the wireless device in response to the deactivation timer expiring. The deactivation timer may correspond to secondary cell restarts in response to receiving an activation command for the secondary cell.

According to some of the various embodiments, the control message(s) may also cause in the wireless device assignment of each of the plurality of secondary cells to a cell group in a plurality of cell groups. The plurality of cell groups may comprise a primary cell group and a secondary cell group. The primary cell group may comprise a first subset of the plurality of cells. The first subset may comprise the primary cell. Uplink transmissions by the wireless device in the primary cell group may employ a first synchronization signal transmitted on the primary cell as a primary timing reference. The secondary cell group may comprise a second subset of the plurality of secondary cells. The second subset may comprise a reference secondary cell.

According to some of the various embodiments, the control message(s) may comprise a plurality of media access control dedicated parameters comprising a deactivation timer value. The deactivation timer value may be employed for each of the deactivation timers for the plurality of secondary cells.

According to some of the various embodiments, first uplink signals in the secondary cell group may be transmitted by the wireless device at 1002. The transmission may employ a synchronization signal on the reference secondary cell as a secondary timing reference. The reference secondary cell may be an activated cell in the secondary cell group.

According to some of the various embodiments, at 1007, the wireless device may autonomously select a new activated secondary cell in the secondary cell group as the secondary timing reference if the reference secondary cell is deactivated in the wireless device; and at least one secondary cell in the secondary cell group is active in the wireless device. The autonomous selection may be performed by the wireless device without the wireless device informing the base station.

According to some of the various embodiments, second uplink signals may be transmitted in the secondary cell group by the wireless device at 1009. The transmission may employ a second synchronization signal on the new activated secondary cell as the secondary timing reference.

The wireless device may receive a control command configured to cause transmission of a random access preamble on random access resources of the reference secondary cell in the secondary cell group. The wireless device may receive a random access response on a primary cell in the primary cell group. The random access response may comprise a timing advance command for the secondary cell group. The base station may receive the random access preamble on the random access resources. Transmission timing of the random access preamble may be determined, at least in part, employing the synchronization signal transmitted on the reference secondary cell. The control message(s) may cause configuration of the random access resources.

According to some of the various embodiments, the base station may transmit at least one timing advance command to the wireless device. The timing advance command may comprise: a time adjustment value; and an index identifying the secondary cell group. The timing advance command(s) may be configured to cause substantial alignment of reception timing of the uplink signals in frames and subframes of the secondary cell group at the base station.

According to some of the various embodiments, the wireless device may be assigned a plurality of media access control dedicated parameters by the configuration. The plurality of media access control dedicated parameters may comprise a plurality of time alignment timer values. Each of the plurality of time alignment timer values may be associated with a unique cell group in the wireless device.

Embodiments may vary. For example, according to some of the various embodiments, the control message(s) may cause in said wireless device assignment of each of the plurality of secondary cells to a cell group in a plurality of cell groups. The plurality of cell groups may comprise a secondary cell group comprising a subset of the plurality of secondary cells. The control message(s) may comprises at least one cell add-modify information element. Each of the cell add-modify information element(s) may comprise a first plurality of dedicated parameters in the plurality of dedicated parameters. The first plurality of dedicated parameters may comprise a first cell index for a first secondary cell in the secondary cell(s).

According to some of the various embodiments, the control message(s) may be configured to further cause in the wireless device configuration of a time alignment timer for each of the plurality of cell groups. The time alignment timer may start or restart in response to the wireless device receiving a timing advance command to adjust uplink transmission timing of a commanded cell group in the plurality of cell groups.

According to some of the various embodiments, the wireless device may transmit first uplink signals in the secondary cell group at 1002 employing a synchronization signal on a reference secondary cell in the secondary cell group as a timing reference. The reference secondary cell may be an activated cell in the secondary cell group.

According to some of the various embodiments, the wireless device may autonomously select a new activated secondary cell in the secondary cell group as the timing reference at 1007 if the reference secondary cell is deactivated in the wireless device; and at least one secondary cell in the secondary cell group is active in the wireless device. The selection may be performed autonomously by the wireless device without the wireless device informing the base station. According to some of the various embodiments, the wireless device may not monitor the reference secondary cell when the reference secondary cell is deactivated.

At 1009, the wireless device may transmit second uplink signals in the secondary cell group employing a third synchronization signal on the new activated secondary cell as the timing reference. The wireless device may transmit second uplink signals in the secondary cell group employing a third synchronization signal on the new activated secondary cell as the timing reference According to some of the various embodiments, an activation command may be received causing activation of the new secondary cell in the wireless device.

According to some of the various embodiments, the base station may comprise communication interface(s), processor(s), and memory. The memory may store instructions. The processor(s) may execute the instructions to cause actions described herein.

At 1000, a wireless device may receive control message(s) from a base station. The control message(s) may cause in the wireless device configuration of a plurality of cells. The plurality of cells may comprise a primary cell and a plurality of secondary cells.

According to some of the various embodiments, the control message(s) may also cause in the wireless device assignment of each of the plurality of secondary cells to a cell group in a plurality of cell groups. The plurality of cell groups may comprise a primary cell group and a secondary cell group. The primary cell group may comprise a first subset of the plurality of cells. The first subset may comprise the primary cell. Uplink transmissions by the wireless device in the primary cell group may employ a first synchronization signal transmitted on the primary cell as a primary timing reference. The secondary cell group may comprise a second subset of the plurality of secondary cells. The second subset may comprise a reference secondary cell.

According to some of the various embodiments, the control message(s) may comprises a plurality of media access control dedicated parameters comprising a deactivation timer value. The deactivation timer value may be employed for each of the deactivation timers for the plurality of secondary cells. The control message(s) may cause configuration of the random access resources. The control message(s) may be configured to modify a radio bearer.

According to some of the various embodiments, first uplink signals in the secondary cell group may be transmitted by the wireless device at 1002. The transmission may employ a synchronization signal on the reference secondary cell as a secondary timing reference. The reference secondary cell may be an activated cell in the secondary cell group.

According to some of the various embodiments, at 1007, the wireless device may autonomously select (without the wireless device informing the base station) a new activated secondary cell in the secondary cell group as the secondary timing reference. The new activated secondary cell may be different from the reference secondary cell.

According to some of the various embodiments, at 1009, second uplink signals may be transmitted in the secondary cell group by the wireless device employing a third synchronization signal on the new activated secondary cell as the secondary timing reference.

A deactivation timer corresponding to the secondary cell may restart in response to receiving an activation command for the secondary cell.

According to some of the various embodiments, a wireless device may receive control message(s) from a base station. The control message(s) may cause in the wireless device configuration of: a plurality of cells comprising a primary cell and a plurality of secondary cells; and a cell group index for a secondary cell in the plurality of cells. The cell group index may identify one of a plurality of cell groups. The plurality of cell groups may comprise a secondary cell group. The secondary cell group may comprise a subset of the plurality of secondary cells. First uplink signals may be transmitted in the secondary cell group by the wireless device employing a first synchronization signal on a reference secondary cell in the secondary cell group as a timing reference. The reference secondary cell may be an activated cell in the secondary cell group. The wireless device may autonomously select (without the wireless device informing the base station) a new activated secondary cell in the secondary cell group as the timing reference. The new activated secondary cell may be different from the reference secondary cell. Second uplink signals may be transmitting in the secondary cell group by the wireless device employing a second synchronization signal on the new activated secondary cell as the timing reference.

According to some of the various aspects of embodiments, if the UE is configured with one or more SCells, the network may activate and deactivate the configured SCells associated with a wireless device (UE). The PCell is always activated when UE is in RRC-Connected mode. The network may activate and deactivate the SCell(s) by sending the Activation/Deactivation MAC control element. Furthermore, a UE and eNB may maintain an SCellDeactivationTimer timer per configured SCell and may deactivate the associated SCell upon its expiry. sCellDeactivationTimer may be configured by RRC. The same initial timer value may apply to instances of the sCellDeactivationTimer for SCells. The configured SCells may be initially deactivated upon addition and/or after a handover. With the current sCellDeactivationTimer, SCell may be deactivated during the PRACH process. Transmission of uplink preamble on a deactivated SCell may increase battery power consumption and UE complexity. If preamble is transmitted on a deactivated SCell, UE may need to turn on processing related to uplink transmission of the SCell. UE may not transmit data on a deactivated SCell and transmission of preamble may require special processing in the UE and may complicate UE implementation. To address this issue, if the SCell is deactivated during an ongoing RA process on the SCell, for example because SCell deactivation timer expires, the ongoing random access process on the SCell may be aborted. When an SCell is deactivated, the UE may stop all uplink transmissions (for the SCell) including uplink preamble. UE may not transmit any uplink preamble when the SCell is deactivated. eNB may avoid or reduce the probability of such a scenario, by keeping the corresponding SCell activated during random access process. For example, eNB can explicitly activate the SCell before the random access process starts. An eNB may initiate a random access process when there is enough time for performing the entire random access process. UE may start the random access process on an activated SCell. But if the SCell deactivation timer (of the SCell that is used for preamble transmission) expires during the random access process, the UE may deactivate the SCell and may abort the random access process and may not transmit a preamble in the uplink. This process may prevent a situation in which the UE may send uplink signals on a deactivated SCell. If an SCell in a UE is deactivated after a preamble transmission on the SCell and before receiving a random access response corresponding to the preamble transmission, the UE may abort the random access process. A random access process on an SCell is initiated in a UE when the UE received a PDCCH order to transmit a preamble on the SCell. The random access process is considered successfully completed when the UE successfully decodes a corresponding RAR. If the SCell is deactivated after the random access process is initiated and before the random access process is completed, then the UE may abort the random access process.

According to some of the various aspects of embodiments, sCellDeactivationTimer may be maintained in a way to reduce SCell deactivation during the RA process. The UE may for a TTI and for a configured SCell, if the UE receives an Activation/Deactivation MAC control element in this TTI activating the SCell, the UE may in the TTI according to a predefined timing activate the SCell and start or restart the sCellDeactivationTimer associated with the SCell. Activating an SCell may imply applying normal SCell operation including: SRS transmissions on the SCell (if the SCell is in sync), CQI/PMI/RI/PTI reporting for the SCell, PDCCH monitoring on the SCell, PDCCH monitoring for the SCell. If the UE receives an Activation/Deactivation MAC control element in this TTI deactivating the SCell, or if the sCellDeactivationTimer associated with the activated SCell expires in this TTI, in the TTI according to a predefined timing: deactivate the SCell, stop the sCellDeactivationTimer associated with the SCell, flush all HARQ buffers associated with the SCell.

If PDCCH on the activated SCell indicates an uplink grant or downlink assignment, or if PDCCH on the Serving Cell scheduling the activated SCell indicates an uplink grant or a downlink assignment for the activated SCell, the UE may restart the sCellDeactivationTimer associated with the SCell. If the SCell is deactivated, the UE may: not transmit SRS on the SCell, not report CQI/PMI/RI/PTI for the SCell, not transmit on UL-SCH on the SCell, not monitor the PDCCH on the SCell, not monitor the PDCCH for the SCell, and/or not to transmit uplink preamble on the SCell.

In an example embodiment, an SCell deactivation timer of the SCell may be restarted when the UE receives a PDCCH order to transmit uplink preamble on the SCell. The SCell deactivation timer of the Cell carrying PDCCH order may also be restarted in cross carrier scheduling configuration. In an example implementation, an SCell deactivation timer of the SCell may be restarted when the UE transmits a random access preamble on the uplink the SCell.

Figure 11:
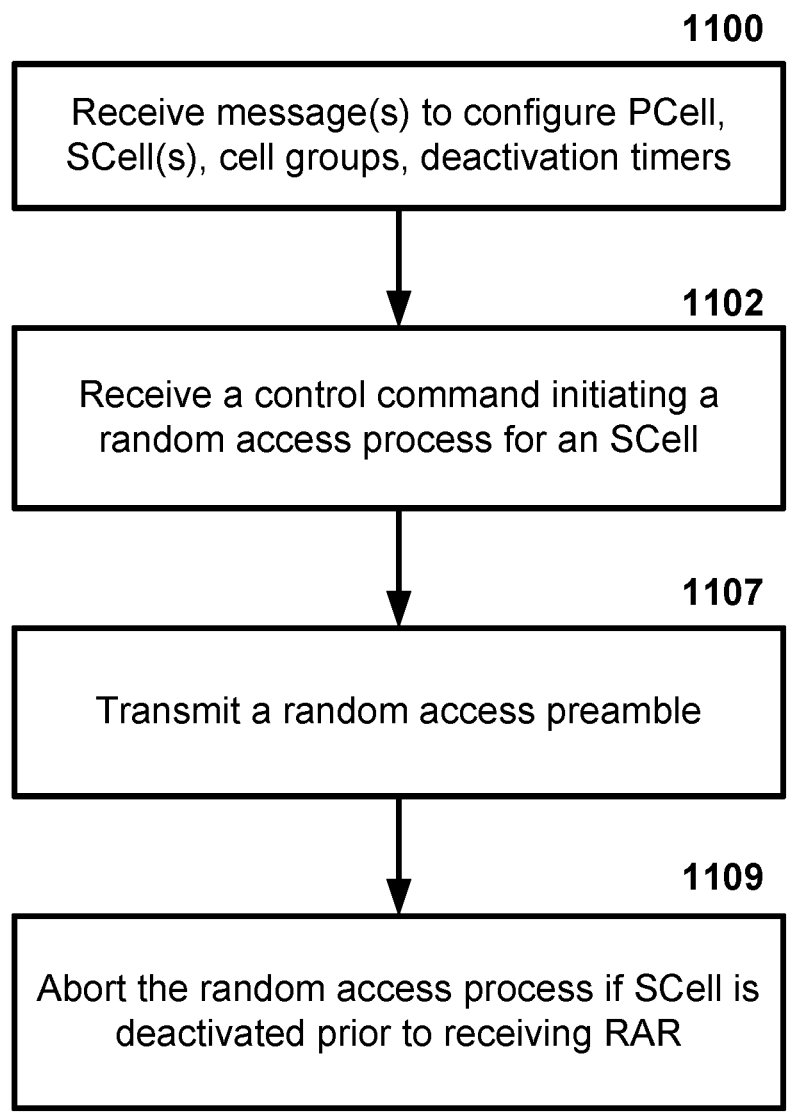
FIG. 11 is an example flow diagram illustrating an unsuccessful random access process as per an aspect of an embodiment of the present invention.

FIG. 11 is an example flow diagram illustrating an unsuccessful random access process as per an aspect of an embodiment of the present invention. According to some of the various embodiments, a wireless device may receive control message(s) from base station at 1100. The control message(s) may cause in the wireless device configuration of a plurality of cells comprising a primary cell and at least one secondary cell. The control message(s) may cause in the wireless device configuration of a deactivation timer for each secondary cell in the secondary cell(s). The deactivation timer may correspond to a secondary cell restarting in response to a packet transmission on the secondary cell. The corresponding secondary cell may be deactivated in the wireless device in response to the deactivation timer expiring. The deactivation timer associated with the secondary cell may be restarted by the wireless device if a random access response with an uplink grant for transmission on the secondary cell is received by the wireless device from the base station. In an example embodiment, the deactivation timer associated with the secondary cell may be restarted in response to the wireless device receiving the control command. The deactivation timer associated with a cell carrying the control command may be restarted if the cell is one of secondary cell(s). In an example implementation, the deactivation timer may be restarted in the wireless device when the wireless device transmits an uplink preamble.

According to some of the various embodiments, the control message(s) may cause in the wireless device assignment of each of the secondary cell(s) to a cell group in a plurality of cell groups. The plurality of cell groups may comprise a primary cell group and a secondary cell group. The primary cell group may comprise a first subset of the plurality of cells. The first subset may comprise the primary cell. Uplink transmissions by the wireless device in the primary cell group may employ a first synchronization signal transmitted on the primary cell as a primary timing reference. The secondary cell group may comprise a second subset of the secondary cell(s).

According to some of the various embodiments, the control message(s) may cause in the wireless device configuration of a time alignment timer for the secondary cell group. The time alignment timer may start or restart in response to the wireless device receiving a timing advance command to adjust uplink transmission timing on the secondary cell group.

According to some of the various embodiments, the wireless device may receive a control command (also called PDDCH order) initiating a random access process for a secondary cell in the secondary cell group in the wireless device at 1102. The control command may comprise a mask index and the random access preamble identifier.

According to some of the various embodiments, the wireless device may transmit a random access preamble on random access resources of the secondary cell in response to receiving the control command at 1107.

According to some of the various embodiments, at 1109, the wireless device may abort the random access process on the secondary cell if the secondary cell is deactivated before the wireless device receives a random access response for the random access preamble transmission. A downlink control channel of the primary cell for the random access response may be monitored after the random access preamble is transmitted. The random access response may comprise an identifier of the random access preamble. The random access response may be transmitted on the primary cell. The random access response may comprise a timing advance command for the secondary cell group.

According to some of the various embodiments, the wireless device may comprise communication interface(s), processor(s), and memory. The memory may store instructions. The processor(s) may execute the instructions to cause actions described herein.

According to some of the various embodiments, the wireless device may receive at least control message(s) from a base station at 1100. The control message(s) may cause in the wireless device configuration of a plurality of cells comprising a primary cell and at least one secondary cell.

The control message(s) may cause in the wireless device configuration of a deactivation timer for each secondary cell in the at least one secondary cell, the deactivation timer may correspond to a secondary cell restarting in response to a packet transmission on the secondary cell. The corresponding secondary cell may be deactivated in the wireless device in response to the deactivation timer expiring.

The control message(s) may cause in the wireless device assignment of each of the secondary cell(s) to a cell group in a plurality of cell groups. The plurality of cell groups may comprise a secondary cell group. The secondary cell group may comprise a second subset of the secondary cell(s).

The control message(s) may cause in the wireless device configuration of a time alignment timer for the secondary cell group. The time alignment timer may start or restart in response to the wireless device receiving a timing advance command to adjust uplink transmission timing on the secondary cell group.

According to some of the various embodiments, the wireless device may receive a control command initiating a random access process for a secondary cell in the secondary cell group in the wireless device at 1102. The control command may comprise a mask index and the random access preamble identifier.

According to some of the various embodiments, the wireless device may transmit a random access preamble on random access resources of the secondary cell in response to receiving the control command at 1107. The wireless device may monitor a downlink control channel of the primary cell for the random access response after transmitting the random access preamble. The wireless device may receive a random access response on the primary cell. The random access response may comprise a timing advance command for the secondary cell group. The random access response may comprise an identifier of the random access preamble.

According to some of the various embodiments, at 1109, the wireless device may abort the random access process on the secondary cell if the secondary cell is deactivated before the wireless device receives, on the primary cell, a random access response for the random access preamble transmission.

Figure 12:
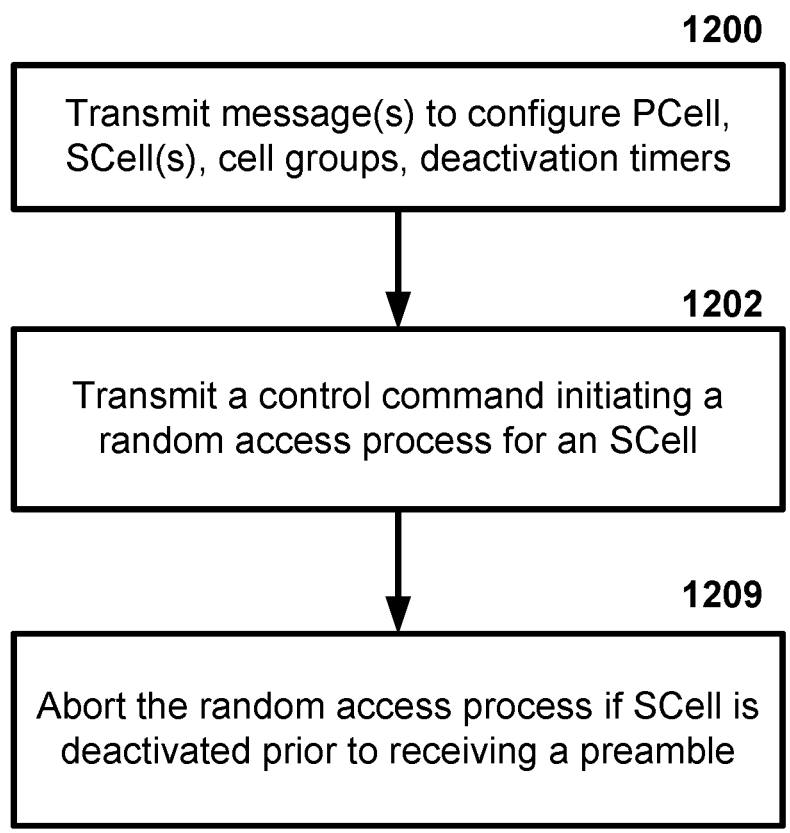
FIG. 12 is an example flow diagram illustrating an unsuccessful random access process as per an aspect of an embodiment of the present invention.

FIG. 12 is an example flow diagram illustrating an unsuccessful random access process as per an aspect of an embodiment of the present invention. A base station may transmit control message(s) to a wireless device at 1200. The control message(s) may be configured to cause in the wireless device configuration of a plurality of cells comprising a primary cell and at least one secondary cell.

According to some of the various embodiments, control message(s) may be configured to cause in the wireless device configuration of a deactivation timer for each secondary cell in secondary cell(s). The deactivation timer may correspond to a secondary cell restarting in response to a packet transmission on the secondary cell. The corresponding secondary cell may be deactivated in the wireless device in response to the deactivation timer expiring.

According to some of the various embodiments, control message(s) may be configured to cause in the wireless device assignment of each of the secondary cell(s) to a cell group in a plurality of cell groups. The plurality of cell groups may comprise a secondary cell group. The secondary cell group may comprise a second subset of the secondary cell(s).

According to some of the various embodiments, control message(s) may comprise a plurality of common parameters for the secondary cell. The plurality of common parameters may comprise a plurality of random access resource parameters identifying the random access resources and a plurality of power control parameters. Control message(s) may comprise a plurality of random access resource parameters. The plurality of random access resource parameters may comprise: an index; a frequency offset; and a plurality of sequence parameters. Control message(s) may comprise a plurality of media access control dedicated parameters comprising a plurality of time alignment timer values. Each time alignment timer value may be associated with a unique cell group in the wireless device.

According to some of the various embodiments, the base station may transmit a control command initiating a random access process for a secondary cell in the secondary cell group at 1202. The control command may be configured to cause the wireless device to transmit a random access preamble on random access resources of the secondary cell.

According to some of the various embodiments, at 1209, the base station may abort the random access process on the secondary cell if the secondary cell is deactivated before the base station receives the random access preamble on the random access resources.

The base station may receive the random access preamble from the wireless device. The base station may transmit a random access response comprising an uplink grant to the wireless device. The base station may abort the random access process if the secondary cell is deactivated before the base station receives an uplink packet from the wireless device in response to the uplink grant.

According to some of the various aspects of embodiments, for pTAG, in the case of RACH failure MAC and RRC layers perform certain functions. When the number of RA preamble transmissions reaches preambleTransMax, MAC layer in the UE may indicate Random Access problem to upper layers. UE may or may not continue RACH procedure, i.e. transmit the preamble. When RRC is informed of RACH failure from MAC, if neither T300, T301, T304 nor T311 is running, the RRC layer may trigger reestablishment if AS (access stratum) security has been activated. Otherwise the UE may directly move to RRC_IDLE. The RACH procedure may be stopped and other processes, for example, connection reestablishment, may start. For pTAG, when the number of RA preamble transmissions reaches preambleTransMax, the RACH procedure may be stopped by further RRC procedures. For pTAG, if random access fails, MAC may indicate a random access problem to upper layers and RRC may declare radio link failure and initiate RRC connection re-establishment procedure.

The purpose of RRC connection re-establishment procedure may be to re-establish the RRC connection, which involves the resumption of SRB1 operation, the re-activation of security and/or the configuration of the PCell. The UE may initiate the procedure when AS security has been activated. The UE may initiate the procedure upon detecting radio link failure. A UE in RRC_CONNECTED, for which security has been activated, may initiate the procedure in order to continue the RRC connection. The connection re-establishment may succeed if the concerned cell is prepared i.e. has a valid UE context. In case E-UTRAN accepts the re-establishment, SRB1 (signalling radio bearer one) operation resumes while the operation of other radio bearers remains suspended. If AS security has not been activated, the UE may not initiate the procedure but instead may directly move to RRC_IDLE. E-UTRAN may apply RRC connection re-establishment procedure to reconfigure SRB1 and to resume data transfer for this RB (radio bearer) and/or to re-activate AS security without changing algorithms.

If either T300, T301, T304 or T311 is running, when RACH problem is indicated from MAC to RRC, the RRC layer may do different handling if corresponding Timer expired. According to some of the various aspects of embodiments, timer T300 starts by transmission of RRC-ConnectionRequest and stops by reception of RRCConnectionSetup or RRCConnectionReject message, cell re-selection and upon abortion of connection establishment by upper layers. If timer T300 expires, UE may reset MAC, release the MAC configuration and re-establish RLC for all RBs that are established. UE may also inform upper layers about the failure to establish the RRC connection, upon which the procedure may end. Timer T301 starts by transmission of RRCConnectionReestabilshmentRequest and stops by reception of RRCConnectionReestablishment or RRCConnectionReestablishmentReject message as well as when the selected cell becomes unsuitable. After expiry UE may go to Go to RRC_IDLE. Timer T304 starts by reception of RRCConnectionReconfiguration message including the MobilityControl Info or reception of MobilityFromEUTRACommand message including CellChangeOrder and stops by criterion for successful completion of handover to EUTRA or cell change order is met (the criterion is specified in the target RAT in case of inter-RAT). At expiry, in case of cell change order from E-UTRA or intra E-UTRA handover, UE may initiate the RRC connection re-establishment procedure; In case of handover to E-UTRA, UE may perform the actions applicable for the source RAT. Timer T311 starts by initiating the RRC connection re-establishment procedure and stops by selection of a suitable E-UTRA cell or a cell using another RAT. After expiry UE may enter RRC_IDLE.

UE may not perform radio link monitoring (RLM) on SCells. eNB may prevent any UL transmission (PUSCH, SRS and ordered RA) on an SCell by a UE if the UE SCell is in insufficient radio conditions. RLM on SCells may not be required. RACH on an SCell in an sTAG may be triggered when sTAG is out-of-sync. RACH on an SCell in an sTAG may also be triggered when sTAG is in-sync. The RACH on an SCell may be used to synchronize sTAG for UL data transmission. In this case, normally PCell is in sync and there may be no need to trigger reestablishment for SCell RACH failure. The eNB may configure other suitable SCells if available and RRC connection reestablishment may not be needed. In another example, when the eNB detects SCell RACH failure itself, the eNB may deactivate or release the SCell in order to stop preamble transmission or the eNB may release UL of that SCell or remove the SRS and may stop scheduling on UL resources of that SCell.

RACH triggered on SCell may be unrelated to initial setup, HO, or reestablishment procedure. No further RRC procedure may be used to stop it. UE may autonomously stop SCell RACH process if SCell RACH process fails. When the number of RA preamble transmissions reaches its maximum number, the UE may stop preamble transmission. The UE may stop preamble transmission on SCell and may not report Random Access problem to upper layers when the number of RA preamble transmissions on SCell reaches preambleTransMax. UE may let eNB detect SCell RA failure. eNB may detect RA failure by its own timer. eNB may set the timer value according to configured RA parameters (e.g. the maximum number of preamble transmissions, etc). eNB may start a timer when triggering RA on SCell using a PDCCH order, and upon the timer expiry eNB may consider a RA failure. When SCell RA fails, eNB may detect the failure without UE reporting it to the eNB. eNB may then take a proper action, such as restarting RACH process on the same SCell or a different SCell in the same sTAG, or de-configuring the sCell with failed RACH process. This process may reduce the number of radio link failures in the system, since there will be no radio link failure in response to random access process failure in sTAGs. Furthermore, automatic detection of random access failure in sTAG by the base station may reduce signaling overhead, since the UE does not need to inform the base station about random access failure in an sTAG. In an improved process, random access process failure in the pTAG may initiate radio link failure, but random access process failure in an sTAG does not initiate radio link failure. Furthermore, overhead in signaling is reduced by introducing automatic eNB detection of the random access failure in an sTAG without UE informing the eNB. This process may increase radio network efficiency and reduce signaling overhead.

Upon reaching the maximum number of transmitted preambles in an SCell, UE MAC may not indicate RACH failure to RRC. The UE may keep RRC connection active (UE stays in RRC-connected mode), but stop random access transmission for the initiated random access process (UE considers the process unsuccessful). UE does not leave RRC-connected mode in response to an unsuccessful random access process for an SCell. RRC may not trigger radio link failure (RLF). UE may not report this condition to eNB. In a random access process, if PREAMBLE_TRANSMISSION_COUNTER in the UE is equal to preambleTransMax+1, and the Random Access Preamble is transmitted on the PCell, the UE may indicate a Random Access problem to upper layers (for example RRC layer). In a random access process, if PREAMBLE_TRANSMISSION_COUNTER in the UE is equal to preambleTransMax+1, and the Random Access Preamble is transmitted on the SCell, UE may consider the Random Access procedure unsuccessfully completed. At completion of the Random Access procedure, the UE may discard explicitly signalled ra-PreambleIndex and ra-PRACH-MaskIndex. At completion of the Random Access procedure, the UE may stop transmission of the signaled random access preamble in the uplink. UE may stop transmission of random access preamble on an SCell at least until another PDCCH order for transmission of random access preamble on the SCell is received from the eNB.

In one example embodiment, eNB may initiate sTAG random access when the sTAG is out-of-sync, when the UE sTAG is in out-of synch state and SCell RA fails, uplink timing is still out-of-sync, and the sTAG may stay in out-of-sync state. When sTAG is in out-of-sync state the following may occur: SRS transmissions may be stopped on the corresponding SCells in the sTAG, the type-0 SRS configuration may be released, the type-1 SRS configuration may be maintained, CSI reporting configuration for the corresponding SCells may be maintained, and/or MAC may flush the uplink HARQ buffers of the corresponding SCells.

In one example embodiment, eNB may initiate sTAG RA procedure when the sTAG is in-sync. eNB may trigger SCell RA on in-sync SCell, for example when it detects that the uplink timing is deteriorating or time-alignment timer is expiring, and sTAG needs initial uplink synchronization. In an example embodiment, if SCell RA fails, eNB and UE may not change the SCell sync state and TAT for the sTAT may continue running until it is expired. eNB may take a proper action upon detection of RACH failure on sTAG. For example, if there is another SCell in this TAG, the eNB may trigger RACH in another SCell for sync purpose. The SCells in sTAG may still be in sync. eNB may start RACH on another cell, which may be completed successfully. UE may not change sTAG status from in-sync to out-of-sync on its own if RACH-process on an in-sync sTAG fails. sTAG status may change from in-sync to out-of-sync, when TAT of the sTAG is expired or is not running.

According to some of the various aspects of embodiments, MAC may indicate a random access problem to higher layers when random access on PCell fails, and MAC may not indicate a random access problem when random access on SCell fails. No special UE upper layer behavior for SCell UL random access problem may be defined and network-based detection and control may be assumed sufficient. Random access failure on SCell may be mainly handled by L1/L2. The eNB may detect random access problem, and there may be less RRC impact compared with PCell RACH failure. PCell Random Access problem may be used by RRC layer to trigger reestablishment procedure. UE may not trigger reestablishment for RACH failure on SCell and the eNB may handle RACH failure on SCell itself. UE may not report SCell RACH failure to RRC layer inside UE.

Figure 13:
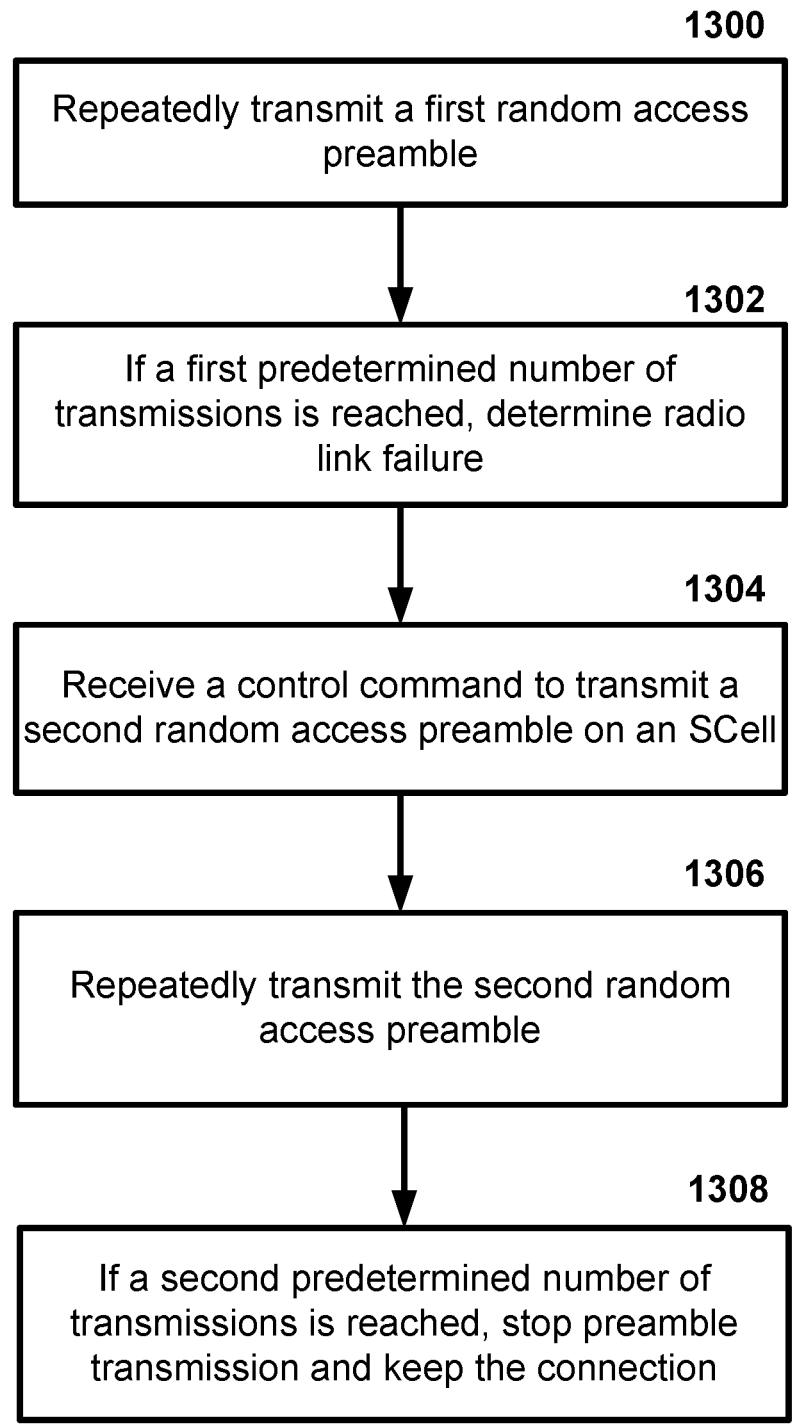
FIG. 13 is an example flow diagram illustrating an unsuccessful random access process as per an aspect of an embodiment of the present invention.

FIG. 13 is an example flow diagram illustrating an unsuccessful random access process as per an aspect of an embodiment of the present invention.

According to some of the various embodiments, a wireless device may repeatedly transmit a first random access preamble on a primary cell at block 1300. The transmissions may continue until a condition is met. Example conditions include: until a first random access response corresponding to the first random access preamble is received from a base station; or a first predetermined number of transmissions is reached. The first random access preamble may be transmitted one time if a first random access response is received after the first transmission of the first random access preamble.

According to some of the various embodiments, at block 1302, if the first predetermined number of transmissions is reached without receiving the first random access response: a random access problem may be indicated to a radio resource control layer in the wireless device; and the radio resource control layer may determine a radio link failure.

According to some of the various embodiments, at block 1304, the wireless device may receive at least one control message from the base station. The control message(s) may cause in the wireless device: configuration of a plurality of cells. The plurality of cells may comprise a primary cell and at least one secondary cell. The control message(s) may cause in the wireless device assignment of each of the secondary cell(s) to a cell group in a plurality of cell groups. The plurality of cell groups may comprise a secondary cell group. The secondary cell group may comprise a subset of secondary cell(s).

According to some of the various embodiments, the wireless device may receive a control command causing the wireless device to transmit a second random access preamble on a first secondary cell in the secondary cell group. The first secondary cell may be an activated secondary cell.

According to some of the various embodiments, at block 1306, the wireless device may repeatedly transmit the second random access preamble until: a second random access response corresponding to the second random access preamble is received; or a second predetermined number of transmissions is reached.

According to some of the various embodiments, at block 1308, if the second predetermined number of transmissions is reached without receiving the second random access response, the wireless device may stop transmission of the second random access preamble; and keep a connection with the base station active.

According to some of the various embodiments, the first random access response may comprise a first random access preamble identifier corresponding to the first random access preamble. The second random access response may comprise a second random access preamble identifier corresponding to the second random access preamble.

According to some of the various embodiments, the wireless device may enter a no uplink transmission status for the secondary cell group until at least another control command is received from the base station if the second predetermined number of retransmissions is reached.

According to some of the various embodiments, if the second predetermined number of transmissions is reached, the wireless device may enter an out-of-sync status if the wireless device was in-sync before the wireless device receives the control command. If the second predetermined number of transmissions is reached, the wireless device may stay in the out-of-sync status if the wireless device was in the out-of-sync status before the wireless device receives the control command. The wireless device may stay in an in-sync status if a corresponding time alignment timer of the secondary cell group is running when the second predetermined number of transmissions is reached.

According to some of the various embodiments, a connection re-establishment process may be triggered by the wireless device if the first predetermined number of transmissions is reached without receiving the first random access response.

According to some of the various embodiments, a wireless device may repeatedly transmit a first random access preamble on a primary cell at block 1300 until: a first random access response corresponding to the first random access preamble is received from the base station; or a first predetermined number of transmissions is reached. At block 1302

According to some of the various embodiments, at block 1302, a random access problem to a radio resource control layer in the wireless device may be indicated and the radio resource control layer may determine a radio link failure if the first predetermined number of transmissions is reached without receiving the first random access response:

According to some of the various embodiments, at block 1304, the wireless device may receive a control command causing the wireless device to transmit a second random access preamble on a first secondary cell. The control command may comprise a mask index and the random access preamble identifier.

According to some of the various embodiments, at block 1306, the wireless device may repeatedly transmit the second random access preamble until: a second random access response corresponding to the second random access preamble is received; or a second predetermined number of transmissions is reached.

According to some of the various embodiments, at block 1308, the wireless device may stop transmission of the second random access preamble and keep a connection with the base station active if the second predetermined number of transmissions is reached without receiving the second random access response.

According to some of the various embodiments, a connection re-establishment process may be triggered by the wireless device if the first predetermined number of transmissions is reached without receiving the first random access response.

According to some of the various embodiments, the primary cell may be assigned to a primary cell group and the first secondary cell may be assigned to a secondary cell group. The uplink signals transmitted by the wireless device in the primary cell group may employ a first synchronization signal transmitted on the primary cell as a first timing reference. The uplink signals transmitted by the wireless device in the secondary cell group may employ a second synchronization signal transmitted on an activated secondary cell in the secondary cell group as a second timing reference. The wireless device may stop uplink transmissions in the secondary cell group if the second predetermined number of transmissions is reached without receiving the second random access response.

According to some of the various embodiments, the wireless device may stop uplink transmissions in the first secondary cell if the second predetermined number of transmissions is reached without receiving the second random access response.

According to some of the various embodiments, the wireless device may receive control message(s) from the base station. The control message may comprise the first predetermined number and the second predetermined number.

According to some of the various embodiments, the wireless device may comprise communication interface(s), processor(s), and memory. The memory may store instructions. The processor(s) may execute the instructions to cause actions described herein.

According to some of the various embodiments, the wireless device may repeatedly transmit a first random access preamble on a primary cell until: a first random access response corresponding to the first random access preamble is received from the base station; or a first predetermined number of transmissions is reached. If the first predetermined number of transmissions is reached without receiving the first random access response: a random access problem may be indicated to a radio resource control layer in the wireless device; and the radio resource control layer may determine a radio link failure. The wireless device may receive a control command causing the wireless device to transmit a second random access preamble on a first secondary cell. The wireless device may repeatedly transmit the second random access preamble until: a second random access response corresponding to the second random access preamble is received; or a second predetermined number of transmissions is reached. If the second predetermined number of transmissions is reached without receiving the second random access response: transmission of the second random access preamble may be stopped and a connection with the base station may be kept active.

The control command may comprise a mask index and the random access preamble identifier. The primary cell may be assigned to a primary cell group. The first secondary cell may be assigned to a secondary cell group. The first random access response may comprise a first random access preamble identifier corresponding to the first random access preamble. The second random access response may comprise a second random access preamble identifier corresponding to the second random access preamble.

According to some of the various aspects of embodiments, when the TAT associated with the pTAG expires, all TATs may be considered as expired and the UE may flush all HARQ buffers of all serving cells, may clear any configured downlink assignment/uplink grants, and/or RRC may release PUCCH/SRS for all configured serving cells as in Rel-10. The UE may not perform any uplink transmission except the random access preamble transmission when TAT for pTAG is not running.

For primary TAG if timeAlignmentTimer is stopped or expired UE and/or eNB may not indicate the generated positive or negative acknowledgement to the physical layer. If primary TAG timeAlignmentTimer is running, UE and/or eNB may indicate the generated positive or negative acknowledgement for a TB to the physical layer. The UE may follow LTE Rel-10 behaviour for DL HARQ feedback handling when the PCell-TAT is stopped or expired.

When the TAT associated with sTAG expires, SRS transmissions may be stopped on the corresponding SCells. In an example implementation, the type-0 SRS configuration may be released, but the type-1 SRS configuration may be maintained. CSI reporting configuration for the corresponding SCells may be maintained. MAC may flush the uplink HARQ buffers of the corresponding SCells. MAC may stop transmission of HARQ feedback in the downlink to the UE. Whether the SCell-TAT is running or not may not impact the HARQ feedback transmission in the uplink. Uplink HARQ feedback may be transmitted on PUCCH on PCell, and downlink HARQ feedback may be transmitted on the same or different serving cell as uplink transmission depending on cross carrier scheduling. This process may improve network performance. Upon expiry of TAT for an sTAG, many of the activities in the SCells assigned to sTAG may continue. For example, the UE may still receive downlink data on the SCells, transmit CSI for the downlink of uplink out-of-sync SCells, and transmit ACK/NACK for downlink data received on SCells belonging to an out-of-sync sTAG. This process may not de-configure, deactivate, and/or stop all activities on SCells of out-of-sync sTAG, and therefore may improve overall radio link efficiency.

Figure 14:
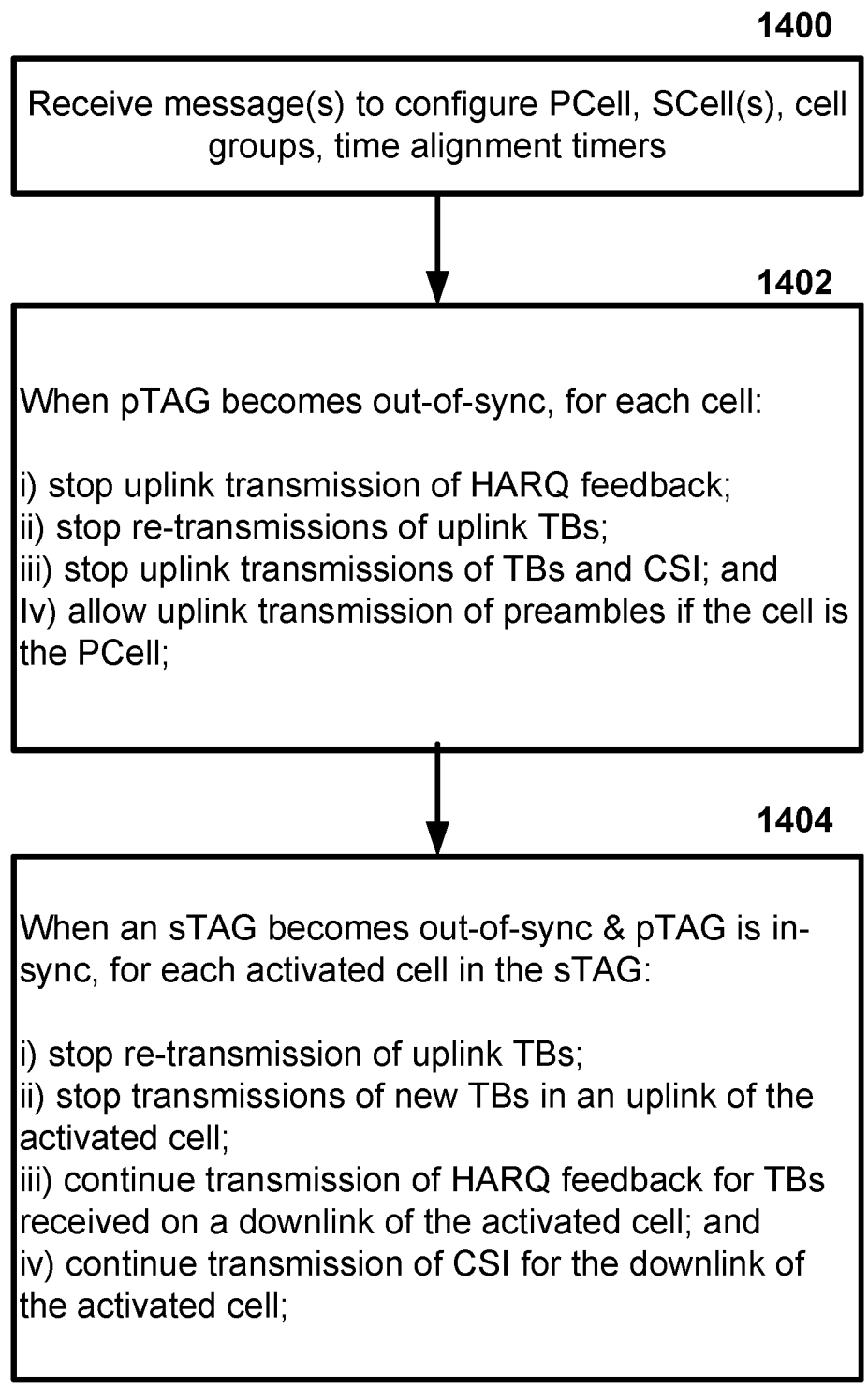
FIG. 14 is an example flow diagram illustrating mechanisms in a wireless device when a time alignment timer expires as per an aspect of an embodiment of the present invention.

FIG. 14 is an example flow diagram illustrating mechanisms in a wireless device when a time alignment timer expires as per an aspect of an embodiment of the present invention. According to some of the various embodiments, a wireless device may receive control message(s) from a base station at block 1400. The control message(s) may cause in the wireless device configuration of a plurality of cells comprising a primary cell and at least one secondary cell. The control message(s) may cause in the wireless device assignment of each of the secondary cell(s) to a cell group in a plurality of cell groups. The plurality of cell groups may comprise a primary cell group and a secondary cell group. The primary cell group may comprise a first subset of the plurality of cells. The first subset may comprise the primary cell. The secondary cell group may comprise a second subset of the secondary cell(s).

According to some of the various embodiments, the control message(s) may cause in the wireless device configuration of a time alignment timer for each of the plurality of cell groups. The time alignment timer may start or restart in response to the wireless device receiving a timing advance command to adjust the uplink transmission timing of a commanded cell group in the plurality of cell groups. The commanded cell group may be considered out-of-sync in response to the time alignment timer being expired or not running. The commanded cell group may be considered in-sync in response to the time alignment timer running.

The control message(s) may comprise a media access control dedicated information element. The media access control dedicated information element may comprise a sequence of first information element(s). Each of the first information element(s) may comprise: a first cell group index of a first secondary cell group; and a first time alignment timer for the first secondary cell group.

According to some of the various embodiments, when the primary cell group becomes out-of-sync, a series of actions may occur as illustrated in example block 1402. For each cell in the primary cell group and the secondary cell group: the uplink transmission of HARQ feedback may be stopped; re-transmissions of uplink transport blocks in response to downlink HARQ feedback may be stopped; uplink transmissions comprising transport block transmissions and channel state information transmissions may be stopped; and uplink transmission of at least one random access preamble may be allowed if the cell is the primary cell. The random access preamble(s) may be transmitted on the primary cell.

According to some of the various embodiments, a series of actions may occur as illustrated in example block 1404 for each activated cell in the secondary cell group when the secondary cell group becomes out-of-sync and the primary cell group is in-sync. In this case, for each activated cell in the secondary cell group: re-transmission of uplink transport blocks in response to downlink negative HARQ feedback may be stopped; transmissions of new transport blocks in an uplink of the activated cell may be stopped; transmission of HARQ feedback for transport blocks received on a downlink of the activated cell may continue; and transmission of channel state information for the downlink of the activated cell on an uplink carrier not belonging to the secondary cell group may be continued. Uplink transmission of at least one second random access preamble may be allowed on the secondary cell group when the secondary cell group becomes out-of-sync and the primary cell group is in-sync.

According to some of the various embodiments, when the secondary cell group is out-of-sync and the primary cell group is in-sync, for each activated cell in the secondary cell group, the continuing transmission of HARQ feedback may employ: a physical uplink control channel on the primary cell; or uplink control information feedback in a transport block transmitted on a shared data channel of an uplink carrier not belonging to the secondary cell group. When the secondary cell group is out-of-sync and the primary cell group is in-sync, for each activated cell in the secondary cell group, the continuing transmission of channel state information employs: a physical uplink control channel on the primary cell; or uplink control information feedback in a transport block transmitted on a shared data channel of an uplink carrier not belonging to the secondary cell group.

According to some of the various embodiments, for each cell in the plurality of cells, a radio resource control may be notified to release a sounding reference signal when the primary cell group becomes out-of-sync. For each activated cell in the secondary cell group, a radio resource control may be notified to release a sounding reference signal when the secondary cell group becomes out-of-sync and the primary cell group is in-sync.

According to some of the various embodiments, the wireless device may be assigned, by the configuration, a plurality of media access control dedicated parameters. The media access control dedicated parameters may comprise a plurality of time alignment timer values. Each of the plurality of time alignment timer values may be associated with a time alignment timer of a cell group. The wireless device may be assigned, by the configuration, a plurality of media access control dedicated parameters comprising a plurality of time alignment timer values, each of the plurality of time alignment timer values may be associated with a unique cell group in the wireless device.

According to some of the various embodiments, a wireless device may receive control message(s) from a base station at block 1400. The control message(s) may cause in the wireless device configuration of a plurality of cells comprising a primary cell and at least one secondary cell. The control message(s) may cause in the wireless device assignment of each of the secondary cell(s) to a cell group in a plurality of cell groups. The plurality of cell groups may comprise a primary cell group and a secondary cell group. The primary cell group may comprise a first subset of the plurality of cells. The first subset may comprise the primary cell. The secondary cell group may comprise a second subset of the secondary cell(s). The control message(s) may cause in the wireless device configuration of a time alignment timer for each of the plurality of cell groups. The time alignment timer may start or restart in response to the wireless device receiving a timing advance command to adjust uplink transmission timing of a commanded cell group in the plurality of cell groups.

According to some of the various embodiments, the wireless device may receive timing advance command(s) from the base station. The timing advance command may comprise: a time adjustment value; and an index identifying the secondary cell group. The timing advance command(s) may be configured to cause substantial alignment of reception timing of the uplink signals in frames and subframes of the secondary cell group at the base station. The time alignment timer of the secondary cell group may be restarted in response to receiving a timing advance command in the at least one timing advance command.

According to some of the various embodiments, as illustrated in block 1402, when a first time alignment timer of the primary cell group expires, for each cell in the primary cell group and the secondary cell group: uplink transmission of HARQ feedback may be stopped; re-transmissions of uplink transport blocks in response to downlink HARQ feedback may be stopped; uplink transmissions comprising transport block transmissions and channel state information transmissions may be stopped; and uplink transmission of at least one random access preamble may be allowed if the cell is the primary cell.

The primary cell group may comprise a first subset of the plurality of cells. The first subset may comprise the primary cell. Uplink transmissions by the wireless device in the primary cell group may employ a first synchronization signal transmitted on the primary cell. The second cell group may comprise a second subset of the plurality of cells. The second subset may comprise a reference secondary cell. Uplink transmissions in the secondary cell group may employ a second synchronization signal on the reference secondary cell as a secondary timing reference.

According to some of the various embodiments, as illustrated in block 1404, when a second time alignment timer of the secondary cell group expires and the first time alignment timer is running, for each activated cell in the secondary cell group: re-transmission of uplink transport blocks in response to downlink negative HARQ feedback may be stopped; transmissions of new transport blocks in an uplink of the activated cell may be stopped; transmission of HARQ feedback for transport blocks received on a downlink of the activated cell may be continued; and transmission of channel state information for the downlink of the activated cell on an uplink carrier not belonging to the secondary cell group may be continued.

According to some of the various embodiments, the wireless device may comprise communication interface(s), processor(s), and memory. The memory may store instructions. The processor(s) may execute the instructions to cause actions described herein.

According to some of the various embodiments, the wireless device may receive at least one control message from a base station at 1400. The control message(s) may cause in the wireless device configuration of a plurality of cells. The plurality of cells may comprise a primary cell secondary cell(s). The control message(s) may cause in the wireless device assignment of each of the secondary cell(s) to a cell group in a plurality of cell groups. The plurality of cell groups may comprise a primary cell group and a secondary cell group. The primary cell group may comprise a first subset of the plurality of cells. The first subset may comprise the primary cell. The secondary cell group may comprise a second subset of the secondary cell(s). The control message(s) may cause in the wireless device configuration of a time alignment timer for each of the plurality of cell groups. The time alignment timer may start or restart in response to the wireless device receiving a timing advance command to adjust uplink transmission timing of a commanded cell group in the plurality of cell groups.

The control message(s) may comprise a media access control dedicated information element. The media access control dedicated information element may comprise a sequence of first information element(s). Each of the first information element(s) may comprise: a first cell group index of a first secondary cell group; and a first time alignment timer for the first secondary cell group.

According to some of the various embodiments, at block 1402, when a first time alignment timer of the primary cell group expires, for each cell in the primary cell group and the secondary cell group: uplink transmission of HARQ feedback may be stopped; re-transmissions of uplink transport blocks in response to downlink HARQ feedback may be stopped; uplink transmissions comprising transport block transmissions and channel state information transmissions may be stopped; and uplink transmission of random access preamble(s) may be allowed if the cell is the primary cell. The random access preamble(s) may be transmitted on the primary cell.

According to some of the various embodiments, at block 1402, when a second time alignment timer of the secondary cell group expires and the first time alignment timer is running, for each activated cell in the secondary cell group: re-transmission of uplink transport blocks in response to downlink negative HARQ feedback may be stopped; transmissions of new transport blocks in an uplink of the activated cell may be stopped; transmission of HARQ feedback for transport blocks received on a downlink of the activated cell may be continued; and transmission of channel state information for the downlink of the activated cell on an uplink carrier not belonging to the secondary cell group may be continued.

The wireless device may be assigned, by the configuration, a plurality of media access control dedicated parameters. The media access control dedicated parameters may comprise a plurality of time alignment timer values. Each of the time alignment timer values may be associated with a time alignment timer of a cell group. The wireless device may be assigned, by the configuration, a plurality of media access control dedicated parameters. The media access control dedicated parameters may comprise a plurality of time alignment timer values. Each of the time alignment timer values may be associated with a unique cell group in the wireless device.

The wireless device may transmit a second random access preamble on a secondary cell of the secondary cell group in response to receiving a control command from the base station when: the second time alignment timer of the secondary cell group is expired; and the first time alignment timer is running.

Frames and subframe transmission timing for all downlink carriers in the primary cell group and the secondary cell group of a base station may be substantially time aligned with each other. Frames and subframe for all downlink carriers in the primary cell group and the secondary cell group are transmitted and their timing are controlled by the same base station, and therefore achieving an accurate time alignment by the base station would be feasible by the base station. The accuracy would be better than a fraction of a subframe, for example 10 micro-sec or better. For example, timing alignment error between downlink carriers belonging to different bands may be within 1.3 micro-seconds. In another example, for carriers in the same band the synchronization may be more accurate and may be below 1 microsecond.

According to some of the various aspects of embodiments, frames and subframe transmission timing for all downlink carriers in the primary cell group and the secondary cell group of the base station may be substantially time aligned with frames and subframe transmission timing of all downlink carriers in the plurality of base stations. This may be an optional synchronization requirement to enhance network performance and some network may not use this requirement. Such a time alignment requires, for example, coordination and signalling among the plurality of base stations. In another example, it requires that the plurality of base stations use the same synchronization source such as GPS signalling, some other sort of centralized algorithm, and/or some packet based synchronization system to achieve synchronization. Time alignment process between frames and subframes of the plurality of base stations thus may involve many external factors, and therefore the accuracy of time alignment may not be precise, but it may be substantially within certain pre-defined accuracy limits. Time alignment between carriers of the same base stations may be a simpler task compared with time alignment between carriers of multiple base stations. The accuracy of the former task may be higher than the accuracy of the later task. Therefore, the term substantially aligned here may imply that the carriers are substantially time aligned within a certain time alignment accuracy range. For example, in an implementation the error may be below half a subframe, a small fraction of a subframe, or for example 10 micro-seconds, or less.

Frames and subframe transmission timing for all uplink carriers in the primary cell group of the wireless device may be substantially time aligned with each other. Frames and subframe transmission timing for all uplink carriers in the secondary cell group of the wireless device may be substantially time aligned with each other. Frames and subframe transmission timing for uplink carriers in the primary cell group of the wireless device may not necessarily be time aligned with frames and subframe transmission timing for uplink carriers in the secondary cell group of the wireless device. Uplink transmission timing in different cell groups in the wireless device may be adjusted according to a different set of MAC time alignment commands, and may employ a different Cell timing reference. Substantial time alignment here may be considered in the context. In a wireless device, uplink signal transmission may not time aligned if they are not precisely time aligned. A wireless device may use a different downlink synchronization signals and/or time alignment commands to align uplink transmission in different carrier groups. Because the same device is generating the signal. The substantial alignment here may imply that the wireless device makes every effort to align transmission timing and may use the same timing reference. However, uplink transmission timing of uplink carriers in the primary cell group and the secondary cell group may not be exactly time aligned. Different cell groups use different downlink synchronization signals as the reference timing, and time alignment commands for the uplink are different for the primary cell group and secondary cell group uplink transmission. In an example, in a wireless signal uplink transmission even a few micro-second mis-alignment between uplink transmissions in two different carrier groups may be considered as not being substantially time aligned. Uplink transmission timing between cells in different cell groups, for example may differ up to 30 micro-seconds depending on cell radius, repeater locations, and/or the like.

According to a first embodiment, the plurality of time alignment commands may substantially align frame and subframe reception timing of signals transmitted by the plurality of wireless devices to the base station in the primary cell group. The plurality of time alignment commands may substantially align frame and subframe reception timing of signals transmitted by the plurality of wireless devices to the base station in the secondary cell group. The base station may employ time alignment commands in order to substantially time align uplink signals received from the same carrier group in different wireless devices, even though signal propagation/processing time may be different for different carrier groups. Each device may have a different signal propagation/processing delay, because of its distance to the base station, or its receiver structure, and/or the like. In this context, the substantial time alignment criteria is determined by a base station performance criteria, and in normal condition the base station may transmit the time alignment commands with the goal of achieving a substantial time alignment in the uplink. When signal reception timing in the base station deviates more than a threshold from a reference time for signals received from a wireless device, the base station may transmit a time alignment command to adjust the wireless device transmission timing. The reference eNB reception time may not be exactly the same for different carrier groups. The TA commands may have a resolution in the range of 1.6 micro-seconds.

According to a second embodiment, the plurality of time alignment commands may substantially align frame and subframe reception timing of signals transmitted by the plurality of wireless devices to the base station in the primary cell group and the secondary cell group. In this embodiment, time alignment commands are transmitted in order to maintain the same reception timing at the base station among all carriers of the cell, including all carriers in the primary cell group and secondary cell group. This process may require a more complex time alignment procedure in the base station, but may provide advantages because frames and subframes of all uplink transmissions by all wireless devices on all uplink carriers are substantially the same in the base station. The substantial time alignment implies that the base station may transmit time alignment commands to achieve such a time alignment in the received signal of all uplink carriers from all wireless devices in the coverage area of for example a base station sector. The base station may employ time alignment commands in order to substantially time align uplink signals received from different carrier groups in the same wireless device as well as signals received from a plurality of wireless devices, even though signal propagation/processing time may be different for different carrier groups and from different wireless devices. When signal reception timing in the base station deviates more than a threshold from a reference time for signals received from a wireless device, the base station may transmit a time alignment command to adjust the wireless device transmission timing. The reference eNB reception time may be the same for different wireless devices and for different carrier groups. The TA commands may have a resolution in the range of 1.6 micro-seconds.

Figure 15:
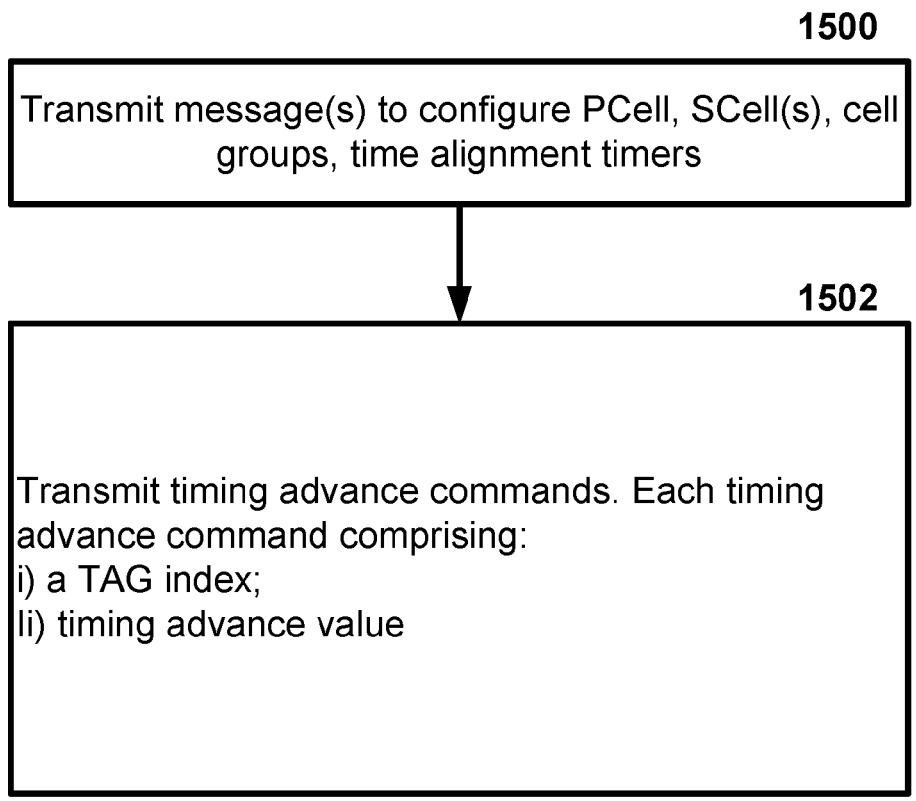
FIG. 15 is an example flow diagram illustrating a base station process for configuring multiple cell groups as per an aspect of an embodiment of the present invention.

FIG. 15 is an example flow diagram illustrating a base station process for configuring multiple cell groups as per an aspect of an embodiment of the present invention. According to some of the various embodiments, a base station in a plurality of base stations may transmit control message(s) to a wireless device at block 1500. The plurality of base stations may be compatible with LTE release 11 or above and support multiple timing advance groups.

According to some of the various embodiments, the control message(s) may be configured to cause in the wireless device configuration of a plurality of cells. The plurality of cells may comprise a primary cell and at least one secondary cell. The control message(s) may be configured to cause in the wireless device to assign of each of the secondary cell(s) to a cell group in a plurality of cell groups. The plurality of cell groups may comprise a primary cell group and a secondary cell group. The primary cell group may comprise a first subset of the plurality of cells. The first subset may comprise the primary cell. Uplink transmissions by the wireless device in the primary cell group may employ a first synchronization signal transmitted on the primary cell as a primary timing reference. The secondary cell group may comprise a second subset of the secondary cell(s). The second subset may comprise a reference secondary cell. Uplink transmissions in the secondary cell group may employ a second synchronization signal on the reference secondary cell as a secondary timing reference.

According to some of the various embodiments, control message(s) may be configured to modify a radio bearer. Control message(s) may be configured to cause in the wireless device configuration of uplink random access resources on the reference secondary cell.

According to some of the various embodiments, a plurality of timing advance commands may be transmitted by the base station to the wireless device at block 1502. Each of the plurality of timing advance commands may comprise a time adjustment value and an index identifying a cell group.

According to some of the various embodiments, frames and subframes transmission timing for downlink carriers in the primary cell group and downlink carriers in the secondary cell group may be substantially time aligned with each other. Frames and subframes transmission timing for downlink carriers in the primary cell group and downlink carriers in the secondary cell group of the base station may be substantially time aligned with frames and subframes transmission timing of downlink carriers of other base stations in the plurality of base stations. Frames and subframes transmission timing for uplink carriers in the primary cell group of the wireless device may be substantially time aligned with each other. Frames and subframes transmission timing for uplink carriers in the secondary cell group of the wireless device may be substantially time aligned with each other. Frames and subframes transmission timing for uplink carriers in the primary cell group and in the secondary cell group of the wireless device may employ: different synchronization signals as a timing reference; and different timing advance commands. The plurality of timing advance commands may be configured to cause the wireless device to adjust timing of uplink signal transmissions in uplink carriers of the primary cell group and the secondary cell group such that the base station receives the uplink signal transmissions in substantial alignment with frames and subframes of the base station. Transmission time may be divided into frames. Each frame may be divided into a plurality of subframes.

According to some of the various embodiments, frames and subframe reception timing for uplink carriers in the primary cell group and uplink carriers in the secondary cell group of the base station may be substantially time aligned with frames and subframe reception timing of uplink carriers of other base stations in the plurality of base stations. Frames and subframes transmission timing for uplink carriers in the primary cell group and in the secondary cell group of the wireless device may not necessarily time aligned.

According to some of the various embodiments, the wireless device may be assigned, by the configuration, a plurality of media access control dedicated parameters. The media access control dedicated parameters may comprise a plurality of time alignment timer values. Each of the plurality of time alignment timer values may be associated with a unique cell group in the wireless device.

According to some of the various embodiments, the base station may transmit a control command configured to cause transmission of a random access preamble on random access resources of the reference secondary cell in the secondary cell group. The base station may transmit a random access response on a primary cell in the primary cell group. The random access response may comprise a timing advance command for the secondary cell group. The secondary cell group may comprise the reference secondary cell. The control command may comprise a mask index and the random access preamble identifier. The random access response may comprise an identifier of the random access preamble.

According to some of the various embodiments, a base station in a plurality of base stations may transmit first control message(s) to a wireless device at block 1500. The plurality of base stations may be compatible with LTE release 11 or above.

According to some of the various embodiments, the first control message(s) may be configured to cause in the wireless device configuration of a plurality of cells. The plurality of cells may comprise a primary cell and at least one secondary cell. The first control message(s) may be configured to cause in the wireless device assignment of each of the secondary cell(s) to a cell group in a plurality of cell groups. The plurality of cell groups may comprise a primary cell group and a secondary cell group. The primary cell group may comprise a first subset of the plurality of cells. The first subset may comprise the primary cell. The secondary cell group may comprise a second subset of the secondary cell(s).

According to some of the various embodiments, the base station may transmit a plurality of timing advance commands to the wireless device at block 1502. Each of the plurality of timing advance commands may comprise a time adjustment value and an index identifying a cell group.

According to some of the various embodiments, frames and subframes transmission timing for downlink carriers in the primary cell group and downlink carriers in the secondary cell group may be substantially time aligned with each other. Frames and subframes transmission timing for downlink carriers in the primary cell group and downlink carriers in the secondary cell group of the base station may be substantially time aligned with frames and subframes transmission timing of downlink carriers of other base stations in the plurality of base stations. Frames and subframes transmission timing for uplink carriers in the primary cell group of the wireless device may be substantially time aligned with each other. Frames and subframes transmission timing for uplink carriers in the secondary cell group of the wireless device may be substantially time aligned with each other. Frames and subframes transmission timing for uplink carriers in the primary cell group and in the secondary cell group of the wireless device may employ different synchronization signals as a timing reference and different timing advance commands. The plurality of timing advance commands may be configured to cause the wireless device to adjust timing of uplink signal transmissions in uplink carriers of the primary cell group and the secondary cell group such that the base station receives the uplink signal transmissions in substantial alignment with frames and subframes of the base station.

The base station may transmit a control command configured to cause transmission of a random access preamble on random access resources of the reference secondary cell in the secondary cell group. The base station may transmit a random access response on a primary cell in the primary cell group. The random access response may comprise a timing advance command for the secondary cell group. The secondary cell group may comprise the reference secondary cell. The control command may comprise a mask index and the random access preamble identifier. The random access response may comprise an identifier of the random access preamble.

According to some of the various embodiments, the base station may comprise communication interface(s), processor(s), and memory. The memory may store instructions. The processor(s) may execute the instructions to cause actions described herein.

FIG. 7 is an example message flow in a random access process in a TAG as per an aspect of an embodiment of the present invention. A preamble 602 may be sent by a UE in response to the PDCCH order 601 on an SCell belonging to an sTAG. Preamble transmission for SCells may be controlled by the network using PDCCH format 1A. Msg2 message 603 in response to the preamble transmission on SCell may be addressed to RA-CRNTI in PCell common search space (CSS). Uplink packets 604 may be transmitted on a the SCell, in which the preamble was transmitted.

In an implementation, the SCell index in the uplink grant may not be transmitted in the uplink grant in RAR and the uplink grant contained in the RAR may be applicable to the cell where the preamble was sent. According to some of the various aspects of embodiments RAPID may be included in Msg2 to address possible preamble misdetection by the eNB. UE may compare the RAPID in Msg2 with the transmitted preamble ID to verify the validity of the Msg2 and to verify possible preamble misdetection by eNB.

If a UE receives an RRC message that causes the UE to be configured to transmit SRS signal on an SCell, the UE may transmit SRS signal after the SCell is active and in-sync. If the sTAG and the activated SCell are in-sync then UE may start transmission of one or more SRS signals after the SCell is being activated. In an example embodiment, if an SCell is configured with transmission of SRS signals and is associated with an sTAG that is out-of-sync. eNB may activate the SCell and eNB may initiate RA process on an SCell in the sTAG. UE may not transmit any SRS signals on the SCell before successful completion of random access process. In response to successful completion of RA process in the sTAG and applying the timing advance command, the UE may start transmission of one or more SRS signals on uplink of the SCells (in the sTAG) with configured SRS transmission. UE may not transmit any SRS signal in the uplink of an active SCell belonging to an out-of-sync sTAG. When SRS is configured for an SCell belonging to an out-of-sync sTAG, a UE may not send SRS until UE receives and applies a RAR including a TA value, and an UL grant, because otherwise SRS may be sent with incorrect transmission power and/or timing. UE may apply TA value to the sTAG. In an example embodiment, UE may apply the power control command in the uplink grant before starting transmission of one or more SRS signals. In an example embodiment Uplink grant may include power control information. The UE may receive TA value, uplink resources and a power control command (TPC) to adjust the uplink transmission timing and power before the UE starts to send SRS (if configured for the SCell). Transmission of one or more SRS signal may start after the SCell is activated and in-sync. This process may not be required for SCells of the pTAG, because pTAG may be in-sync when an SCell is activated.

For an active and in-sync SCell, one or more SRS signals transmission may be dropped in a subframe if UE has insufficient power to transmit SRS signal with other uplink data or control packets in the subframe. SRS signal may also be dropped if it collides with other uplink transmissions. For example, a UE may not simultaneously transmit uplink data and SRS in a subframe of an SCell. Transmission of one or more SRS signal may start after the SCell is activated and in-sync. Then for each subframe that SRS is configured to be transmitted, UE may examine power and other parallel transmission constraints and may drop or transmit an SRS signal in a subframe of an SCell if all other conditions are met. Therefore the UE may transmit one or more SRS signals after the SCell is activated and is in-sync. The UE may also drop one or more SRS signals depending on other predefined conditions after the SCell is activated and is in-sync. But prior to applying TAT to an activated and out-of-sync SCell no SRS signal may be transmitted on the SCell. This process may increase the transmission time and/or power of the transmitted SRS signals. Otherwise, SRS signal transmission may overlap with other symbols, and deteriorate radio link performance.

Figure 16:
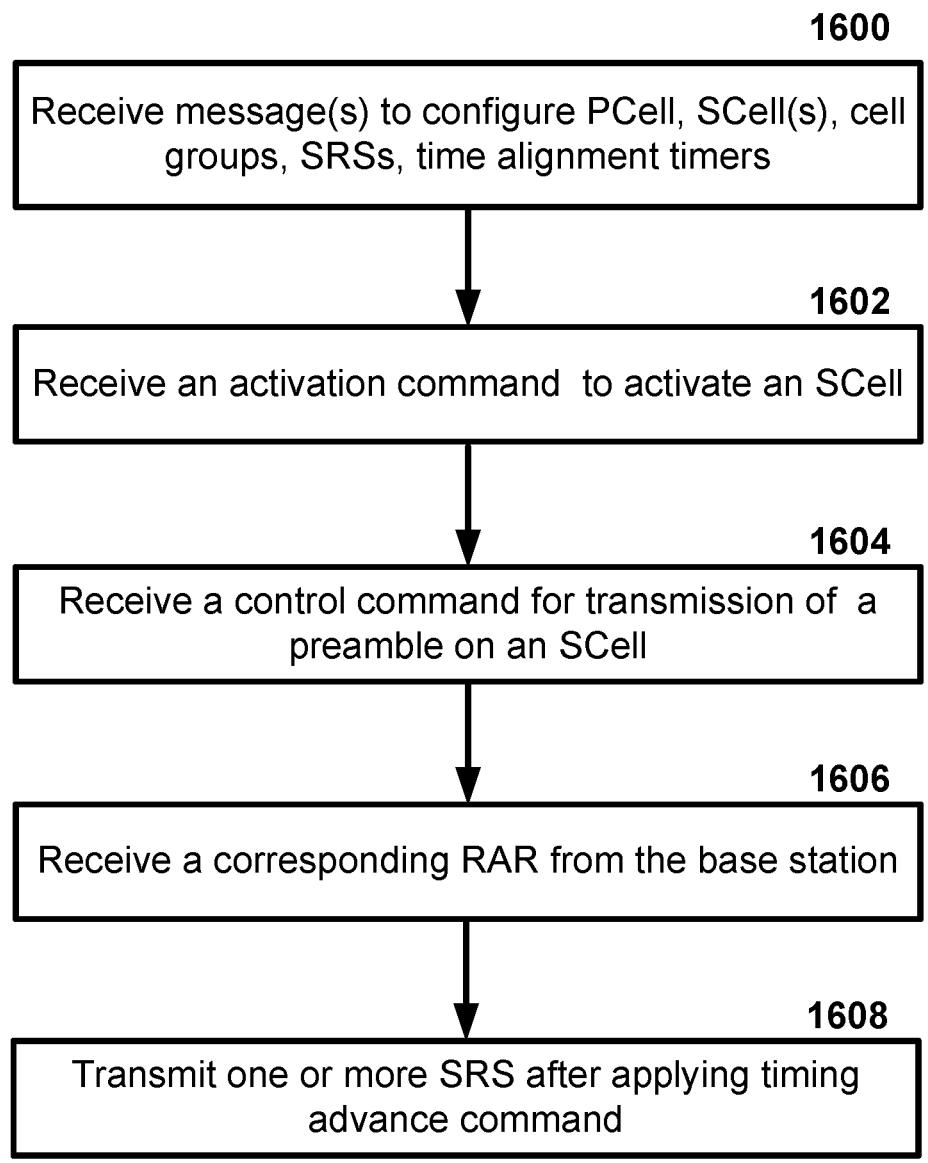
FIG. 16 is an example flow diagram illustrating a process for sounding transmission as per an aspect of an embodiment of the present invention.

FIG. 16 is an example flow diagram illustrating a process for sounding transmission as per an aspect of an embodiment of the present invention.

According to some of the various embodiments, a wireless device may receive at least one control message from a base station at block 1600. The control message(s) may cause in the wireless device configuration of a plurality of cells. The plurality of cells may comprise a primary cell and at least one secondary cell. The control message(s) may cause in the wireless device an assignment of each of the secondary cell(s) to a cell group in a plurality of cell groups. The plurality of cell groups may comprise a primary cell group and a secondary cell group. The primary cell group may comprise a first subset of the plurality of cells. The first subset may comprise the primary cell. Uplink transmissions by the wireless device in the primary cell group may employ a first synchronization signal transmitted on the primary cell as a primary timing reference. The secondary cell group may comprise a second subset of the secondary cell(s). Control message(s) may cause in the wireless device configuration of transmissions of sounding reference signals on a secondary cell in the secondary cell group. Control message(s) may cause configuration of the random access resources.

According to some of the various embodiments, the wireless device may receive an activation command to activate the secondary cell in the wireless device at block 1602.

According to some of the various embodiments, at block 1604, the wireless device may receive a control command configured to cause transmission of a random access preamble on random access resources of one of the secondary cell(s) in the second subset.

According to some of the various embodiments, at block 1606, the wireless device may receive a random access response. The random access response may comprise a timing advance command for the secondary cell group. The random access response may comprise a preamble identifier. The preamble identifier may identify the random access preamble.

According to some of the various embodiments, at block 1608, the wireless device may transmit one or more of the sounding reference signals on the secondary cell after applying the timing advance command to the secondary cell group. The wireless device may be configured to not transmit any of the sounding reference signals on the secondary cell during the period: between receiving the activation command and applying the timing advance command; or when the secondary cell is inactive; or when a time alignment timer for said secondary cell group is not running. Applying the timing advance command may cause substantial alignment of reception timing of uplink signals in frames and subframes of the secondary cell group at the base station.

According to some of the various embodiments, the wireless device may be configured to transmit at least one of the sounding reference signals if: the secondary cell is activated; the timing advance command is applied by the wireless device to the secondary cell group; and a time alignment timer for the secondary cell group is running. Even when these conditions are met, the sounding reference signals may be dropped due to insufficient wireless device transmit power or due to coinciding with other transmissions in the same cell group.

The sounding reference signal(s) may be type zero sounding reference signals. The sounding reference signal(s) may be configured to be transmitted during a period. The sounding reference signal(s) may be transmitted on the last symbol of a plurality of subframes.

The transmission of a sounding reference signal in the sounding reference signal(s) in a subframe of the secondary cell may be dropped if the wireless device is power limited in the subframe. The transmission of a sounding reference signal in the sounding reference signal(s) in a subframe of the secondary cell may be dropped if the wireless device transmits data in the subframe of the secondary cell. The wireless device may drop at least one sounding reference signal if one or more pre-defined conditions are met.

According to some of the various embodiments, a wireless device may receive at least one control message from a base station at block 1600. The control message(s) may cause in the wireless device configuration of a plurality of cells. The plurality of cells may comprise a primary cell and at least one secondary cell. The control message(s) may cause in the wireless device an assignment of each of the secondary cell(s) to a cell group in a plurality of cell groups. The plurality of cell groups may comprise a primary cell group and a secondary cell group. The primary cell group may comprise a first subset of the plurality of cells. The first subset may comprise the primary cell. Uplink transmissions by the wireless device in the primary cell group may employ a first synchronization signal transmitted on the primary cell as a primary timing reference. The secondary cell group may comprise a second subset of the secondary cell(s).

According to some of the various embodiments, the wireless device may receive an activation command to activate the secondary cell in the wireless device at block 1602.

According to some of the various embodiments, at block 1604, the wireless device may receive a control command configured to cause transmission of a random access preamble on random access resources of one of the secondary cell(s) in the second subset.

According to some of the various embodiments, at block 1606, the wireless device may receive a random access response. The random access response may comprise a timing advance command for the secondary cell group. The random access response may comprise a preamble identifier. The preamble identifier may identify the random access preamble.

According to some of the various embodiments, the wireless device may receive a second control message from the base station. The second control message may cause, in the wireless device, configuration of transmissions of sounding reference signals on a secondary cell in the secondary cell group.

According to some of the various embodiments, at block 1608, the wireless device may transmit one or more of the sounding reference signals on the secondary cell after applying the timing advance command to the secondary cell group. The wireless device may be configured to not transmit any of the sounding reference signals on the secondary cell during the period: between receiving the activation command and applying the timing advance command; or when the secondary cell is inactive; or when a time alignment timer for said secondary cell group is not running. Applying the timing advance command may cause substantial alignment of reception timing of uplink signals in frames and subframes of the secondary cell group at the base station.

According to some of the various embodiments, the wireless device may be configured to transmit at least one of the sounding reference signals if: the secondary cell is activated; the timing advance command is applied by the wireless device to the secondary cell group; and a time alignment timer for the secondary cell group is running. Even when these conditions are met, the sounding reference signals may be dropped due to insufficient wireless device transmit power or due to coinciding with other transmissions in the same cell group.

The control message(s) may be configured to further cause in the wireless device the configuration of a time alignment timer for each of the plurality of cell groups. The time alignment timer may start or restart in response to the wireless device receiving a timing advance command to adjust uplink transmission timing of a commanded cell group in the plurality of cell groups.

According to some of the various embodiments, the wireless device may comprise communication interface(s), processor(s), and memory. The memory may store instructions. The processor(s) may execute the instructions to cause actions described herein.

LTE Rel-8, 9 & 10 Timing Advance Command MAC command has a subheader and a MAC CE with fixed size of one octet that contains 2 reserved bits (R bits). LTE Rel-8, 9 & 10 does not support multiple time alignment grouping (It may also be said: it supports only one time alignment group) and there is no need to indicate to which time alignment group the time alignment command may apply. The time alignment command is applied to uplink carriers including PCell and SCell(s) of a wireless device. There is a need for enhancing the time alignment procedure in LTE Rel-8, 9 & 10 to efficiently support multiple time alignment groups.

In release 11 or above, when multiple TAGs are configured, a MAC CE identifying the TA group to which the TA value applies may be used. The R bits may be used to signal the TA group to which the TA value applies. The R bits of the Timing Advance Command MAC Control Elements may be used to signal the TA Group. In this embodiment, one TA is included in a MAC CE. If multiple TAs, each for a different TAG, need to be transmitted, then multiple CEs may be transmitted in the same TTI or different TTIs. When multiple time alignment CEs are transmitted to a wireless device in a TTI, a CE may have its own MAC subheader, and LCID number may be the same for them. It may be possible to transmit multiple TA MAC CE to a given wireless device in the same TTI, and a TA MAC CE may have its own subheader.

According to some of the various aspects of embodiments, when the R bits are set to 0, MAC CE indicates the TA Group of the PCell (pTAG) and other values are addressed to other TA groups (sTAGs). This would allow for a maximum of 4 TA Groups. 0 may be used for the 2-bits correspond to pTAG (00), 1-3 (01, 10, 11) may be used for sTAGs. This solution minimizes the changes to the release 8, 9, 10 MAC layer, and enhances the MAC CE TA command to multiple TAGs.

RRC layer may configure TAGs for an SCell (implicitly or explicitly) and may assign a TAG index (or TAG identifier) to a TAG (implicitly or explicitly). The index that is introduced for a TA Group in RRC may be used for the setting of the TAG-ID bits. The RRC index of the TA Groups is used for the setting of the TAG-ID bits. TAG-ID configured by RRC may be used to indicate TA group where the TA command applies. This may imply that the RRC signaling may configure up to 4 TAG-IDs.

One TAG in one TA Command may be supported. R.11 or above UEs may check R bits in MAC CE, but R.10 or below UEs may not need to check the R bits. According to some of the various aspects of embodiments, an R.11 or above UE with one configured TAG (only pTAG) may not need to check the TAG-ID bits. According to some of the various aspects of embodiments, multiple TAG TA values may be supported in one MAC CE TA command, in which a TA applies to a TAG. A 6-bit TA value may be associated with a TAG using 2-bit TAG index (identifier).

This enhancement supports transmitting TA value for a specific TAG without adding the size of MAC CE command compared to release 8, 9, 10. Two bits of TAG index bits are introduced before the 6 bits of TA value. This may require a new definition for MAC CE command that would be applicable to release 11 or above UEs. A method to introduce this new MAC CE command is to introduce a new MAC LCID for this new format. MAC LCID is included in a MAC subheader. This is a viable implementation option. This may increase the number of used MAC LCIDs. An embodiment is introduced here that would allow to use the same MAC LCID as in Rel-8, 9 & 10 for Rel-11 multiple TAG configuration. The same LCID as in Rel-8, 9 & 10 may be used in this embodiment applicable to multiple TAG configuration in release 11 or beyond. eNB transmits TA MAC CEs to UEs in unicast messages. eNB has the information about the current LTE release supported by the UE. This information may be available to the eNB via network signaling (through S1 interface with the MME) or via air interface signaling (UE capability message received from the UE). eNB may use the same LCID for the legacy TA MAC CE and the newly introduced TA MAC CE. If the MAC CE is transmitted to the release 8, 9, 10 LTE UEs, then the R bits may not include a TAG index. If the MAC CE is transmitted to the release 11 or above UEs, then the R bits may include the TAG index if multiple TAGs are configured. If multiple TAGs are not configured, then TA value is applied to pTAG including all the carriers.

This enhancement may not require introducing a new LCID, although a new MAC CE format is introduced for transmitting TA commands. Both legacy TA MAC CEs and new TA MAC CEs may use the same LCID and that reduces the number of LCIDs used in the MAC layer (compared with the scenario where a new LCID is introduced) and may further simplify UE implementation. eNB may consider UE LTE release or may consider the number of configured TAGs (1 for pTAG only configuration, more than 1 for pTAG and sTAG configuration) to decide if legacy MAC CE format should be used or new MAC CE format should be used. If UE is a release 8, 9, 10, then legacy MAC CE is used. For release 11 or above UEs with one TAG configuration (only pTAG), eNB may use new MAC CEs with TAG-ID bits set to pTAG index (for example 0 for pTAG). For release 11 or above UEs (or for release 11 or above UEs with multiple TAG configuration), eNB may use the new MAC CE format, wherein 2-bit TAG-ID bits point to the TAG index, which was configured in UE using RRC configuration messages.

In an example, user terminals (for example: UE1, UE2) communicating with an eNB may support different releases of LTE technology. For example, UE2 may support releases 8, 9, 10, and 11 of LTE, and UE1 may support releases 8, 9 and/or 10 (or for example may support release 8, or may support 8 & 9). In another example, user terminals (for example: UE1, UE2) communicating with an eNB may support different capabilities of LTE technology. For example, UE2 may support multiple time alignment groups, and UE1 may not support multiple time alignment groups. eNB may send MAC TA CEs to the user terminals (UE1, UE2) in unicast messages. MAC TA CEs may have the same LCID for UE1 and UE2. The user terminals (UE1, UE2) may interpret MAC TA CE messages for adjusting uplink timing differently dependent on the LTE release they support and are operating. The same exact message may be processed differently by UE1 and UE2. For example, in a scenario, where MAC LOD indicate MAC TA CE, and RR field is 00, UE1 may not consider the value of the two bits before TA value (RR). UE1 may change the uplink transmission timing for all uplink carriers according to the TA value in the MAC command. UE2 may however, decode the value of two bits before TA value (RR=TAG ID), and when the two bits are for example 00, UE1 may only update the transmission timing for cells belonging to pTAG according to the TA value. The first two bits may indicate the TAG ID to which the TA may apply. Therefore, the same MAC CE message content may be processed differently by different UEs operating in different LTE releases.

According to some of the various aspects of embodiments, a base station may transmit a plurality of unicast timing advance commands to a plurality of wireless devices for adjusting uplink transmission timing by the plurality of wireless devices. Each of the plurality of wireless devices may operate in a mode. The mode may comprise: a) a first mode employable by all of the plurality of wireless devices, or a second mode employable only by a subset of the plurality of wireless devices. Each of the plurality of wireless devices being addressed by at least one of the plurality of unicast timing advance commands may interpret differently the at least one of the plurality of unicast timing advance commands depending on the mode in which each of the plurality of wireless devices is operating. The plurality of unicast timing advance commands may have different formats for the plurality of wireless devices operating in the first mode and the plurality of wireless devices operating in the second mode. The format may comprise: a) a subheader comprising a logical channel ID, the logical channel ID being the same for the plurality of unicast timing advance commands, and b) a control element comprising a timing advance value, c) 2-bit information interpreted differently depending on the wireless device mode. The first mode may be configured to be compatible with release 8, 9 or 10 of LTE-Advance technology. The second mode may be configured to be compatible with release 11 of LTE-Advance technology.

FIG. 15 is an example flow diagram illustrating a base station process for configuring multiple cell groups as per an aspect of an embodiment of the present invention. According to some of the various embodiments, a base station in a plurality of base stations may transmit control message(s) to a first wireless device at block 1500. The plurality of base stations may be compatible with LTE release 11 or above and support multiple timing advance groups.

According to some of the various embodiments, the control message(s) may be configured to cause in the first wireless device configuration of a plurality of cells. The plurality of cells may comprise a primary cell and at least one secondary cell. The control message(s) may be configured to cause in the first wireless device to assign of each of the secondary cell(s) to a cell group in a plurality of cell groups. The plurality of cell groups may comprise a primary cell group and a secondary cell group. The primary cell group may comprise a first subset of the plurality of cells. The first subset may comprise the primary cell. The secondary cell group may comprise a second subset of the secondary cell(s). The second subset may comprise a reference secondary cell.

According to some of the various embodiments, the control message(s) may be configured to modify a radio bearer. Control message(s) may be transmitted by the base station to the first wireless device. The control message may cause configuration of uplink random access resources on a secondary cell in the secondary cell group. Control message(s) may comprise a plurality of random access resource parameters. The plurality of random access resource parameters may comprise: an index; a frequency offset; and a plurality of sequence parameters. Control message(s) may comprise a time alignment timer parameter for each cell group in the plurality of cell groups.

According to some of the various embodiments, a plurality of timing advance commands may be transmitted by the base station to the first wireless device at block 1502. A second plurality of timing advance commands may be transmitted by the base station to a second wireless device. The second wireless device may be unconfigurable with cell groups.

According to some of the various embodiments, each command in the first plurality of timing advance commands and the second plurality of timing advance commands may consist of a MAC subheader and a MAC control element. All of the MAC subheaders may comprise the same logical channel identifier value. Each of the first plurality of timing advance commands may comprise two bits. The content of the two bits may indicate a first cell group index. The first cell group index may identify a first cell group according to the configuration caused by the control message(s). Each of the first plurality of timing advance commands may be configured to cause substantial alignment of reception timing of first uplink signals in frames and subframes at the base station. The first uplink signals may be transmitted by the first wireless device in one or more activated uplink carriers of a cell group identified by the two bits. Each of the second plurality of timing advance commands may comprise two reserved bits. Each of the second plurality of timing advance commands may be configured to cause substantial alignment of reception timing of second uplink signals in frames and subframes at the base station. The second uplink signals may be transmitted by the second wireless device in one or more activated uplink carriers.

According to some of the various embodiments, the timing advance command in the first plurality of timing advance commands may comprise a timing advance value and an index identifying the secondary cell group. The timing advance command may be configured to cause substantial alignment of reception timing of third uplink signals in frames and subframes of the secondary cell group at the base station.

According to some of the various embodiments, the wireless device may be assigned, by the configuration, a plurality of media access control dedicated parameters. The media access control dedicated parameters may comprise a plurality of time alignment timer values. Each of the plurality of time alignment timer values may be associated with a unique cell group in the wireless device. A time alignment timer of a cell group in the plurality of cell groups may start or restart in response to the wireless device receiving a timing advance command to adjust uplink transmission timing of the cell group.

According to some of the various embodiments, uplink transmissions by the wireless device in the primary cell group may employ a first synchronization signal transmitted on the primary cell. Uplink transmissions in the secondary cell group may employ a second synchronization signal on the reference secondary cell as a secondary timing reference.

According to some of the various embodiments, prior to transmitting the control message(s), a first signaling bearer may be established between the base station and the first wireless device. The establishing may comprise the base station transmitting a control message to the first wireless device on the primary cell. Prior to transmitting the control message(s), the base station may receive a plurality of radio capability parameters from the first wireless device on the first signaling bearer on the primary cell. The plurality of radio capability parameters may indicate that the wireless device supports configuration of the plurality of cell groups.

According to some of the various embodiments, a base station may transmit control message(s) to a first wireless device at block 1500. The plurality of base stations may be compatible with LTE release 11 or above.

According to some of the various embodiments, a plurality of timing advance commands may be transmitted to a plurality of wireless devices at block 1502 for adjusting uplink transmission timing by the plurality of wireless devices. Each of the plurality of wireless devices may operate in a mode. The mode may be one of: a first mode employable by all of the plurality of wireless devices; and a second mode employable only by a subset of the plurality of wireless devices.

According to some of the various embodiments, the timing advance command(s) may be interpreted by a wireless device in the plurality of wireless devices being addressed by timing advance command(s). The interpretation may depend on the mode in which the wireless device is operating. Each of the plurality of timing advance commands may consists of: a subheader, a control element, and a a two-bit information element. The subheader may comprise the same logical channel identifier value for the each of the plurality of timing advance commands. The control element may comprise a timing advance value. The two-bit information element may be interpreted as: a cell group index associated to a cell group adjusting uplink transmission timing if the wireless device is operating in the second mode; and/or reserved bits if the wireless device is operating in the first mode.

According to some of the various embodiments, in an example implementation, the first mode may be unconfigurable with a plurality of cell groups and the second mode may be configurable with a plurality of cell groups. In another example, the first mode may be configured to be compatible with at least release: 8, 9 or 10 of LTE technology; or release 11 of LTE technology without multiple time alignment capability. The second mode may be configured to be compatible with release 11 of LTE technology with multiple time alignment capability. In another example, the first mode may be configured to be compatible with at least release 8, 9 or 10 of LTE technology. The second mode may be configured to be compatible with release 11 of LTE technology.

According to some of the various embodiments, prior to transmitting the at least one control message, a first signaling bearer may be established between the base station and the first wireless device. The establishing may comprise the base station transmitting a control message to the first wireless device on the primary cell. Prior to transmitting the at least one control message, the base station may receive a plurality of radio capability parameters from the first wireless device on the first signaling bearer on the primary cell. The plurality of radio capability parameters may indicate that the wireless device supports configuration of the second mode. The base station may receive a plurality of radio capability parameters from the second wireless device on the first signaling bearer on the primary cell. The plurality of radio capability parameters may indicate that the wireless device supports configuration of the first mode.

According to some of the various embodiments, the base station may transmit control message(s) to a first wireless device operating in the second mode. The control message(s) may be configured to cause in the first wireless device configuration of a plurality of cells. The plurality of cells may comprise a primary cell and at least one secondary cell.

According to some of the various embodiments, the control message(s) may be configured to cause in the first wireless device, a cell group index for a secondary cell in the plurality of cells. The cell group index may identify one of a plurality of cell groups. The plurality of cell groups may comprise a primary cell group and a secondary cell group. The primary cell group may comprise a first subset of the plurality of cells. The first subset may comprise the primary cell. The secondary cell group may comprise a second subset of the at least one secondary cell.

According to some of the various embodiments, a base station in a wireless network may transmit a plurality of timing advance commands to a plurality of wireless devices for adjusting uplink transmission timing by the plurality of wireless devices. Each of the plurality of wireless devices may operate in a mode. The mode may be a first mode or a second mode. The first mode may be employable by all of the plurality of wireless devices. The second mode may be employable only by a subset of the plurality of wireless devices.

According to some of the various embodiments, the timing advance command(s) may be interpreted by a wireless device in the plurality of wireless devices being addressed by timing advance command(s). The interpretation may depend on the mode in which the wireless device is operating. Each of the plurality of timing advance commands may consists of: a subheader, a control element, and a a two-bit information element. The subheader may comprise the same logical channel identifier value for the each of the plurality of timing advance commands. The control element may comprise a timing advance value. The two-bit information element may be interpreted differently depending on the wireless device operating mode.

According to some of the various embodiments, a first signaling bearer may be established between the base station and the first wireless device prior to transmitting the at least one control message. The establishing may comprise the base station transmitting a control message to the first wireless device on the primary cell. The base station may receive a plurality of radio capability parameters from the first wireless device on the first signaling bearer on the primary cell prior to transmitting the at least one control message. The plurality of radio capability parameters may indicate that the wireless device supports configuration of the second mode.

According to some of the various embodiments, the base station may transmit control message(s) to a first wireless device operating in the second mode. The control message(s) may be configured to cause in the first wireless device configuration of a plurality of cells. The plurality of cells may comprise a primary cell and at least one secondary cell.

According to some of the various embodiments, the control message(s) may be configured to cause in the first wireless device a cell group index for each cell in the plurality of cells. The cell group index may identify one of a plurality of cell groups. The plurality of cell groups may comprise a primary cell group and a secondary cell group. The primary cell group may comprise a first subset of the plurality of cells. The first subset may comprise the primary cell. The secondary cell group may comprise a second subset of the at least one secondary cell.

According to some of the various aspects of embodiments, the random access procedure may be initiated by a PDCCH order or by the MAC sublayer itself. Random access procedure on an SCell may be initiated by a PDCCH order. If a UE receives a PDCCH transmission consistent with a PDCCH order masked with its C-RNTI (radio network temporary identifier), and for a specific serving cell, the UE may initiate a random access procedure on this serving cell. For random access on the PCell a PDCCH order or RRC optionally indicate the ra-PreambleIndex and the ra-PRACH-MaskIndex; and for random access on an SCell, the PDCCH order indicates the ra-PreambleIndex with a value different from zero and the ra-PRACH-MaskIndex. For the pTAG preamble transmission on PRACH and reception of a PDCCH order may only be supported for PCell.

According to some of the various aspects of embodiments, the procedure may use some of the following information: a) the available set of PRACH resources for the transmission of the random access preamble, prach-ConfigIndex., b) for PCell, the groups of random access preambles and/or the set of available random access preambles in each group, c) for PCell, the preambles that are contained in random access preambles group A and Random Access Preambles group B are calculated, d) the RA response window size ra-ResponseWindowSize, e) the power-ramping factor powerRampingStep, f) the maximum number of preamble transmission preambleTransMax, g) the initial preamble power preambleInitialReceivedTargetPower, h) the preamble format based offset DELTA_PREAMBLE, i) for PCell, the maximum number of Msg3 HARQ transmissions maxHARQ-Msg3Tx, j) for PCell, the Contention Resolution Timer mac-ContentionResolutionTimer. These parameters may be updated from upper layers before each Random Access procedure is initiated.

According to some of the various aspects of embodiments, the Random Access procedure may be performed as follows: Flush the Msg3 buffer; set the PREAMBLE_TRANSMISSION_COUNTER to 1; set the backoff parameter value in the UE to 0 ms; for the RN (relay node), suspend any RN subframe configuration; proceed to the selection of the Random Access Resource. There may be one Random Access procedure ongoing at any point in time. If the UE receives a request for a new Random Access procedure while another is already ongoing, it may be up to UE implementation whether to continue with the ongoing procedure or start with the new procedure.

According to some of the various aspects of embodiments, the Random Access Resource selection procedure may be performed as follows. If ra-PreambleIndex (Random Access Preamble) and ra-PRACH-MaskIndex (PRACH Mask Index) have been explicitly signalled and ra-PreambleIndex is not zero, then the Random Access Preamble and the PRACH Mask Index may be those explicitly signalled. Otherwise, the Random Access Preamble may be selected by the UE.

The UE may determine the next available subframe containing PRACH permitted by the restrictions given by the prach-ConfigIndex, the PRACH Mask Index and physical layer timing requirements (a UE may take into account the possible occurrence of measurement gaps when determining the next available PRACH subframe). If the transmission mode is TDD and the PRACH Mask Index is equal to zero, then if ra-PreambleIndex was explicitly signalled and it was not 0 (i.e., not selected by MAC), then randomly select, with equal probability, one PRACH from the PRACHs available in the determined subframe. Else, the UE may randomly select, with equal probability, one PRACH from the PRACHs available in the determined subframe and the next two consecutive subframes. If the transmission mode is not TDD or the PRACH Mask Index is not equal to zero, a UE may determine a PRACH within the determined subframe in accordance with the requirements of the PRACH Mask Index. Then the UE may proceed to the transmission of the Random Access Preamble.

PRACH mask index values may range for example from 0 to 16. PRACH mask index value may determine the allowed PRACH resource index that may be used for transmission. For example, PRACH mask index 0 may mean that all PRACH resource indexes are allowed; or PRACH mask index 1 may mean that PRACH resource index 0 may be used. PRACH mask index may have different meaning in TDD and FDD systems.

The random-access procedure may be performed by UE setting PREAMBLE_RECEIVED_TARGET_POWER to preambleInitialReceivedTargetPower+DELTA_PREAMBLE+(PREAMBLE_TRANSMISSION_COUNTER−1)*powerRampingStep. The UE may instruct the physical layer to transmit a preamble using the selected PRACH, corresponding RA-RNTI, preamble index and PREAMBLE_RECEIVED_TARGET_POWER.

According to some of the various aspects of embodiments, once the random access preamble is transmitted and regardless of the possible occurrence of a measurement gap, the UE may monitor the PDCCH of the PCell for random access response(s) identified by the RA-RNTI (random access radio network identifier) a specific RA-RNTI defined below, in the random access response (RAR) window which may start at the subframe that contains the end of the preamble transmission plus three subframes and has length ra-ResponseWindowSize subframes. The specific RA-RNTI associated with the PRACH in which the Random Access Preamble is transmitted, is computed as: RA-RNTI=1+t_id+10*f_id. Where t_id is the index of the first subframe of the specified PRACH (0≤t_id<10), and f_id is the index of the specified PRACH within that subframe, in ascending order of frequency domain (0≤f_id<6). The UE may stop monitoring for RAR(s) after successful reception of a RAR containing random access preamble identifiers that matches the transmitted random access preamble.

According to some of the various aspects of embodiments, if a downlink assignment for this TTI (transmission time interval) has been received on the PDCCH for the RA-RNTI and the received TB (transport block) is successfully decoded, the UE may regardless of the possible occurrence of a measurement gap: if the RAR contains a backoff indicator (BI) subheader, set the backoff parameter value in the UE employing the BI field of the backoff indicator subheader, else, set the backoff parameter value in the UE to zero ms. If the RAR contains a random access preamble identifier corresponding to the transmitted random access preamble, the UE may consider this RAR reception successful and apply the following actions for the serving cell where the random access preamble was transmitted: process the received timing advance command for the cell group in which the preamble was transmitted, indicate the preambleInitialReceivedTargetPower and the amount of power ramping applied to the latest preamble transmission to lower layers (i.e., (PREAMBLE_TRANSMISSION_COUNTER−1)*powerRampingStep); process the received uplink grant value and indicate it to the lower layers; the uplink grant is applicable to uplink of the cell in which the preamble was transmitted. If ra-PreambleIndex was explicitly signalled and it was not zero (e.g., not selected by MAC), consider the random access procedure successfully completed. Otherwise, if the Random Access Preamble was selected by UE MAC, set the Temporary C-RNTI to the value received in the RAR message. When an uplink transmission is required, e.g., for contention resolution, the eNB may not provide a grant smaller than 56 bits in the Random Access Response.

According to some of the various aspects of embodiments, if no RAR is received within the RAR window, or if none of all received RAR contains a random access preamble identifier corresponding to the transmitted random access preamble, the random access response reception may considered not successful. If RAR is not received, UE may increment PREAMBLE_TRANSMISSION_COUNTER by 1. If PREAMBLE_TRANSMISSION_COUNTER= preambleTransMax+1 and random access preamble is transmitted on the PCell, then UE may indicate a random access problem to upper layers (RRC). This may result in radio link failure. If PREAMBLE_TRANSMISSION_COUNTER= preambleTransMax+1 and the random access preamble is transmitted on an SCell, then UE may consider the random access procedure unsuccessfully completed. UE may stay in RRC connected mode and keep the RRC connection active even though a random access procedure unsuccessfully completed on a secondary TAG. According to some of the various aspects of embodiments, at completion of the random access procedure, the UE may discard explicitly signalled ra-PreambleIndex and ra-PRACH-MaskIndex, if any; and flush the HARQ buffer used for transmission of the MAC PDU in the Msg3 buffer. In addition, the RN may resume the suspended RN subframe configuration, if any.

According to some of the various aspects of embodiments, The UE may have a configurable timer timeAlignmentTimer per TAG. The timeAlignmentTimer is used to control how long the UE considers the Serving Cells belonging to the associated TAG to be uplink time aligned (in-sync). When a Timing Advance Command MAC control element is received, the UE may apply the timing advance command for the indicated TAG, and start or restart the timeAlignmentTimer associated with the indicated TAG. When a timing advance command is received in a RAR message for a serving cell belonging to a TAG and if the random access preamble was not selected by UE MAC, the UE may apply the timing advance command for this TAG, and may start or restart the timeAlignmentTimer associated with this TAG. When a timeAlignmentTimer associated with the pTAG expires, the UE may: flush all HARQ buffers for all serving cells; notify RRC to release PUCCH/SRS for all serving cells; clear any configured downlink assignments and uplink grants; and consider all running timeAlignmentTimers as expired. When a timeAlignmentTimer associated with an sTAG expires, then for all Serving Cells belonging to this TAG, the UE may flush all HARQ buffers; and notify RRC to release SRS. The UE may not perform any uplink transmission on a serving Cell except the random access preamble transmission when the timeAlignmentTimer associated with the TAG to which this serving cell belongs is not running. When the timeAlignmentTimer associated with the pTAG is not running, the UE may not perform any uplink transmission on any serving cell except the random access preamble transmission on the PCell. A UE stores or maintains N_TA (current timing advance value of an sTAG) upon expiry of associated timeAlignmentTimer. The UE may apply a received timing advance command MAC control element and starts associated timeAlignmentTimer. Transmission of the uplink radio frame number i from the UE may start $(N_{TA}+N_{TA\ offset}) \times T_s$ seconds before the start of the corresponding downlink radio frame at the UE, where $0 \leq N_{TA} \leq 20512$. In an example implementation, $N_{TA\ offset}=0$ for frame structure type 1 (FDD) and $N_{TA\ offset}=624$ for frame structure type 2 (TDD).

According to some of the various aspects of embodiments, upon reception of a timing advance command for a TAG containing the primary cell, the UE may adjust uplink transmission timing for PUCCH/PUSCH/SRS of the primary cell based on the received timing advance command. The UL transmission timing for PUSCH/SRS of a secondary cell may be the same as the primary cell if the secondary cell and the primary cell belong to the same TAG. Upon reception of a timing advance command for a TAG not containing the primary cell, the UE may adjust uplink transmission timing for PUSCH/SRS of secondary cells in the TAG based on the received timing advance command where the UL transmission timing for PUSCH/SRS is the same for all the secondary cells in the TAG.

The timing advance command for a TAG may indicates the change of the uplink timing relative to the current uplink timing for the TAG as multiples of 16 Ts (Ts: sampling time unit). The start timing of the random access preamble may obtained employing a downlink synchronization time in the same TAG. In case of random access response, an 11-bit timing advance command, TA, for a TAG may indicate NTA values by index values of TA=0, 1, 2, . . . , 1282, where an amount of the time alignment for the TAG may be given by NTA=TA×16. In other cases, a 6-bit timing advance command, TA, for a TAG may indicate adjustment of the current NTA value, NTA,old, to the new NTA value, NTA,new, by index values of TA=0, 1, 2, . . . , 63, where NTA,new=NTA,old+(TA−31)×16. Here, adjustment of NTA value by a positive or a negative amount indicates advancing or delaying the uplink transmission timing for the TAG by a given amount respectively. For a timing advance command received on subframe n, the corresponding adjustment of the uplink transmission timing may apply from the beginning of subframe n+6. For serving cells in the same TAG, when the UE's uplink PUCCH/PUSCH/SRS transmissions in subframe n and subframe n+1 are overlapped due to the timing adjustment, the UE may complete transmission of subframe n and not transmit the overlapped part of subframe n+1. If the received downlink timing changes and is not compensated or is only partly compensated by the uplink timing adjustment without timing advance command, the UE may change NTA accordingly.

Downlink frames and subframes of downlink carriers are time aligned (by the base station) in carrier aggregation and multiple TAG configuration. Time alignment errors may be tolerated to some extend. For example, for intra-band contiguous carrier aggregation, time alignment error may not exceed 130 ns. In another example, for intra-band non-contiguous carrier aggregation, time alignment error may not exceed 260 ns. In another example, for inter-band carrier aggregation, time alignment error may not exceed 1.3 µs.

The UE may have capability to follow the frame timing change of the connected base station. The uplink frame transmission may take place $(N_{TA}+N_{TA\ offset}) \times T_s$ before the reception of the first detected path (in time) of the corresponding downlink frame from the reference cell. The UE may be configured with a pTAG containing the PCell. The pTAG may also contain one or more SCells, if configured. The UE may also be configured with one or more sTAGs, in which case the pTAG may contain one PCell and the sTAG may contain at least one SCell with configured uplink. In pTAG, UE may use the PCell as the reference cell for deriving the UE transmit timing for cells in the pTAG. The UE may employ a synchronization signal on the reference cell to drive downlink timing. When a UE is configured with an sTAG, the UE may use an activated SCell from the sTAG for deriving the UE transmit timing for cell in the sTAG.

In at least one of the various embodiments, uplink physical channel(s) may correspond to a set of resource elements carrying information originating from higher layers. The following example uplink physical channel(s) may be defined for uplink: a) Physical Uplink Shared Channel (PUSCH), b) Physical Uplink Control Channel (PUCCH), c) Physical Random Access Channel (PRACH), and/or the like. Uplink physical signal(s) may be used by the physical layer and may not carry information originating from higher layers. For example, reference signal(s) may be considered as uplink physical signal(s). Transmitted signal(s) in slot(s) may be described by one or several resource grids including, for example, subcarriers and SC-FDMA or OFDMA symbols. Antenna port(s) may be defined such that the channel over which symbol(s) on antenna port(s) may be conveyed and/or inferred from the channel over which other symbol(s) on the same antenna port(s) is/are conveyed. There may be one resource grid per antenna port. The antenna port(s) used for transmission of physical channel(s) or signal(s) may depend on the number of antenna port(s) configured for the physical channel(s) or signal(s).

According to some of the various aspects of embodiments, cell search may be the procedure by which a wireless device may acquire time and frequency synchronization with a cell and may detect the physical layer Cell ID of that cell (transmitter). An example embodiment for synchronization signal and cell search is presented below. A cell search may support a scalable overall transmission bandwidth corresponding to 6 resource blocks and upwards. Primary and secondary synchronization signals may be transmitted in the downlink and may facilitate cell search. For example, 504 unique physical-layer cell identities may be defined using synchronization signals. The physical-layer cell identities may be grouped into 168 unique physical-layer cell-identity groups, group(s) containing three unique identities. The grouping may be such that physical-layer cell identit(ies) is part of a physical-layer cell-identity group. A physical-layer cell identity may be defined by a number in the range of 0 to 167, representing the physical-layer cell-identity group, and a number in the range of 0 to 2, representing the physical-layer identity within the physical-layer cell-identity group. The synchronization signal may include a primary synchronization signal and a secondary synchronization signal.

According to some of the various embodiments, physical downlink control channel(s) may carry transport format, scheduling assignments, uplink power control, and other control information. PDCCH may support multiple formats. Multiple PDCCH packets may be transmitted in a subframe.

According to some of the various embodiments, scheduling control packet(s) may be transmitted for packet(s) or group(s) of packets transmitted in downlink shared channel(s). Scheduling control packet(s) may include information about subcarriers used for packet transmission(s). PDCCH may also provide power control commands for uplink channels. PDCCH channel(s) may carry a plurality of downlink control packets in subframe(s). Enhance PDCCH may be implemented in a cell as an option to carrier control information. According to some of the various embodiments, PHICH may carry the hybrid-ARQ (automatic repeat request) ACK/NACK.

Other arrangements for PCFICH, PHICH, PDCCH, enhanced PDCCH, and/or PDSCH may be supported. The configurations presented here are for example purposes. In another example, resources PCFICH, PHICH, and/or PDCCH radio resources may be transmitted in radio resources including a subset of subcarriers and pre-defined time duration in each or some of the subframes. In an example, PUSCH resource(s) may start from the first symbol. In another example embodiment, radio resource configuration(s) for PUSCH, PUCCH, and/or PRACH (physical random access channel) may use a different configuration. For example, channels may be time multiplexed, or time/frequency multiplexed when mapped to uplink radio resources.

According to some of the various aspects of embodiments, the physical layer random access preamble may comprise a cyclic prefix of length Tcp and a sequence part of length Tseq. The parameter values may be pre-defined and depend on the frame structure and a random access configuration. In an example embodiment, Tcp may be 0.1 msec, and Tseq may be 0.9 msec. Higher layers may control the preamble format. The transmission of a random access preamble, if triggered by the MAC layer, may be restricted to certain time and frequency resources. The start of a random access preamble may be aligned with the start of the corresponding uplink subframe at a wireless device.

According to an example embodiment, random access preambles may be generated from Zadoff-Chu sequences with a zero correlation zone, generated from one or several root Zadoff-Chu sequences. In another example embodiment, the preambles may also be generated using other random sequences such as Gold sequences. The network may configure the set of preamble sequences a wireless device may be allowed to use. According to some of the various aspects of embodiments, there may be a multitude of preambles (e.g. 64) available in cell(s). From the physical layer perspective, the physical layer random access procedure may include the transmission of random access preamble(s) and random access response(s). Remaining message(s) may be scheduled for transmission by a higher layer on the shared data channel and may not be considered part of the physical layer random access procedure. For example, a random access channel may occupy 6 resource blocks in a subframe or set of consecutive subframes reserved for random access preamble transmissions.

According to some of the various embodiments, the following actions may be followed for a physical random access procedure: 1) layer 1 procedure may be triggered upon request of a preamble transmission by higher layers; 2) a preamble index, a target preamble received power, a corresponding RA-RNTI (random access-radio network temporary identifier) and/or a PRACH resource may be indicated by higher layers as part of a request; 3) a preamble transmission power P_PRACH may be determined; 4) a preamble sequence may be selected from the preamble sequence set using the preamble index; 5) a single preamble may be transmitted using selected preamble sequence(s) with transmission power P_PRACH on the indicated PRACH resource; 6) detection of a PDCCH with the indicated RAR may be attempted during a window controlled by higher layers; and/or the like. If detected, the corresponding downlink shared channel transport block may be passed to higher layers. The higher layers may parse transport block(s) and/or indicate an uplink grant to the physical layer(s).

According to some of the various aspects of embodiments, a random access procedure may be initiated by a physical downlink control channel (PDCCH) order and/or by the MAC sublayer in a wireless device. If a wireless device receives a PDCCH transmission consistent with a PDCCH order masked with its radio identifier, the wireless device may initiate a random access procedure. Preamble transmission(s) on physical random access channel(s) (PRACH) may be supported on a first uplink carrier and reception of a PDCCH order may be supported on a first downlink carrier.

Before a wireless device initiates transmission of a random access preamble, it may access one or many of the following types of information: a) available set(s) of PRACH resources for the transmission of a random access preamble; b) group(s) of random access preambles and set(s) of available random access preambles in group(s); c) random access response window size(s); d) power-ramping factor(s); e) maximum number(s) of preamble transmission(s); f) initial preamble power; g) preamble format based offset(s); h) contention resolution timer(s); and/or the like. These parameters may be updated from upper layers or may be received from the base station before random access procedure(s) may be initiated.

According to some of the various aspects of embodiments, a wireless device may select a random access preamble using available information. The preamble may be signaled by a base station or the preamble may be randomly selected by the wireless device. The wireless device may determine the next available subframe containing PRACH permitted by restrictions given by the base station and the physical layer timing requirements for TDD or FDD. Subframe timing and the timing of transmitting the random access preamble may be determined based, at least in part, on synchronization signals received from the base station and/or the information received from the base station. The wireless device may proceed to the transmission of the random access preamble when it has determined the timing. The random access preamble may be transmitted on a second plurality of subcarriers on the first uplink carrier.

According to some of the various aspects of embodiments, once a random access preamble is transmitted, a wireless device may monitor the PDCCH of a primary carrier for random access response(s), in a random access response window. There may be a pre-known identifier in PDCCH that identifies a random access response. The wireless device may stop monitoring for random access response(s) after successful reception of a random access response containing random access preamble identifiers that matches the transmitted random access preamble and/or a random access response address to a wireless device identifier. A base station random access response may include a time alignment command. The wireless device may process the received time alignment command and may adjust its uplink transmission timing according the time alignment value in the command. For example, in a random access response, a time alignment command may be coded using 11 bits, where an amount of the time alignment may be based on the value in the command. In an example embodiment, when an uplink transmission is required, the base station may provide the wireless device a grant for uplink transmission.

If no random access response is received within the random access response window, and/or if none of the received random access responses contains a random access preamble identifier corresponding to the transmitted random access preamble, the random access response reception may be considered unsuccessful and the wireless device may, based on the backoff parameter in the wireless device, select a random backoff time and delay the subsequent random access transmission by the backoff time, and may retransmit another random access preamble.

According to some of the various aspects of embodiments, a wireless device may transmit packets on an uplink carrier. Uplink packet transmission timing may be calculated in the wireless device using the timing of synchronization signal(s) received in a downlink. Upon reception of a timing alignment command by the wireless device, the wireless device may adjust its uplink transmission timing. The timing alignment command may indicate the change of the uplink timing relative to the current uplink timing. The uplink transmission timing for an uplink carrier may be determined using time alignment commands and/or downlink reference signals.

According to some of the various aspects of embodiments, a time alignment command may indicate timing adjustment for transmission of signals on uplink carriers. For example, a time alignment command may use 6 bits. Adjustment of the uplink timing by a positive or a negative amount indicates advancing or delaying the uplink transmission timing by a given amount respectively.

For a timing alignment command received on subframe n, the corresponding adjustment of the timing may be applied with some delay, for example, it may be applied from the beginning of subframe n+6. When the wireless device's uplink transmissions in subframe n and subframe n+1 are overlapped due to the timing adjustment, the wireless device may transmit complete subframe n and may not transmit the overlapped part of subframe n+1.

According to some of the various aspects of embodiments, control message(s) or control packet(s) may be scheduled for transmission in a physical downlink shared channel (PDSCH) and/or physical uplink shared channel PUSCH. PDSCH and PUSCH may carry control and data message(s)/packet(s). Control message(s) and/or packet(s) may be processed before transmission. For example, the control message(s) and/or packet(s) may be fragmented or multiplexed before transmission. A control message in an upper layer may be processed as a data packet in the MAC or physical layer. For example, system information block(s), radio resource control messages, and data traffic may be scheduled for transmission in PDSCH.

According to some of the various aspects of embodiments, a wireless device may be preconfigured with one or more carriers. When the wireless device is configured with more than one carrier, the base station and/or wireless device may activate and/or deactivate the configured carriers. One of the carriers (the primary carrier) may always be activated. Other carriers may be deactivated by default and/or may be activated by a base station when needed. A base station may activate and deactivate carriers by sending an activation/deactivation MAC control element. Furthermore, the UE may maintain a carrier deactivation timer per configured carrier and deactivate the associated carrier upon its expiry. The same initial timer value may apply to instance(s) of the carrier deactivation timer. The initial value of the timer may be configured by a network. The configured carriers (unless the primary carrier) may be initially deactivated upon addition and after a handover.

According to some of the various aspects of embodiments, if a wireless device receives an activation/deactivation MAC control element activating the carrier, the wireless device may activate the carrier, and/or may apply normal carrier operation including: sounding reference signal transmissions on the carrier (if the carrier is uplink time aligned), CQI (channel quality indicator)/PMI(precoding matrix indicator)/RI(ranking indicator) reporting for the carrier, PDCCH monitoring on the carrier, PDCCH monitoring for the carrier, start or restart the carrier deactivation timer associated with the carrier, and/or the like. If the device receives an activation/deactivation MAC control element deactivating the carrier, and/or if the carrier deactivation timer associated with the activated carrier expires, the base station or device may deactivate the carrier, and may stop the carrier deactivation timer associated with the carrier, and/or may flush HARQ buffers associated with the carrier.

If PDCCH on a carrier scheduling the activated carrier indicates an uplink grant or a downlink assignment for the activated carrier, the device may restart the carrier deactivation timer associated with the carrier. When a carrier is deactivated, the wireless device may not transmit SRS (sounding reference signal) for the carrier, may not report CQI/PMI/RI for the carrier, may not transmit on UL-SCH for the carrier, may not monitor the PDCCH on the carrier, and/or may not monitor the PDCCH for the carrier.

A process to assign subcarriers to data packets may be executed by a MAC layer scheduler. The decision on assigning subcarriers to a packet may be made based on data packet size, resources required for transmission of data packets (number of radio resource blocks), modulation and coding assigned to data packet(s), QoS required by the data packets (i.e. QoS parameters assigned to data packet bearer), the service class of a subscriber receiving the data packet, or subscriber device capability, a combination of the above, and/or the like.

According to some of the various aspects of embodiments, packets may be referred to service data units and/or protocols data units at Layer 1, Layer 2 and/or Layer 3 of the communications network. Layer 2 in an LTE network may include three sub-layers: PDCP sub-layer, RLC sub-layer, and MAC sub-layer. A layer 2 packet may be a PDCP packet, an RLC packet or a MAC layer packet. Layer 3 in an LTE network may be Internet Protocol (IP) layer, and a layer 3 packet may be an IP data packet. Packets may be transmitted and received via an air interface physical layer. A packet at the physical layer may be called a transport block. Many of the various embodiments may be implemented at one or many different communication network layers. For example, some of the actions may be executed by the PDCP layer and some others by the MAC layer or PHY layer.

According to some of the various aspects of embodiments, a radio bearer may be a GBR (guaranteed bit rate) bearer and/or a non-GBR bearer. A GBR and/or guaranteed bit rate bearer may be employed for transfer of real-time packets, and/or a non-GBR bearer may be used for transfer of non-real-time packets. The non-GBR bearer may be assigned a plurality of attributes including: a scheduling priority, an allocation and retention priority, a portable device aggregate maximum bit rate, and/or the like. These parameters may be used by the scheduler in scheduling non-GBR packets. GBR bearers may be assigned attributes such as delay, jitter, packet loss parameters, and/or the like.

According to some of the various aspects of embodiments, the transmitter in the disclosed embodiments of the present invention may be a wireless device (also called user equipment), a base station (also called eNodeB), a relay node transmitter, and/or the like. The receiver in the disclosed embodiments of the present invention may be a wireless device (also called user equipment-UE), a base station (also called eNodeB), a relay node receiver, and/or the like.

According to some of the various aspects of embodiments, the MAC layer in some wireless device(s) may report buffer size(s) of either a single Logical Channel Group (LCG) or a group of LCGs to a base station. An LCG may be a group of logical channels identified by an LCG ID. The mapping of logical channel(s) to LCG may be set up during radio configuration. Buffer status report(s) may be used by a MAC scheduler to assign radio resources for packet transmission from wireless device(s). HARQ and ARQ processes may be used for packet retransmission to enhance the reliability of radio transmission and reduce the overall probability of packet loss.

In this specification, "a" and "an" and similar phrases are to be interpreted as "at least one" and "one or more." In this specification, the term "may" is to be interpreted as "may, for example," In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in TDD communication systems. The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A wireless device comprising:
one or more processors; and
memory storing instructions that, when executed by the one or more processors, cause the wireless device to:
receive at least one message comprising:
a cell group index associated with a secondary cell of a secondary cell group of a plurality of cell groups; and
configuration parameters of sounding reference signal (SRS) transmission via the secondary cell;
receive a first control command configured to cause transmission, via the secondary cell group, of a random access preamble;
receive a random access response comprising:
a timing advance command (TAC) for the secondary cell group; and
a power control command; and
transmit, via the secondary cell and after application of the TAC, a plurality of SRSs, wherein transmission power associated with a transmission of a first SRS of the plurality of SRSs is based, at least in part, on the power control command, and wherein the wireless device is configured to not transmit any of the plurality of the SRSs via the secondary cell during a time period between receiving the at least one message and receiving the TAC.

2. The wireless device of claim 1, wherein the instructions, when executed by the one or more processors, further cause the wireless device to receive, after receiving the at least one message and before receiving the first control command, an activation command.

3. The wireless device of claim 1, wherein the instructions, when executed by the one or more processors, further cause the wireless device to drop at least one SRS if one or more pre-defined conditions are satisfied.

4. The wireless device of claim 1, wherein the instructions, when executed by the one or more processors, further cause the wireless device to configure, based on the at least one message, random access resources for transmission of the random access preamble.

5. The wireless device of claim 1, wherein the instructions, when executed by the one or more processors, further cause the wireless device to drop transmission of an SRS in a subframe of the secondary cell when the wireless device is power limited.

6. The wireless device of claim 1, wherein the instructions, when executed by the one or more processors, further cause the wireless device to apply the timing advance command to cause, for a base station, alignment of reception timing of uplink signals in frames and subframes of the secondary cell group.

7. The wireless device of claim 1, wherein the instructions, when executed by the one or more processors, further cause the wireless device to configure, based on the at least one message, a time alignment timer for each of the plurality of cell groups by causing the time alignment timer to, in response to the wireless device receiving a first timing advance command to adjust uplink transmission timing of a commanded cell group in the plurality of cell groups, start or restart.

8. The wireless device of claim 1, wherein the random access response comprises a preamble identifier for identifying the random access preamble.

9. The wireless device of claim 1, wherein the plurality of cell groups comprises a first cell group and a second cell group, and wherein:
uplink transmission timing associated with the first cell group is based on a first cell of the first cell group; and
uplink transmission timing associated with the second cell group is based on a second cell of the second cell group.

10. The wireless device of claim 1, wherein the instructions, when executed by the one or more processors, further cause the wireless device to:
transmit a first SRS of the plurality of SRSs in a first subframe of the secondary cell, if the wireless device has sufficient power to transmit one or more first data packets in parallel with the first SRS; and drop a configured transmission of a second SRS of the plurality of SRSs in a second subframe of the secondary cell, if the wireless device does not have sufficient power to transmit one or more second data packets in parallel with the second SRS.

11. A method comprising:
receiving, by a wireless device, at least one message comprising:
a cell group index associated with a secondary cell of a secondary cell group of a plurality of cell groups; and
configuration parameters of sounding reference signal (SRS) transmission via the secondary cell;
receiving a first control command configured to cause transmission, via the secondary cell group, of a random access preamble;
receiving a random access response comprising:
a timing advance command (TAC) for the secondary cell group; and
a power control command; and
transmitting, via the secondary cell and after application of the TAC, a plurality of SRSs, wherein transmission power associated with a transmission of a first SRS of the plurality of the SRSs is based, at least in part, on the power control command, and wherein the wireless device is configured to not transmit any of the plurality of the SRSs via the secondary cell during a time period between the receiving the at least one message and the receiving the TAC.

12. The method of claim 11, further comprising receiving, after the receiving the at least one message and before the receiving the first control command, an activation command.

13. The method of claim 11, further comprising dropping at least one SRS if one or more pre-defined conditions are satisfied.

14. The method of claim 11, further comprising configuring, by the wireless device and based on the at least one message, random access resources for transmission of the random access preamble.

15. The method of claim 11, further comprising dropping transmission of an SRS in a subframe of the secondary cell when the wireless device is power limited.

16. The method of claim 11, further comprising applying the timing advance command to cause, for a base station, alignment of reception timing of uplink signals in frames and subframes of the secondary cell group.

17. The method of claim 11, further comprising configuring, by the wireless device and based on the at least one message, a time alignment timer for each of the plurality of cell groups by, in response to the wireless device receiving a first timing advance command to adjust uplink transmission timing of a commanded cell group in the plurality of cell groups, starting or restarting the time alignment timer.

18. The method of claim 11, wherein the random access response comprises a preamble identifier for identifying the random access preamble.

19. The method of claim 11, wherein the plurality of cell groups comprises a first cell group and a second cell group, and wherein:
uplink transmission timing associated with the first cell group is based on a first cell of the first cell group; and
uplink transmission timing associated with the second cell group is based on a second cell of the second cell group.

20. The method of claim 11, further comprising:
transmitting a first SRS of the plurality of SRSs in a first subframe of the secondary cell, if the wireless device has sufficient power to transmit one or more first data packets in parallel with the first SRS; and
dropping a configured transmission of a second SRS of the plurality of SRSs in a second subframe of the secondary cell, if the wireless device does not have sufficient power to transmit one or more second data packets in parallel with the second SRS.

21. A system comprising:
a base station comprising:
one or more processors; and
memory storing instructions that, when executed by the one or more processors of the base station, cause the base station to:
transmit at least one message comprising:
a cell group index associated with a secondary cell of a secondary cell group of a plurality of cell groups; and
configuration parameters of sounding reference signal (SRS) transmission via the secondary cell;
transmit a first control command configured to cause transmission, via the secondary cell group, of a random access preamble; and
transmit a random access response comprising:
a timing advance command (TAC) for the secondary cell group; and
a power control command; and
a wireless device comprising:
one or more processors; and
memory storing instructions that, when executed by the one or more processors of the wireless device, cause the wireless device to:
transmit, via the secondary cell and after application of the TAC, a plurality of SRSs, wherein transmission power associated with a transmission of a first SRS of the plurality of the SRSs is based, at least in part, on the power control command, and wherein the wireless device is configured to not transmit any of the plurality of the SRSs via the secondary cell during a time period between receiving the at least one message and receiving the TAC.

22. The system of claim 21, wherein the instructions stored in the memory of the wireless device, when executed by the one or more processors of the wireless device, further cause the wireless device to receive, after receiving the at least one message and before receiving the first control command, an activation command.

23. The system of claim 21, wherein the instructions stored in the memory of the wireless device, when executed by the one or more processors of the wireless device, further cause the wireless device to drop at least one SRS if one or more pre-defined conditions are satisfied.

24. The system of claim 21, wherein the instructions stored in the memory of the wireless device, when executed by the one or more processors of the wireless device, further cause the wireless device to configure, based on the at least one message, random access resources for transmission of the random access preamble.

25. The system of claim 21, wherein the instructions stored in the memory of the wireless device, when executed by the one or more processors of the wireless device, further cause the wireless device to drop transmission of an SRS in a subframe of the secondary cell when the wireless device is power limited.

26. The system of claim 21, wherein the instructions stored in the memory of the wireless device, when executed by the one or more processors of the wireless device, further cause the wireless device to apply the timing advance command to cause, for the base station, alignment of reception timing of uplink signals in frames and subframes of the secondary cell group.

27. The system of claim 21, wherein the instructions stored in the memory of the wireless device, when executed by the one or more processors of the wireless device, further cause the wireless device to configure, based on the at least one message, a time alignment timer for each of the plurality of cell groups by causing the time alignment timer to, in response to the wireless device receiving a first timing advance command to adjust uplink transmission timing of a commanded cell group in the plurality of cell groups, start or restart.

28. The system of claim 21, wherein the random access response comprises a preamble identifier for identifying the random access preamble.

29. The system of claim 21, wherein the plurality of cell groups comprises a first cell group and a second cell group, and wherein:
uplink transmission timing associated with the first cell group is based on a first cell of the first cell group; and
uplink transmission timing associated with the second cell group is based on a second cell of the second cell group.

30. The system of claim 21, wherein the instructions stored in the memory of the wireless device, when executed by the one or more processors of the wireless device, further cause the wireless device to:
transmit a first SRS of the plurality of SRSs in a first subframe of the secondary cell, if the wireless device has sufficient power to transmit one or more first data packets in parallel with the first SRS; and
drop a configured transmission of a second SRS of the plurality of SRSs in a second subframe of the secondary cell, if the wireless device does not have sufficient power to transmit one or more second data packets in parallel with the second SRS.

31. A method comprising:
transmitting, by a base station and to a wireless device, at least one message comprising:
a cell group index associated with a secondary cell of a secondary cell group of a plurality of cell groups; and
configuration parameters of sounding reference signal (SRS) transmission via the secondary cell;
transmitting, by the base station, a first control command configured to cause transmission, via the secondary cell group, of a random access preamble;
transmitting, by the base station, a random access response comprising:
a timing advance command (TAC) for the secondary cell group; and
a power control command; and
transmitting, by the wireless device, to the base station, via the secondary cell, and after application of the TAC, a plurality of SRSs, wherein transmission power associated with a transmission of a first SRS of the plurality of the SRSs is based, at least in part, on the power control command, and wherein the wireless device is configured to not transmit any of the plurality of the SRSs via the secondary cell during a time period between receiving the at least one message and receiving the TAC.

32. The method of claim 31, further comprising transmitting, by the base station, after the transmitting the at least one message, and before the transmitting the first control command, an activation command.

33. The method of claim 31, further comprising dropping, by the wireless device, at least one SRS if one or more pre-defined conditions are satisfied.

34. The method of claim 31, further comprising configuring, by the wireless device and based on the at least one message, random access resources for transmission of the random access preamble.

35. The method of claim 31, further comprising dropping, by the wireless device, transmission of an SRS in a subframe of the secondary cell when the wireless device is power limited.

36. The method of claim 31, further comprising applying, by the wireless device, the timing advance command to cause, for the base station, alignment of reception timing of uplink signals in frames and subframes of the secondary cell group.

37. The method of claim 31, further comprising configuring, by the wireless device and based on the at least one message, a time alignment timer for each of the plurality of cell groups by, in response to the wireless device receiving a first timing advance command to adjust uplink transmission timing of a commanded cell group in the plurality of cell groups, starting or restarting the time alignment timer.

38. The method of claim 31, wherein the random access response comprises a preamble identifier for identifying the random access preamble.

39. The method of claim 31, wherein the plurality of cell groups comprises a first cell group and a second cell group, and wherein:
uplink transmission timing associated with the first cell group is based on a first cell of the first cell group; and
uplink transmission timing associated with the second cell group is based on a second cell of the second cell group.

40. The method of claim 31, further comprising:
transmitting a first SRS of the plurality of SRSs in a first subframe of the secondary cell, if the wireless device has sufficient power to transmit one or more first data packets in parallel with the first SRS; and
dropping a configured transmission of a second SRS of the plurality of SRSs in a second subframe of the secondary cell, if the wireless device does not have sufficient power to transmit one or more second data packets in parallel with the second SRS.

* * * * *

UNITED STATES PATENT AND TRADEMARK OFFICE
CERTIFICATE OF CORRECTION

PATENT NO. : 10,039,131 B2
APPLICATION NO. : 15/201529
DATED : July 31, 2018
INVENTOR(S) : Esmael Hejazi Dinan It is certified that error appears in the above-identified patent and that said Letters Patent is hereby corrected as shown below:

On the Title Page

Page 4, Column 2, Other Publications, Line 25:
Please delete "Chian" and insert --China--

Page 5, Column 1, Other Publications, Line 20:
Delete "Scell" and insert --SCell--

Page 5, Column 1, Other Publications, Line 33:
Delete "Alcatei-Lucent, Alcatei-Lucent" and insert --Alcatel-Lucent, Alcatel-Lucent--

Page 5, Column 2, Other Publications, Line 18:
Delete "TerrestrialRadio" and insert --Terrestrial Radio--

Page 5, Column 2, Other Publications, Line 42:
Delete "Sauce:" and insert --Source:--

Page 6, Column 1, Other Publications, Line 6:
Delete "ChannelTransmission" and insert --Channel Transmission--

Page 6, Column 1, Other Publications, Line 12:
Delete "Scell" and insert --SCell--

Page 6, Column 2, Other Publications, Line 57:
Delete "Scell" and insert --SCell--

Page 7, Column 1, Other Publications, Line 14:
Delete "Souce:" and insert --Source:--

Signed and Sealed this
Thirty-first Day of December, 2019

Andrei Iancu
*Director of the United States Patent and Trademark Office*

CERTIFICATE OF CORRECTION (continued)
U.S. Pat. No. 10,039,131 B2

Page 7, Column 1, Other Publications, Line 44:
Delete "Path loss" and insert --Pathloss--

Page 7, Column 1, Other Publications, Line 55:
Delete "Path loss" and insert --Pathloss--

Page 7, Column 2, Other Publications, Line 14:
Delete "Souce:" and insert --Source:--

Page 7, Column 2, Other Publications, Line 23:
Delete "Scell" and insert --SCell--

Page 7, Column 2, Other Publications, Line 71:
Delete "contol" and insert --control--

Page 8, Column 1, Other Publications, Line 33:
Delete "or" and insert --for--

Page 8, Column 1, Other Publications, Line 53:
Delete "Souce:" and insert --Source:--

Page 8, Column 2, Other Publications, Line 31:
Delete "Souce:" and insert --Source:--

Page 8, Column 2, Other Publications, Line 32:
Delete "STAG?." and insert --sTAG?.--

Page 8, Column 2, Other Publications, Line 71:
Delete "Mulit-TA" and insert --Multi-TA--

In the Specification

Column 7, Detailed Description of Embodiments, Line 22:
Delete "pCell." and insert --PCell.--

Column 13, Detailed Description of Embodiments, Line 65:
Delete "sCell" and insert --SCell--

Column 20, Detailed Description of Embodiments, Line 64:
After "reference", insert --.--

Column 45, Detailed Description of Embodiments, Line 13:
Delete "LOD" and insert --LCID--